(12) United States Patent
Brukilacchio

(10) Patent No.: US 9,606,304 B2
(45) Date of Patent: Mar. 28, 2017

(54) HIGH RADIANCE LIGHT EMITTING DIODE LIGHT ENGINE

(71) Applicant: Innovations In Optics, Inc., Woburn, MA (US)

(72) Inventor: Thomas John Brukilacchio, Reading, MA (US)

(73) Assignee: Innovations In Optics, Inc., Woburn, MA (US)

(*) Notice: Subject to any disclaimer, the term of this patent is extended or adjusted under 35 U.S.C. 154(b) by 0 days.

(21) Appl. No.: 14/953,666

(22) Filed: Nov. 30, 2015

(65) Prior Publication Data
US 2016/0154193 A1 Jun. 2, 2016

Related U.S. Application Data

(60) Provisional application No. 62/086,368, filed on Dec. 2, 2014.

(51) Int. Cl.
*G02B 6/42* (2006.01)
*G02B 21/16* (2006.01)
(Continued)

(52) U.S. Cl.
CPC ......... *G02B 6/4212* (2013.01); *G02B 6/4272* (2013.01); *G02B 6/4296* (2013.01);
(Continued)

(58) Field of Classification Search
CPC .... G02B 5/021; G02B 5/0278; G02B 6/0006; G02B 6/0008; G02B 6/4212;
(Continued)

(56) References Cited

U.S. PATENT DOCUMENTS 7,502,112 B2 * 3/2009 Kahn .................. G01J 3/02
356/405
7,832,878 B2 11/2010 Brukilacchio et al.
(Continued)

OTHER PUBLICATIONS

International Search Report & Written Opinion in counterpart International Patent Application No. PCT/US15/62904, mailed on Mar. 28, 2016; 13 pages.

*Primary Examiner* — Haissa Philogene
(74) *Attorney, Agent, or Firm* — Schmeiser, Olsen & Watts LLP

(57) ABSTRACT

Described is a light emitting diode (LED) high radiance illumination system that includes at least one LED die and a tapered collection optic. An aperture in a reflective surface at the output end of the tapered collection optic recovers light is configured to emit light to an adjacent optical fiber bundle. The reflective surface surrounding the aperture reflects light back through the tapered collection optic, resulting in increased radiance. The system provides uniform high intensity in near and far fields and is suitable for applications including surgical and microscopy illumination with high color rendering index, and stable and adjustable intensity and correlated color rendering. Illumination can include one or more colors, including white light. The system has improved thermal and optical performance and is generally more compact and lower in cost relative to conventional systems.

27 Claims, 33 Drawing Sheets

(51) Int. Cl.
  *H05B 33/08* (2006.01)
  *G02B 6/04* (2006.01)
  *G02B 21/00* (2006.01)
  *G02B 6/293* (2006.01)

(52) U.S. Cl.
  CPC ......... *G02B 21/16* (2013.01); *H05B 33/0803* (2013.01); *G02B 6/04* (2013.01); *G02B 6/29364* (2013.01); *G02B 6/4206* (2013.01); *G02B 6/4215* (2013.01); *G02B 6/4286* (2013.01); *G02B 6/4292* (2013.01); *G02B 21/0076* (2013.01)

(58) Field of Classification Search
  CPC .... G02B 6/4286; G02B 6/04; G02B 19/0028; G02B 19/0066; H05B 33/0803; A61N 2005/0652; A61N 2005/0665; A61N 5/1001; F21Y 2101/02
  USPC ......... 362/551–560, 227, 231, 235; 315/149, 315/151, 158
  See application file for complete search history.

(56) References Cited

U.S. PATENT DOCUMENTS

| | | |
|---|---|---|
| 8,152,347 B2 * | 4/2012 | Brukilacchio ......... G02B 5/021 362/552 |
| 8,278,841 B2 | 10/2012 | Brukilacchio |
| 8,403,527 B2 | 3/2013 | Brukilacchio |
| 2006/0001845 A1 | 1/2006 | Raghunandan et al. |
| 2006/0139644 A1 | 6/2006 | Kahn et al. |
| 2011/0001431 A1 | 1/2011 | Brukilacchio |
| 2012/0099308 A1 | 4/2012 | Brukilacchio |
| 2014/0185286 A1 | 7/2014 | Popovich et al. |

\* cited by examiner

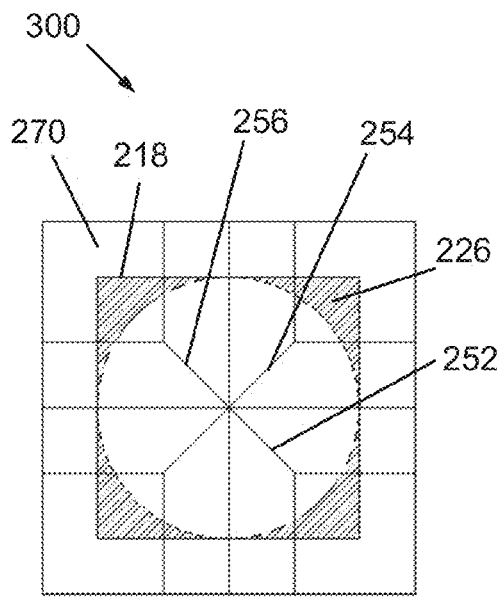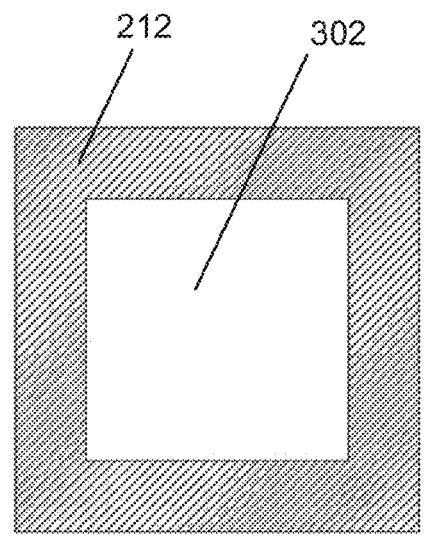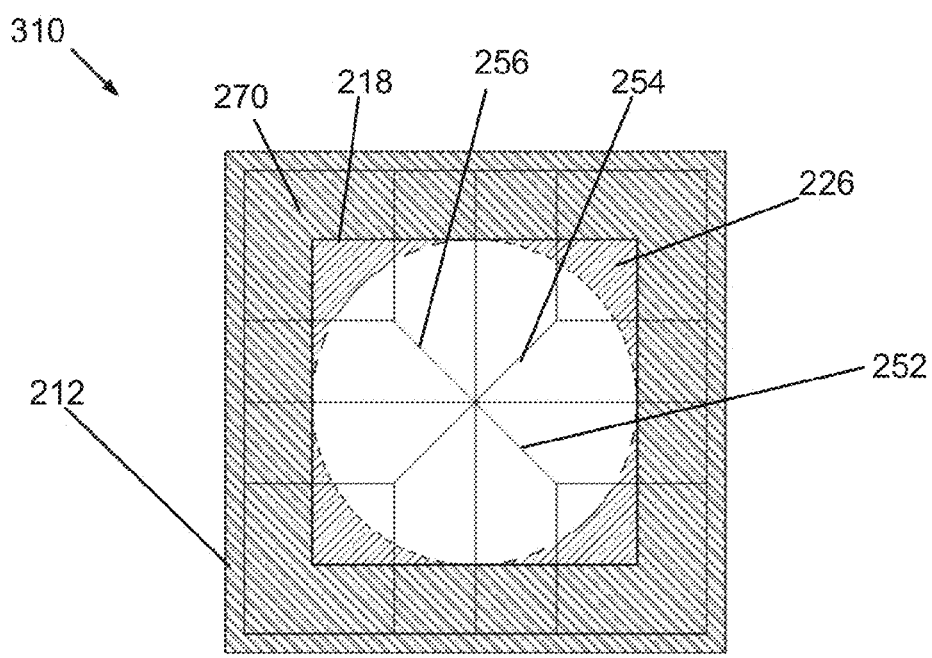
FIG. 18 A
FIG. 18 B
FIG. 18 C

Far Field Out of Taper     Far Field Out of Fiber
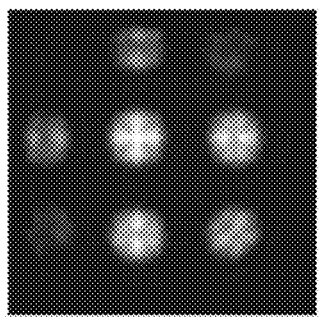 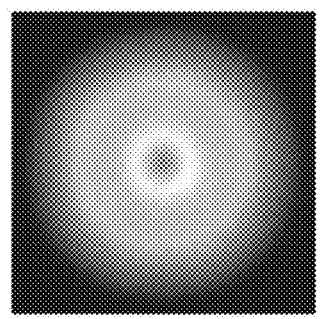
FIG. 22 A       25 mm Taper       FIG. 22 B
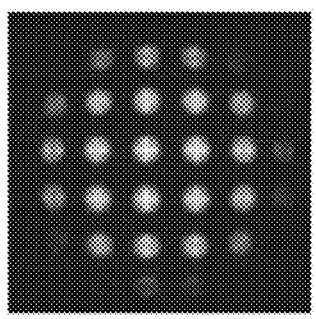 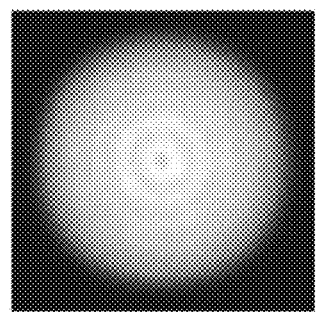
FIG. 22 C       50 mm Taper       FIG. 22 D
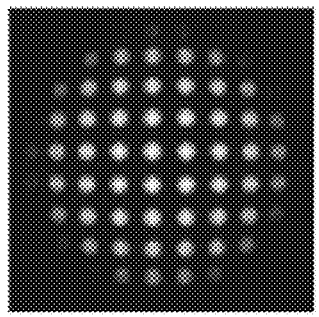 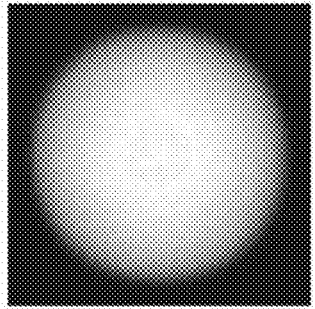
FIG. 22 E       75 mm Taper       FIG. 22 F
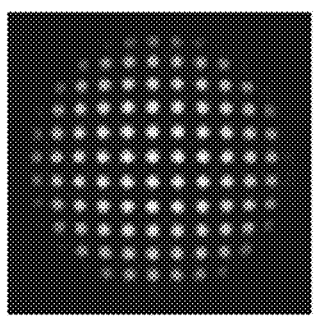 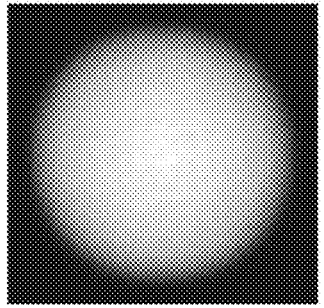
FIG. 22 G       100 mm Taper       FIG. 22 H

| 21 Die | Far Field | Near Field | Far Field Thru Fiber |
|---|---|---|---|
| 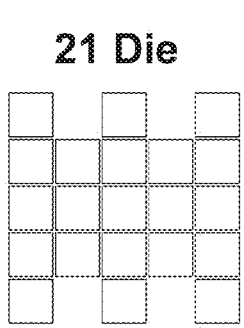 | 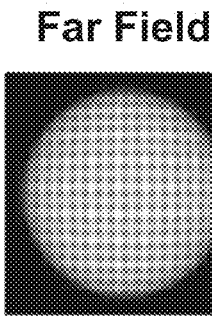 | 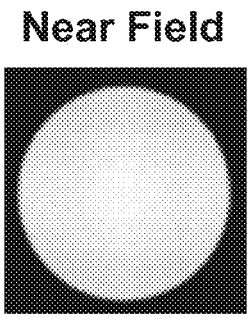 | 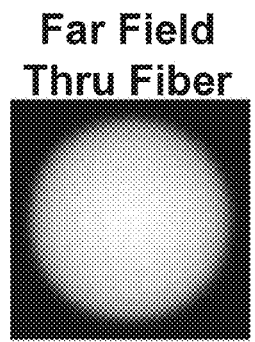 |
| FIG. 24 A | FIG. 24 B | FIG. 24 C | FIG. 24 D |
White LED Die
| 2 Die | Far Field | Near Field | Far Field Thru Fiber |
|---|---|---|---|
| 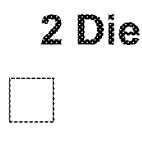 | 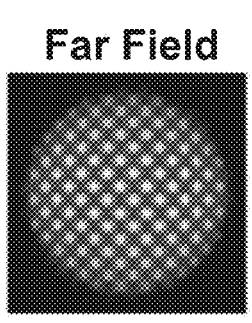 | 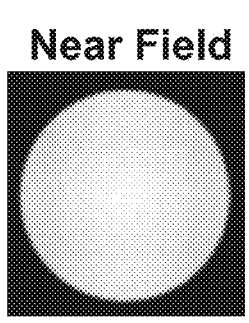 | 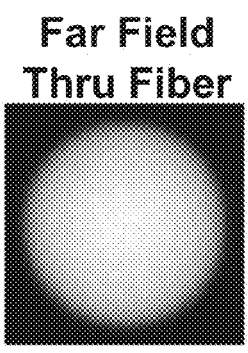 |
| FIG. 24 E | FIG. 24 F | FIG. 24 G | FIG. 24 H |
Red LED Die
| 2 Die | Far Field | Near Field | Far Field Thru Fiber |
|---|---|---|---|
| 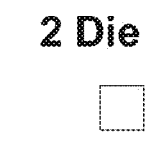 | 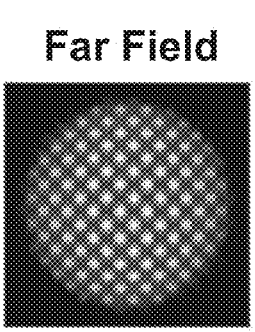 | 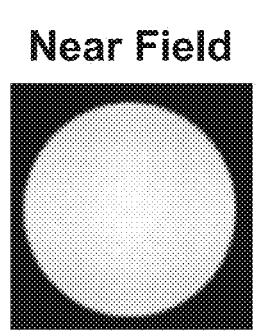 | 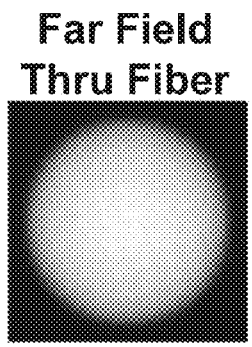 |
| FIG. 24 I | FIG. 24 J | FIG. 24 K | FIG. 24 L |
Blue-Green LED Die

HIGH RADIANCE LIGHT EMITTING DIODE LIGHT ENGINE

RELATED APPLICATION

This application claims the benefit of the earlier filing date of U.S. Provisional Patent Application Ser. No. 62/086,368, filed Dec. 2, 2014 and titled "High Radiance Light Emitting Diode Light Engine," the entirety of which is incorporated herein by reference.

FIELD OF THE INVENTION

The invention relates generally to a high radiance light emitting diode (LED) source of light characterized by high average color rendering index (CRI) and R9 values of greater than 85 over a range of correlated color temperature (CCT) from the order of 3000 Kelvin to 8,000 Kelvin which spans the common range of interest for surgical lighting applications. The high radiance LED light source can be used to provide high radiance narrow band fluorescence excitation lighting for the field of fluorescence microscopy. The high radiance LED light source can be coupled into standard three millimeter liquid light guides such as those used in microscope illumination or surgical headlights or two to five millimeter diameter fiber optic light guides such as those used in endoscopic surgical applications. The high radiance LED light source can include closed loop control of the optical power over its full spectrum to maintain light specifications over time and temperature.

BACKGROUND

High radiance light emitting diode (LED) light sources are in high demand for challenging applications in surgical and microscopy lighting. Prior art in the surgical and microscopy lighting fields typically utilize tungsten or tungsten halogen, metal halide, short arc xenon lamps, short arc mercury lamps, or more recently, systems incorporating pre-packaged high brightness white LEDs. The tungsten halogen sources do not have sufficient radiance for many of the more demanding surgical applications and have very short life on the order of only hundreds of hours or less. Metal halide, short arc xenon lamps and short arc mercury lamps require high voltage on the order of tens of kilovolts to initiate the arc, which can be an issue relative to EMI concerns in the operating room. The arc lamps also suffer from arc flicker which necessitates homogenizing optics which further reduces the source radiance. Furthermore, the metal halide, xenon and mercury lamps use toxic mercury which is being forced out of the market by regulatory agencies due to toxicity concerns. LED based surgical illumination sources offer the benefits of long life and high radiance, but commercially available units suffer from very low CRI on the order of 65 to 80 and do not have user adjustable CCT. Additionally, since they are typically made out of white LED die only, the CCT generally increases with increasing intensity and thus is not stable.

SUMMARY

Embodiments of a LED light source described herein contains no mercury, is controllable and stable in CCT and has CRI ranging between 85 and 98 over a large range of CCT. Closed loop control over multiple colors of LED die are used to obtain adjustable and stable CRI and CCT over time and temperature variations. A serious limitation of tungsten, metal halide, and both xenon and mercury short arc lamps is that they are characterized by short lifetimes on the order of only hundreds to low thousands of hours and over that lifetime their output can deteriorate by as much as fifty percent or more. Within the first one hundred hours, xenon short arc lamps are known to degrade by the order of twenty to twenty five percent of their initial intensity. With a closed loop LED based system the intensity can remain stable for the life of the product which can exceed twenty thousand hours. The term radiance refers to the optical power per unit area per unit solid angle which is a preferred metric to measure the input to optical fibers which have a fixed area and transmit over a fixed range of angles. The eye response to optical power is described as luminance which is the photometric equivalent of the radiometric term radiance.

Surgical lighting includes direct visual applications such as fiber optic illumination of open surgical sites by direct view by the human eye, surgical headlamps as used in deep cavity cardiac surgery and endoscopic surgery over a range of fiber diameters. Embodiments of the present invention can be used as a directly coupled optical fiber system for overhead surgical lighting. Microscope lighting includes both broad spectrum general microscope lighting and narrow band fluorescence excitation lighting ranging between the UVA and infrared spectral regions, for which the present invention is ideally suited and outperforms all existing lamp technologies. There are many other uses for embodiments of the present invention including but not limited to theater lighting, high intensity spot lights for military applications, both visible and invisible, and industrial process and control.

Prepackaged LEDs are defined as devices comprising an LED or LED array disposed on top of one or more thermally and electrically conductive materials each with an associated thermal impedance, electrical leads and thermal backplane that are then intended to be attached to yet another electrical board with additional thermal impedance. Examples of prepackaged devices include the Luxeon™ and Rebel™ product lines sold by Philips, the Osram Dragon™ and Ostar™ product lines, and the CREE X-Lamp™ product line. In contrast embodiments of the present invention yield considerably lower thermal impedance and thus lower LED junction temperature resulting in higher radiance and longer life.

Embodiments of a high radiance optical fiber coupled system described herein include LED light sources with one or more distinct spectral regions covering the range of wavelengths between ultraviolet and the near infrared including broad band white light. The LED, LED array or LED arrays are mounted to a high thermal conductivity circuit board comprising chip on board (COB) technology and in a preferred embodiment are mounted directly to a diamond heat spreader which is then mounted to the COB for improved thermal performance. In conjunction with high efficiency non-imaging collection optics incorporating light recovery reflective features, optical power monitoring and independent closed loop control of each color LED type, the resulting LED based fiber optic high radiance light source of the present invention is unmatched in performance by typical commercially available systems including tungsten halogen, metal halide, short arc xenon and short arc mercury lamp systems, or other LED based systems.

The optical power emitted from the typically ultraviolet, blue, blue-green, green, amber, red, infrared or phosphor coated blue (for white light) LED or other phosphor coated LED colors is collected by one or more non-imaging concentrators generally in the form of a four-sided tapered collection optic, otherwise referred to as a "taper," that incorporates directly or as a separate element a mirrored surface with emitting aperture sized to couple to a given fiber optic size and numerical aperture (NA) to yield high radiance input to the optical light guide by reclaiming optical power as it cycles between a mirrored aperture and LED array. The optical output is characterized by high uniformity in both near and far fields and an adjustable and stable spectrum with time and temperature afforded by the closed loop control of the optical power emitted from each of the LED types.

In one aspect, a first embodiment utilizes a single non-imaging taper for which the Etendue (area, solid angle, index squared product) is shared by all the LEDs in the array. This approach yields excellent results superior to anything commercially available today. Optical output is monitored and used in closed loop current control to achieve stable CRI over a range of user settable CCT values. The system is characterized by high uniformity in both the near and far fields as required by exacting surgical illumination applications to prevent color banding effects.

In another aspect, a second general embodiment utilizes multiple tapers, four in a preferred embodiment, which result in improved heat spreading and thereby higher radiance and longer life relative to the single taper embodiment, however, at the expense of greater physical volume and cost. This multiple taper approach can also be equipped with independent spectral bandpass excitation filters on each taper for application to fluorescence microscopy excitation typically coupled to a liquid light guide, which is coupled to the microscope.

In another aspect, a third general embodiment incorporates dichroic beam couplers that allow for the Etendue to be fully filled by, instead of shared by, two or more LED arrays of the same size as that of the first embodiment described, which adds complexity and cost, but is capable of achieving even higher radiance. The beam couplers are shown in two forms. The first is incorporated in a light guiding cube comprised of two prism halves with a dichroic coating deposited on one of the hypotenuses with the two hypotenuses then optically cemented and index matched together to form a beam combining cube. The second form of beam coupler comprises thin dichroic coated windows at forty five degrees to the optical axis and use of collimating and converging lens pairs to reimage the output of two or more single tapers, of the type described in the first embodiment as outlined above, down to a common image of each source where it can be coupled into a light guide.

BRIEF DESCRIPTION OF THE DRAWINGS

The structure, operation, and methodology of the invention, together with other objects and advantages thereof, may best be understood by reading the following detailed description in connection with the drawings in which each part has an assigned numeral or label that identifies the part in the various drawings and wherein:

FIG. 18 A through 18 C show diagrammatic end on view of the system of FIG. 17, detail of the common reflective aperture disposed between tapers, and diagrammatic view of output square cross section homogenizing combiner and detail of its respective circular output reflective aperture, respectively.

FIGS. 21 C and 21 D show plots of LED Current Drive 3 and a combination plot of LED Current Drive 1, LED Current Drive 2, and LED Current Drive 3, respectively.

FIGS. 21 E and 21 F show plots of the summation of LED Current Drive 1, LED Current Drive 2, and LED Current Drive 3, and the Power Spectral Density thereof, respectively.

FIG. 22 A through 22 H show gray scale images of the far field out of the taper of the system of FIG. 5 for a single off center LED at the taper input and the far field out of the fiber, respectively, for taper lengths between 25 mm and 100 mm.

FIG. 24 A through 24 L show the LED die arrangement at input aperture, Far and Near Field at output aperture and Far Field through fiber bundle for 3 different LED die configurations corresponding to different colors, respectively.

FIGS. 25A and 25 B show the near field normalized intensity plots of the system of FIG. 5 A in full scale and 90% of full scale, respectively, for the output of a single die at the input to the taper.

FIG. 26A through 26 C show plots of 3 different LED spectra, respectively, indicating the associated color temperatures, color rendering index, and R9 values.

DETAILED DESCRIPTION

Embodiments of the present invention relate to Light Emitting Diode (LED) lighting configured such as to produce high radiance illumination within a fixed diameter and angle space suitable for fiber optic coupled illumination for applications including surgical endoscopy, surgical headlamps, microscope illumination for both white light and fluorescence excitation, as well as a general purpose source of high radiance illumination for coupling into light guides or for reimaging to a spot, such as in high intensity spot lights such as in theater lighting. In particular, these embodiments of an LED based light source for improved surgical, microscopy and spot light systems have higher color rendering index (CRI), greater range of control of correlated color temperature (CCT) while maintaining high CRI, lower cost, higher radiant intensity, and increased lifetime relative to prior art. These embodiments have a highly uniform near and far field radiance profile that renders them as excellent substitutes and improvements upon prior art for both LED and Xenon Short Arc Lamp based systems. Thus the embodiments provide higher radiance, color temperature control at high CRI necessary for critical applications such as surgery for which it is critical to distinguish, for example, between arteries and veins.

As used herein, the phrase "in optical communication" refers to the ability to transmit light from or more optical components to one or more other optical components, or to receive light at one or more optical components from one or more other optical components. The word "subset" means a number or collection of elements that is less than a total number or collection of the same elements.

Figure 1:
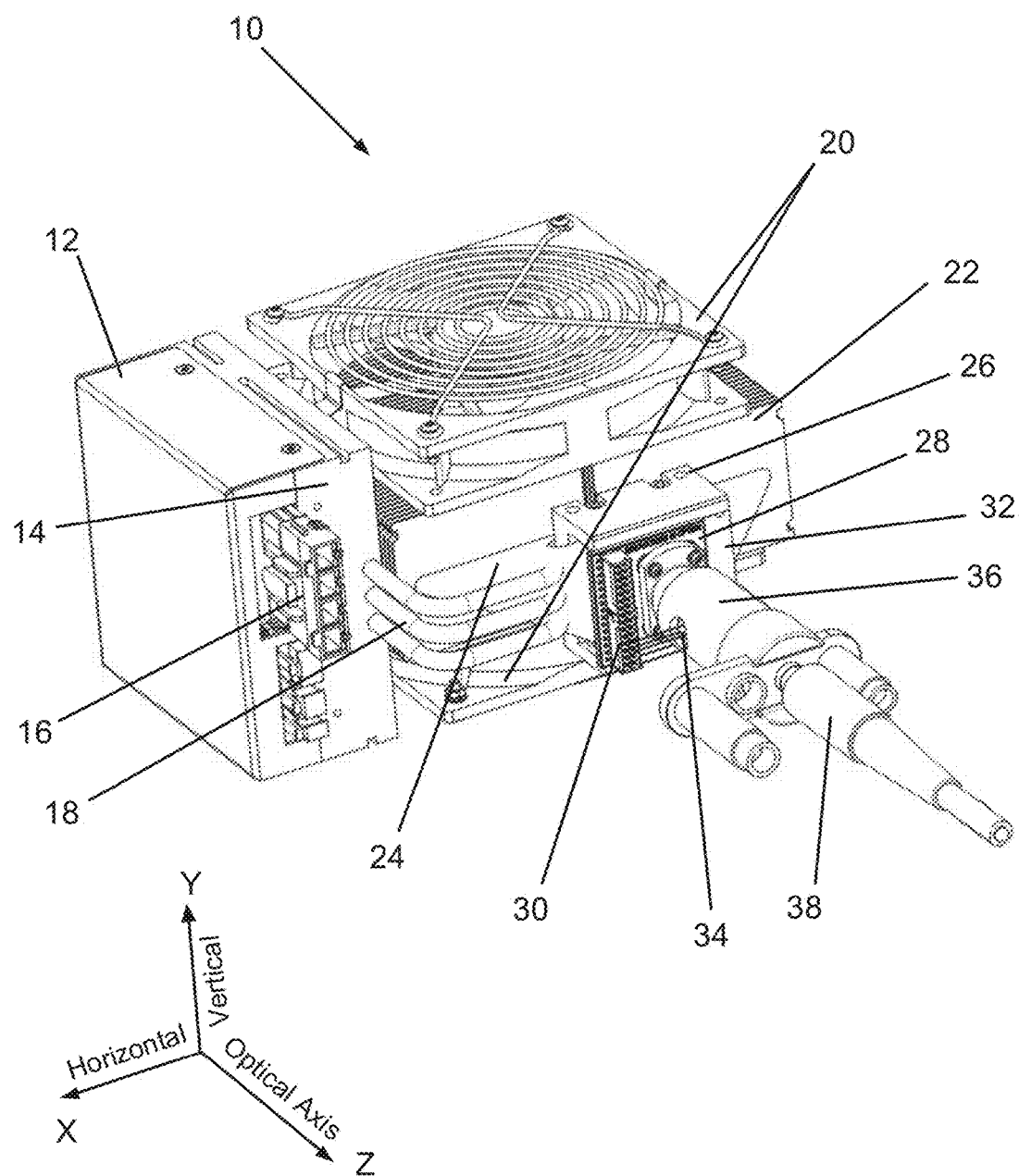
FIG. 1 is a diagrammatic isometric view of a preferred embodiment of a high radiance LED module comprising LED board with multi-color LED array, collection optic, optic housing, optical fiber coupler, heat sink and fan, and LED current driver and controller.

Referring now to FIG. 1, there is shown a diagrammatic, isometric view of the outside of a preferred embodiment of the high radiance LED fiber optic light source designated generally as system 10. The LED light source system 10 comprises an LED board 28 mated to optic housing 36, with output fiber bundle assembly 38 at its exit aperture, a photosensor 34 disposed in housing 36 to monitor output power of each LED color type, a heat sink plate 32 connected to heat pipes 18 and 24, in turn connected to thermal heat fin assembly 22 cooled by fans 20, and powered by a current source 12. An electrical connector 30 on the LED board 28 connects to the current source 12 by electrical connector 16. The current source and controller 12 is connected to heat sink 14 which is connected to the heat pipe assembly by heat pipes 18. The LED board 28 is defined to be in the XY-Plane and the output is directed along the Optical Z-Axis. A bracket 26 acts to hold the heat sink plate 32 to the heat pipe assemblies 18 and 24 and provides a mechanical interface between system 10 and an associated enclosure by means of mounting holes in top and bottom of the bracket 26.

Figure 2:
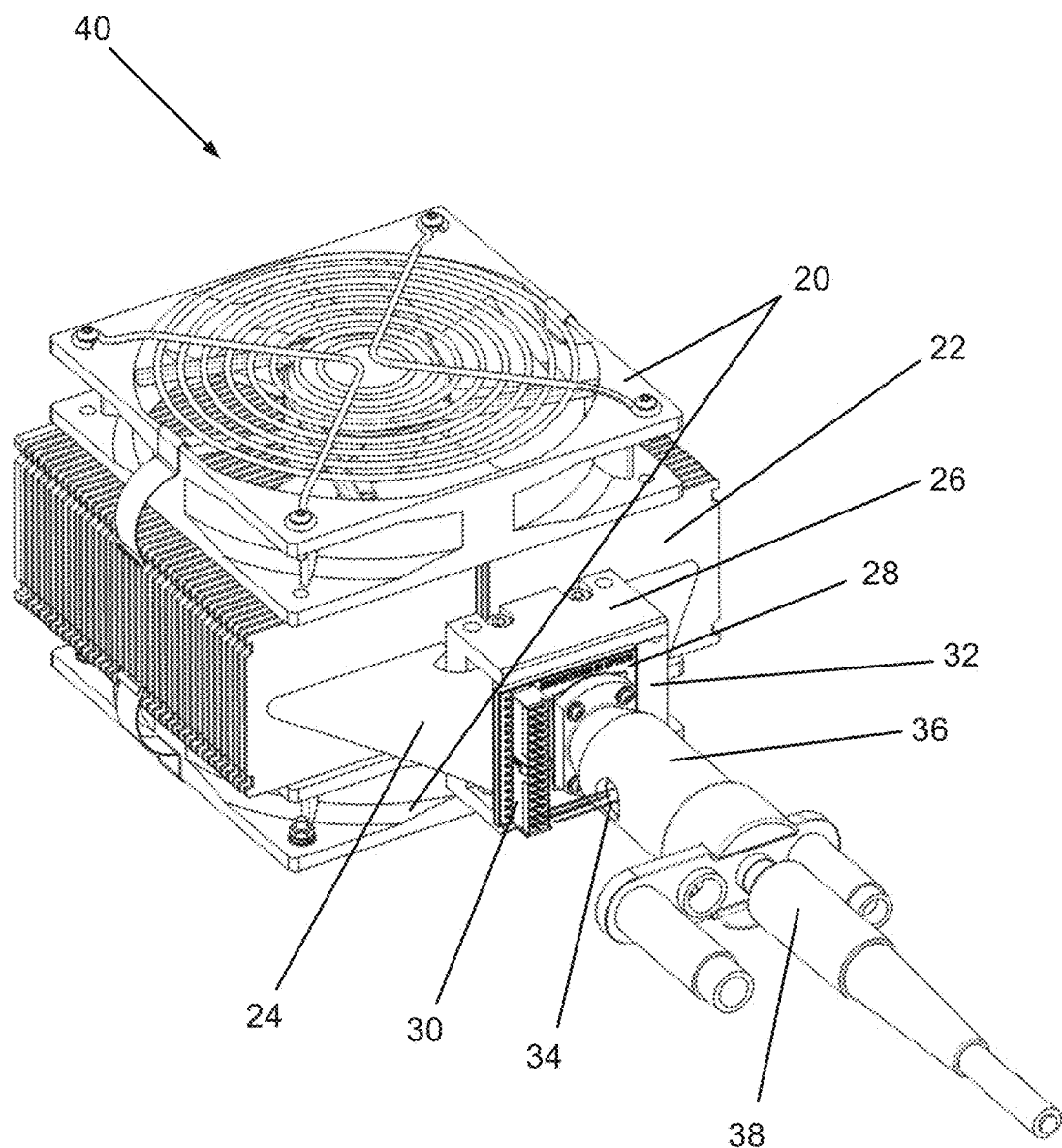
FIG. 2 is a diagrammatic isometric view of the system of FIG. 1 with the current driver and controller removed.

Referring now to FIG. 2, there is shown a diagrammatic isometric view of the system 40 which is equivalent to system 10 of FIG. 1 with the current source 12 and associated heat sink and heat pipes removed to show detail of the parts below including the fin assembly 22 and LED board heat pipes 24. The heat pipes are a widely used technology comprising copper tubes with low pressure water vapor inside with a heat source attached to a heat sink on one end and a finned radiator attached to the cold side where a fan blows air past the fins to reject the heat to the air. The heat pipes are characterized by extremely high effective thermal conductivity on the order of 5,000 (five thousand) W/m-K or more, which is more than an order of magnitude higher than pure copper, which is one of the most conductive metal materials available. Heat pipes are low cost and highly reliable and have been commoditized by the computer industry but are now being applied effectively to high power LED technologies such as in the system shown here.

Figure 3:
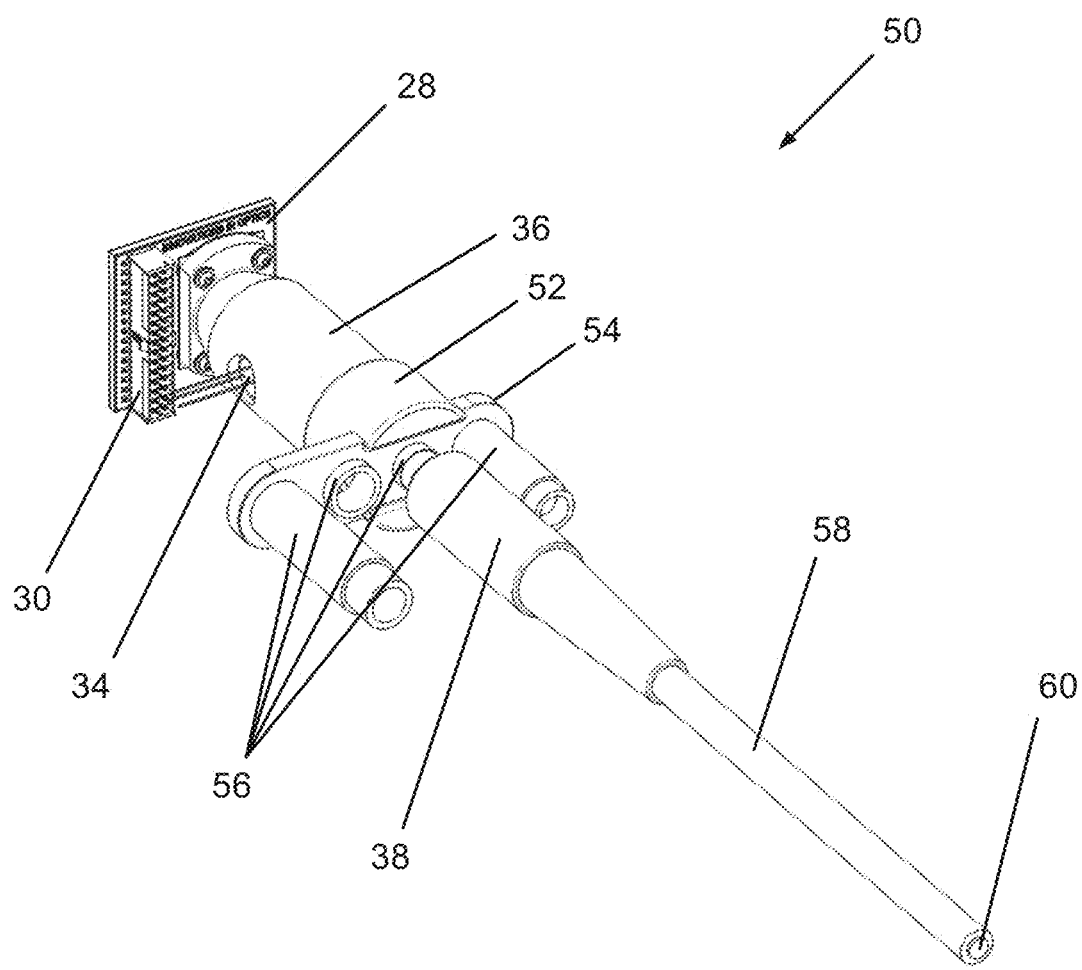
FIG. 3 is a diagrammatic isometric view of the system of FIG. 1 with the heat sink module and fan, current driver and controller removed.

Referring now to FIG. 3, there is shown a diagrammatic isometric view of the system 50 of FIG. 2 with the heat sink assembly removed to show more detail of the fiber optic interface 38. The fiber optic assembly 38 further comprises a fiber coupler holder 52 which attaches and aligns to housing 36 with four (4) common fiber coupler adapters including, but not limited to Stortz, Wolf, ACMI and Olympus, designated collectively as 56, interfaced to coupler holder 52 by adapter holder 54, and a fiber optic jacket 58 acting to protect optical fiber bundle 60 from damage.

Figure 4:
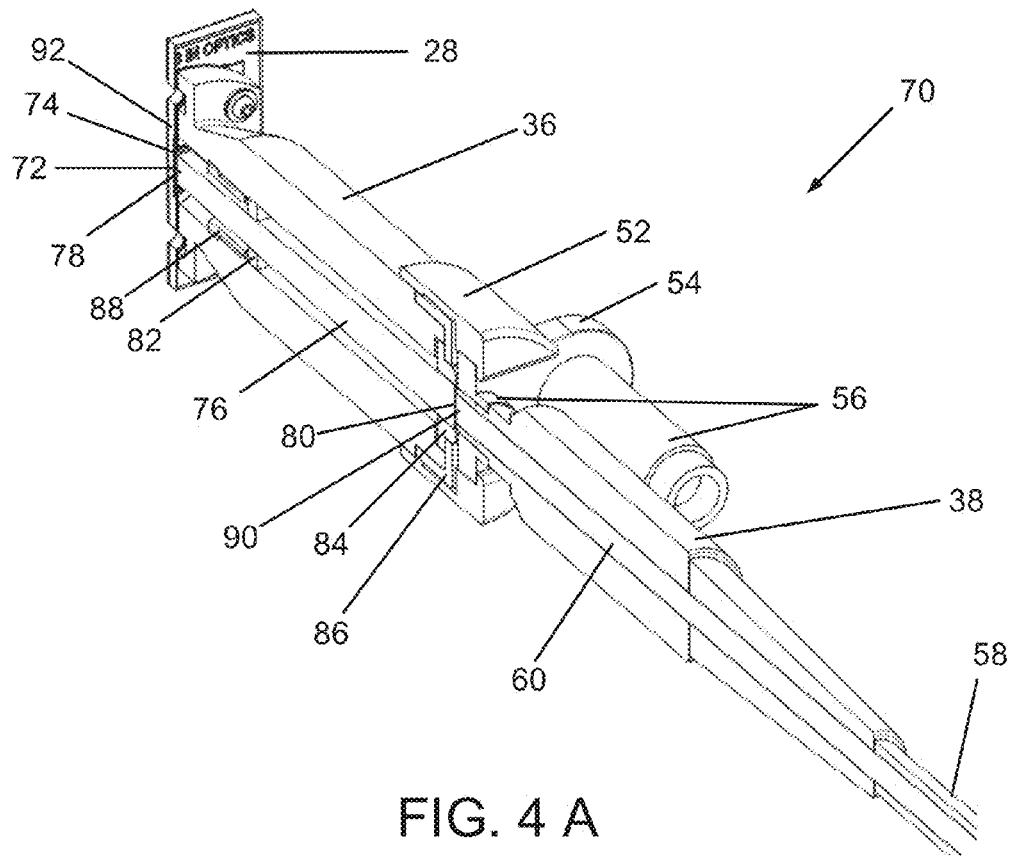
FIGS. 4 A and 4 B show diagrammatic isometric and side cross-sectional views of the system of FIG. 3, respectively, exposing detail of the LED board, tapered collection optic, optic holder and fiber optic interface.
Figure 4:
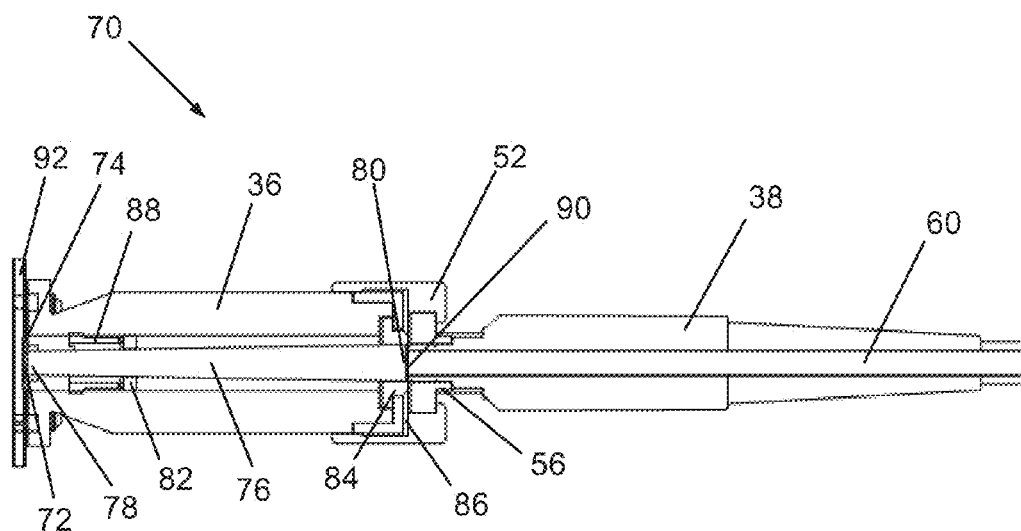

Referring now to FIG. 4A, there is shown a diagrammatic isometric cross-sectional view 70 of the system of FIG. 3, revealing the LED array 72 attached to diamond heat spreader 74 which in turn is mounted to LED board 28 by means of high conductivity solder, with the radiated optical power of the LED array 72 substantially collected by input aperture 78 of a tapered collection optic 76. The homogenized output emitted at output aperture 80 of tapered collection optic 76 is substantially reduced in divergence angle by the ratio of the input to output half sine angles, which is also referred to as the ratio of numerical apertures (NA). The numerical aperture is equal to the product of the index of refraction and the sine of the half angular extent of the optical power. Since the medium between the LED array 72 and the input aperture 78 is air, the index is unity. It is important that the medium between LED array 72 and input aperture 78 be air for two reasons. First, since most of the luminous power is derived from the white LED die that are already effectively index matched due to the silicone rubber that binds the phosphor to the LED die, they do not achieve significantly more output power efficiency by being further index matched. Secondly, since the Etendue is the product of the index of refraction squared, the emitting area, and the solid angular extent, the radiance at the output aperture is maximized by maintaining the input medium as unity index of refraction since that maximizes the die area. The optical power emitted by aperture 80 enters into the optical fiber bundle 60 at input face 90. The taper 76 is held in housing 36 by centering aperture 84 which in turn is held in by retaining ring 86. The housing 36, centering aperture 84, retainer 90, and fiber optic holder 54 are made out of aluminum in a preferred embodiment, but could be made out of other materials including, but not limited to, steel and engineering plastics. The LED board 28 is comprised of a metal core with laminated dielectric and copper foil layers to form a circuit board. The board is preferably made out of copper, having a high thermal conductivity on the order of 360 W/m-K which provides excellent thermal conduction and heat spreading and is manufactured to design specifications by The Berguist Company, of Chanhassen, Minn. Alternative board materials include aluminum, aluminum nitride, beryllium oxide, silicon, silicon carbide, graphite and polycrystalline CVD diamond as well as planar heat pipes, also referred to as vapor chambers. An additional advantage of copper is that it can be readily metalized with no additional dielectric coating required that would affect thermal performance so that the LED die can be directly attached to the copper, if desired, and also represents a surface that can be readily soldered to accept a heat spreader 74. The diamond heat spreader 74 is characterized by significantly higher thermal conductivity and thereby acts to spread the heat directly below the LED die array such that the heat flux entering the copper substrate 92 is substantially reduced, thereby decreasing the temperature difference, also referred to as Delta T ($\Delta T$), between the back side of the LED COB 28 and the top of the LED die array 72. The diamond heat spreader 74 is described in greater detail below. Taper retainer 82 acts to center the taper on the LED array 72 and also forces the taper in the forward direction toward output retainer 84 by a force applied by retaining nut 88. It is critical to make sure taper 76 is prevented from moving in the direction of the LED die to prevent damage to the wire bonds or LED die.

FIG. 4B shows a diagrammatic side view of the cross section system 70 of FIG. 4A. Taper 76 comprises a non-imaging optic that collects light at its input side 78 and emits light at its output side 80 which is highly uniform in the near field, that is, substantially near the output face 80 of the taper, the emitted light is characterized by relatively poor far field uniformity, that is, intensity pattern at a distance large compared to the output face dimensions of the taper, unless the taper is sufficiently long. There is a tradeoff between a practical length and far field uniformity as described below.

FIGS. 5A and 5B show a diagrammatic isometric view and a cross sectional view, respectively, of the system 100 comprising LED board 28, collection optic 76, housing 36, optic retaining components 84, 86, 82, and 88, photosensor 34, and emitting aperture 80. A multi-pin electrical connector 30 provides means to input current into the traces on LED board 28 and subsequently LED array 72. The photosensor 34 has a field of view looking transverse into the side of the taper 76. The small but finite scattered light from each LED die reaches the photosensor 34 with sufficient intensity as to provide a photosignal to monitor the optical power of each of the four wavelength groups in a preferred embodiment. If desired, a small dot of scattering material such as $TiO_2$ can be placed on the tapered optic 76 opposite photosensor 34 and held in place with a suitable transparent low index material, such as silicone, to result in higher scattering and sampling of light into photosensor 34 with negligible decrease in total output through aperture 80. The photosensor is of the well-known silicon PIN photodiode type with broad spectral response from ultraviolet (UV) through the near infrared (NIR) and is produced by many companies including Hamamatsu Photonics of Hamamatsu, Japan. An appropriately high gain-bandwidth and low noise transimpedance amplifier is used to convert the photocurrent into a voltage to be sampled by the closed loop control system described in detail below. Alternative embodiments use others means to sample the optical power including a photosensor array with individual bandpass filters corresponding to the approximate center wavelength of each LED color, a spectrometer which includes some type of dispersion element such as a prism or grating to image the input aperture onto a photosensor array and either connected directly or by means of a light pipe or fiber optic. Alternatively, the photosensor, or photodiode array can be placed directly on the LED board 28 by using a means such as fiber or optical light pipe, or mirrored light deflector to sample light from the location of the photosensor aperture.

Figure 5:
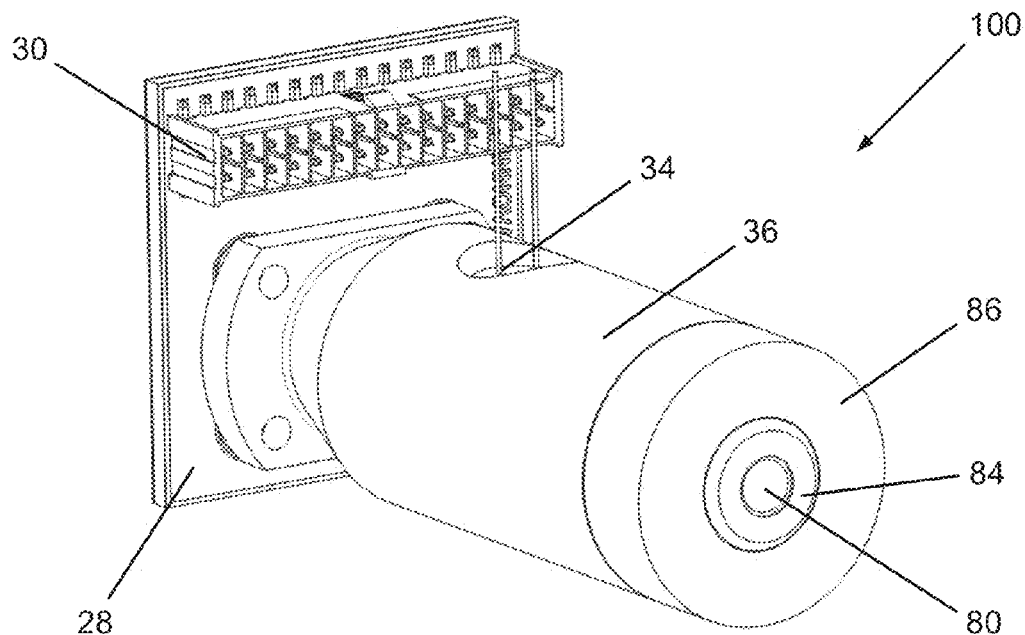
FIGS. 5 A and 5 B show diagrammatic isometric and isometric cross sectional views respectively, of the LED module of FIG. 1 showing details of the LED board, LED array, tapered optic and optic housing.
Figure 5:
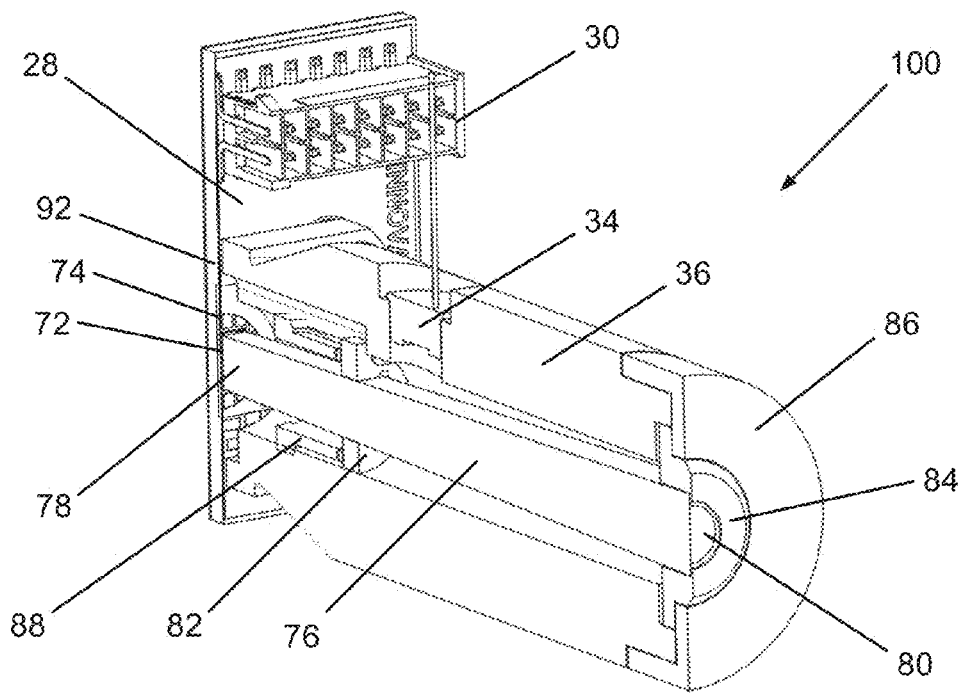
Figure 6A:
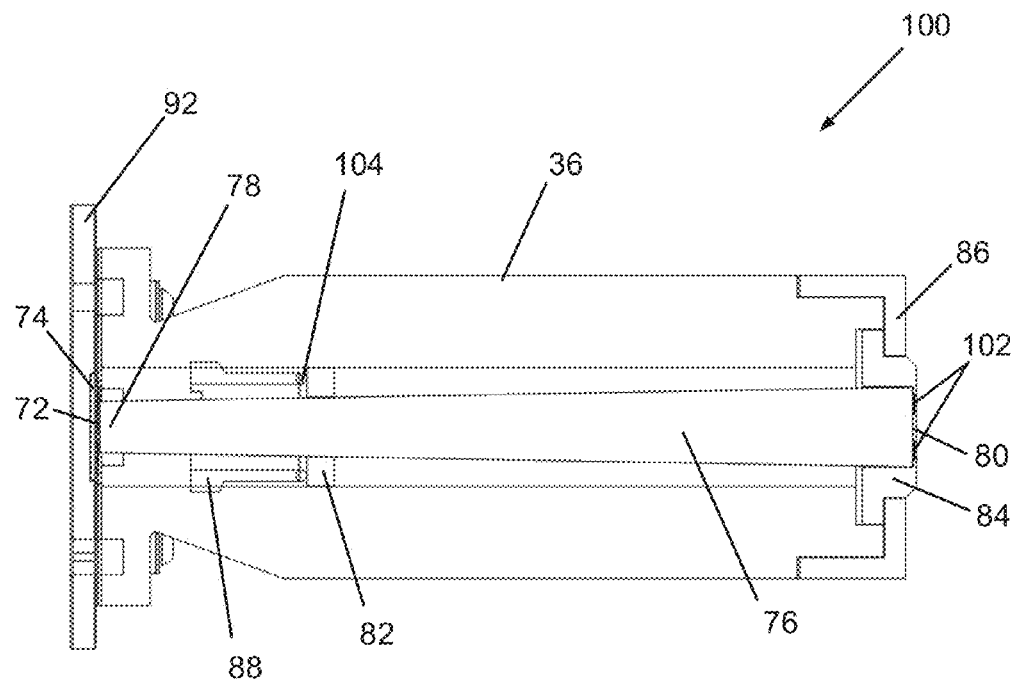
FIGS. 6 A and 6 B show cross sectional side views of the system of FIG. 5 A without and with optical ray paths, respectively.

FIG. 6A shows a diagrammatic cross sectional view of the system of FIG. 5A indicating more details of the optical components. The substantially circular output aperture 80 of the taper 76 is formed by means of a high specular reflective mirror surface 102 to match the square output aperture of the taper and have a diameter slightly larger than the mating fiber optic bundle aperture. In a preferred embodiment the mirror is vacuum deposited on the output face of taper 76, but can alternatively be placed on the adjoining face of taper retainer 84 or it can be a separate mirrored element, and would have a clear aperture diameter on the order of 5.2 mm to accommodate a standard endoscopic 5.0 mm diameter bundle. Alternatively, the system can be scaled to any practical size including 3.0 mm, which is also a standard for medical illumination and microscopy. The advantage of placing the mirror directly on the output face of taper 76 is that the mirror becomes part of the taper and represents fewer parts in the bill of materials (BOM) for the assembly. It is, however, more difficult to make a high reflectivity rear surface mirror than a front surface mirror, so a separate mirror may result in better performance. A compliant component 104 is shown disposed between taper retaining and centering component 82 and the associated threaded retainer 88 to take up any variations that may occur with time and temperature such as differential thermal expansion to assure that the taper 76 is always biased up against exit retainer 84 and that the taper 76 maintains a safe distance from the wire bonds on LED array 72.

Figure 6B:
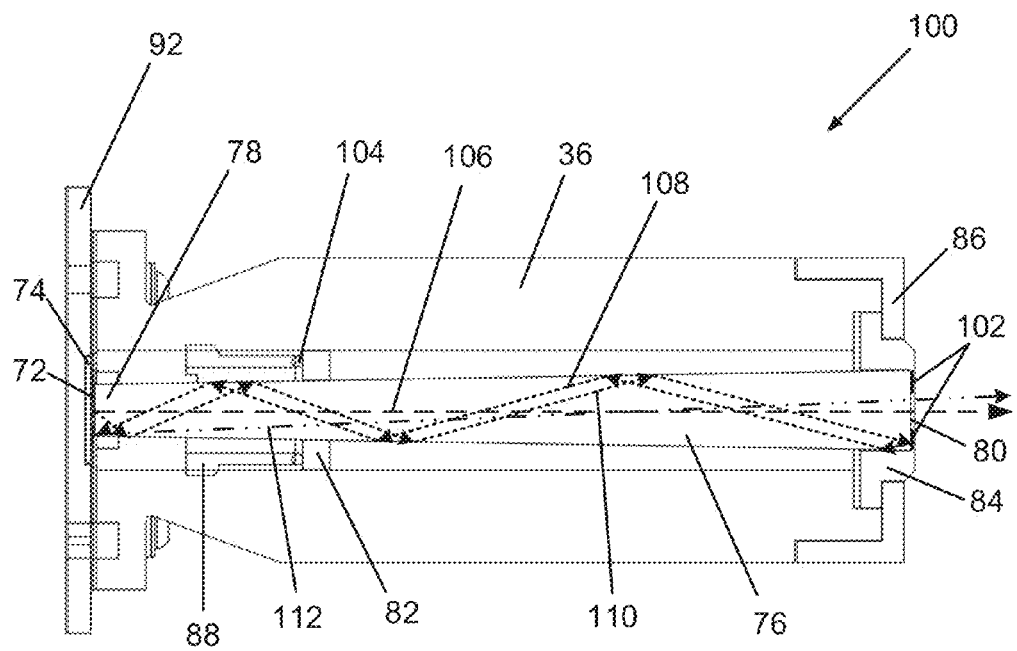

FIG. 6 B shows the system of FIG. 6 A with ray paths indicated. Ray path 110 is shown exiting from LED array 72 at an angle relative to the optical Z-Axis, striking the walls of taper 72 four times prior to impinging on mirror 102. At mirror 102 the ray reflects off the mirror, designated now as ray path 108 and is incident on the side of taper 76 five more times on route back to the LED array 72. Subsequently, the ray diffusely reflects back into the taper 76 and is directed out the taper aperture 80 in mirror 102 where the ray is free to enter a mated optical fiber bundle 60 of FIG. 4 A. In this manner, light entering the taper 76 from LED array 72 near the input aperture 78, exits the taper 76 at aperture 80 with a smaller far field angular extent and over the diameter corresponding to the non-mirrored central diameter 80 of the mirror 102. The decrease in far field angle is substantially consistent with the conservation of Etendue or alternatively stated with the conservation of optical invariant as described above. Rays that strike the mirror 102 are reflected back to LED array 72 and diffusely reflected off the LED die surfaces so that the optical power incident back on the LED die array 72 has an opportunity to exit out of aperture 80 thereby increasing the total radiance that results from an Etendue-matched system. Thus the LED array 72 is larger than what it would otherwise be for an Etendue-matched system that is matched in both angle and area. Due to the fact that there are finite losses in the system including Fresnel losses at the input aperture of taper 76, weak scattering and absorption within the bulk material of taper 76, in this case glass such as Schott N-BK7, Fused Silica, or other suitable low absorption and scattering optically transparent materials including plastics and silicone, and mirror reflectivity losses, each pass of rays back and forth between the mirror and LED array loses proportionally more light. Regardless, the increase in radiance can be significant and can be on the order of 150% to 200% or greater with respect to a single pass Etendue-matched system. Thus input power is traded off against radiance, also formerly referred to as brightness, but this is necessary to achieve equivalent or better performance relative to competing lamp technologies, such as a 300 Watt short arc Xenon lamp of the type manufactured and sold by Excelitas (formerly Perkin Elmer) of Fremont, Calif. as Cermax® xenon short arc lamps.

Figure 7:
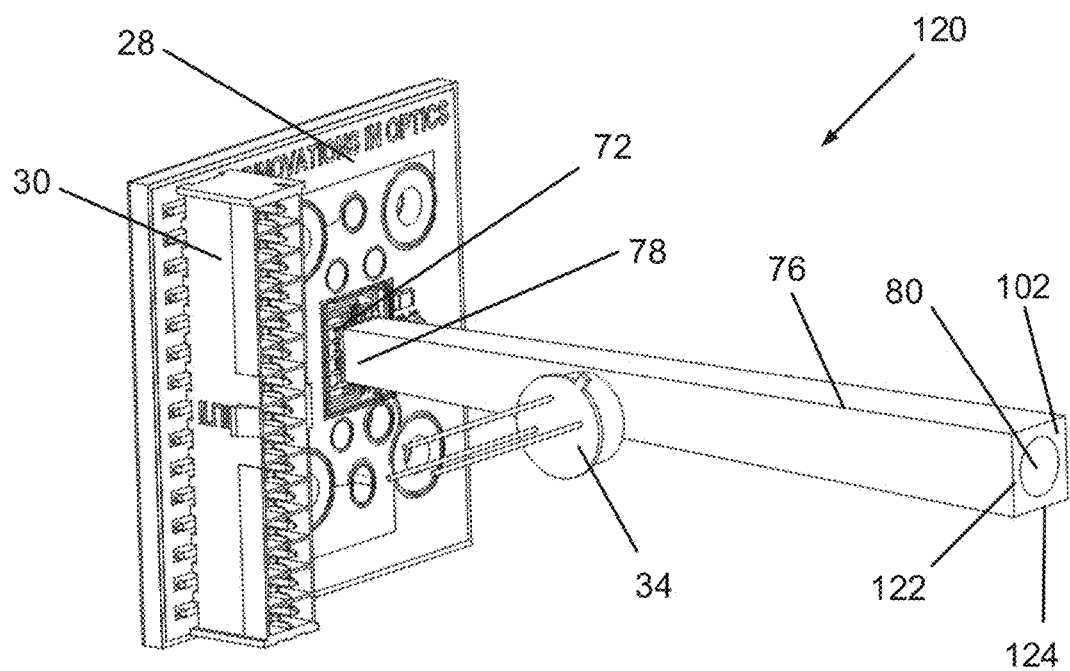
FIGS. 7 A and 7 B show diagrammatic isometric and top views, respectively, of the system of FIG. 5 A with the mechanical housing removed to show detail of the taper, LED board and photosensor.
Figure 7:
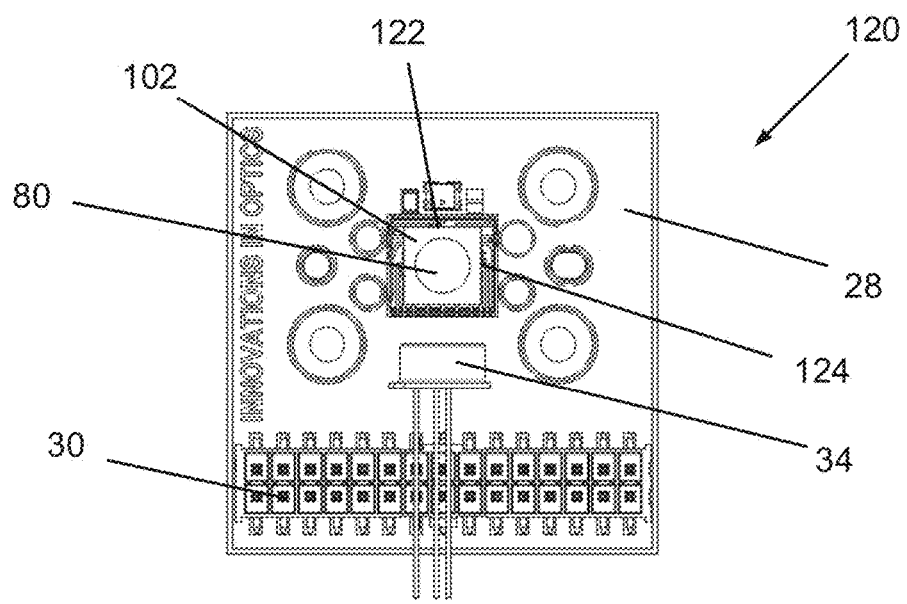

Referring now to FIG. 7 A, there is shown a diagrammatic isometric view of system 120 which represents the system of FIG. 5 A with the housing and optic retaining components removed to show greater detail of the LED board 28 and tapered optic 76 and associated reflective aperture 102. The photosensor 34 is shown with a direction of view pointed orthogonal to the optical Z-axis of tapered optic 76. The optic input aperture 78 is positioned in close proximity, on the order of one hundred to two hundred microns, optimally, from LED array 72. The output face with a square cross section having sides 122 and 124 is shown with a mirrored aperture 102 on its face to reflect light that does not exit aperture 80 to be directed back into the tapered optic 76 which by multiple reflections off the LED array and walls of taper 76 allows the light another opportunity to be emitted from aperture 80 into a fiber bundle or other optical components, thereby enhancing radiance. FIG. 7 B shows a diagrammatic top view of the system 120 looking directly along the optical Z-axis. The ratio of the area of circular aperture 80 to the area at the end of the taper defined by sides 122 and 124 is the order of 40%. Thus for an ideal system with no absorption or scattering losses, the radiance is improved by the order of 250%. The difference between the ideal 250% and the stated 100% to 200% increase in radiance is due to the real finite losses for scattering and absorption in the LEDs, glass, and mirror coatings.

Figure 8:
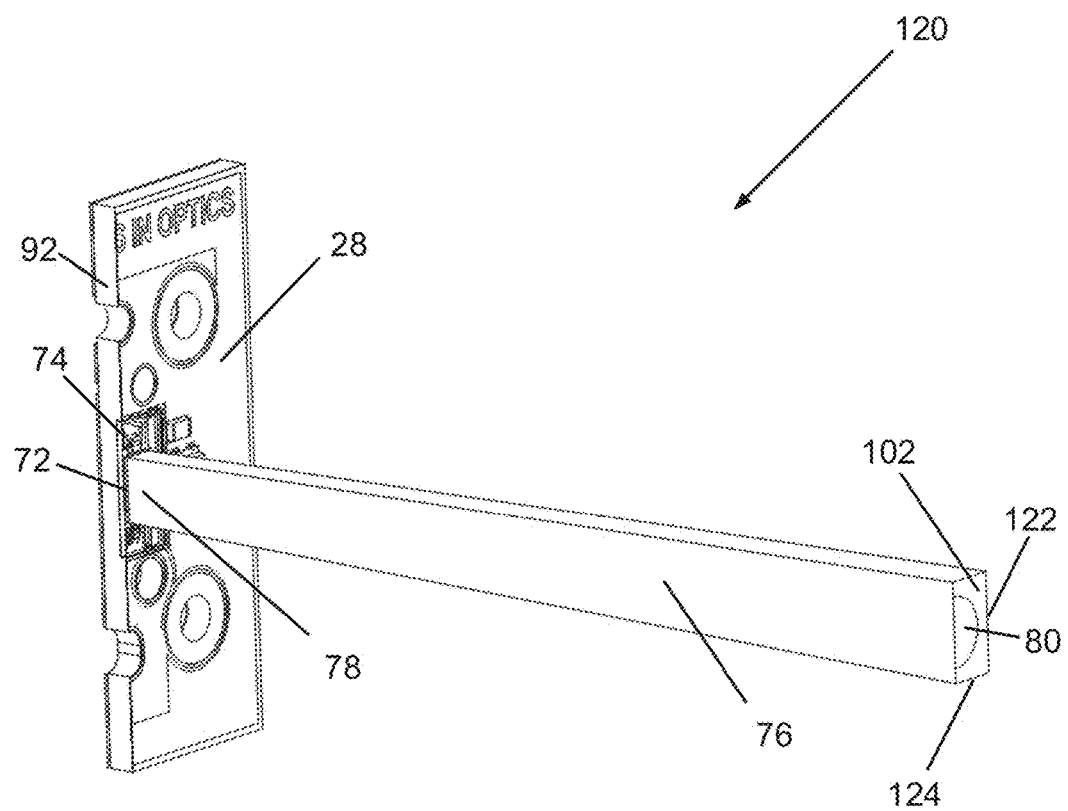
FIG. 8 is a diagrammatic isometric cross sectional view of the system of FIG. 7 A.

FIG. 8 represents a diagrammatic cross sectional view of system 120 of FIG. 7 A. The copper base material 92 of LED board 28 can be seen with diamond heat spreader 74 and LED die array 72 in close proximity to input aperture 78 of optical taper 76.

Figure 9:
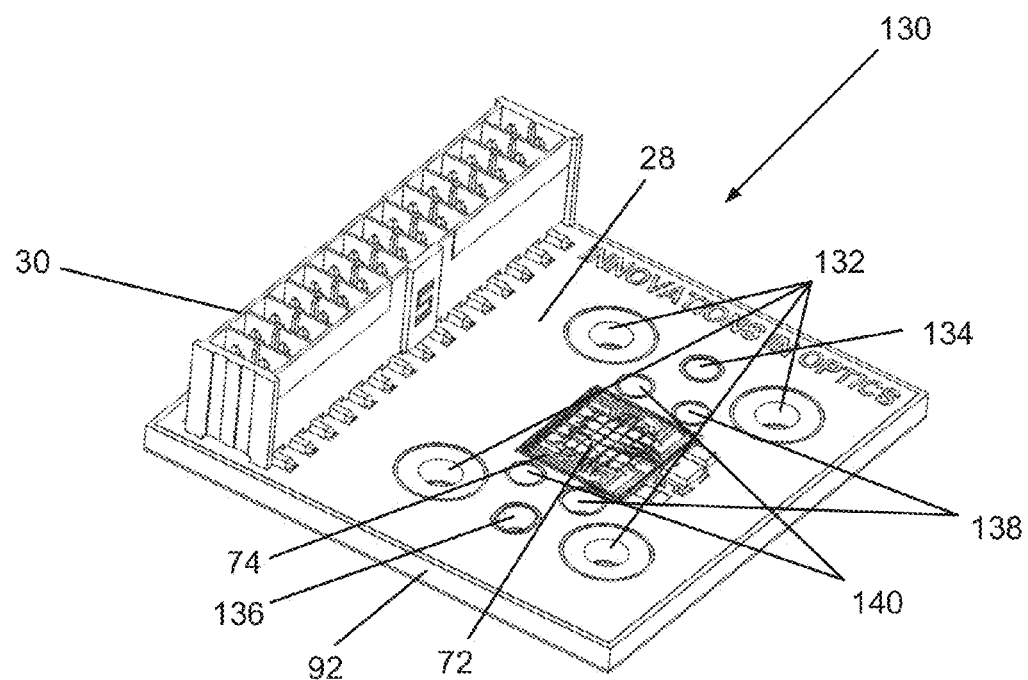
FIGS. 9 A and 9 B show a diagrammatic isometric view and a diagrammatic isometric close up view of the LED board and LED die array of the system of FIG. 5 A, respectively.
Figure 9:
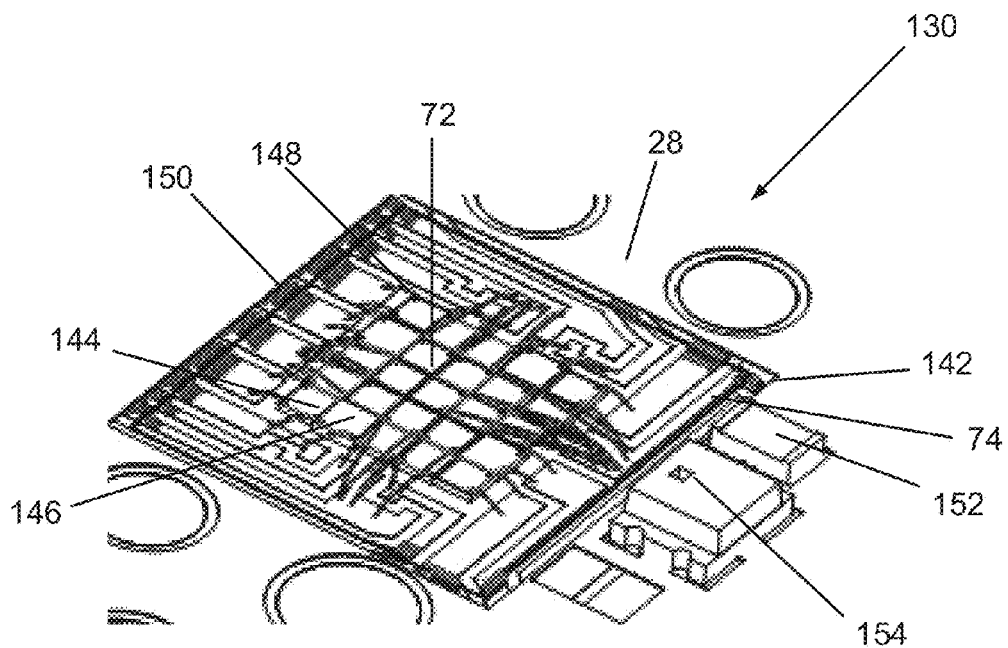

FIG. 9 A shows a diagrammatic isometric view of the LED board assembly system 130 from the system 100 of FIG. 5 A with the optic and optic housing components removed to reveal the underlying detail of the LED board assembly of a preferred embodiment. The LED board 28 is comprised of a copper base layer 92 which acts to spread heat between the back side of the upper diamond heat spreader 74 soldered to it and to which LED array 72 is directly attached by high thermally conductive solder and heat sink plate 32 of the system of FIG. 2. The top layers of LED board 28 are comprised of one or more electrically insulated dielectric layers and copper foil layers to act as traces to bring current from the connector 30 to the LED die array 72. Each LED die color is attached to different traces to enable separate current control of each color for control of the composite white light or colored illumination to have optimal control over correlated color temperature (CCT) and color rendering index (CRI). Alternatively, the different traces allow control of any individual color for purposes of achieving higher contrast of biological tissues due to differential absorption of hemoglobin or other intrinsic or extrinsic contrast agents, or for fluorescence imaging, or deep tissue imaging in the near infrared. For example, green or blue-green light only, results in higher contrast of hemoglobin relative to broad white light illumination due to the spectrally selective absorption of hemoglobin. Blue light only, for example, can be used with associated emission filters on a camera, or eye glasses for direct view of longer wavelength fluorescence emission of either intrinsic or extrinsic fluorophores, which is useful in identifying important biological conditions. The use of near infrared light only can be used to image through blood into deeper tissues due to the proportionally lower absorption and scattering of biological components between 700 nm and 980 nm, in particular the ability to image through blood. There are four holes 132 in board 28 that are used to allow screws to pass through to secure the board to a heat sink. Kinematic hole 134 and slot 136 are used to repeatedly and accurately align the LED board 28 to a mounting structure and heat sink, if desired. Two holes 138 are used for kinematic attachment of the mating optic housing to the LED board 28 to assure that the input aperture of the associated optic lines up accurately with the LED die array 72. Two holes 140 allow for a screw in the back side of LED board 28 to secure the housing 36 of FIG. 5 A to board 28.

FIG. 9 B shows a diagrammatic isometric close up view of the LED array 72 and associated components of system 130. Wire bonds 148 attach the top metallization layer of diamond heat spreader 74 to the bond pads on the individual LED die of LED die array 72. The LED die array 72 is comprised of multiple individual LED die 144 and 146 that may be of different sizes and of various specific spectral emission characteristics which are described below. Wire bonds 150 attach traces on diamond heat spreader 74 to traces on metal core board 142 in several places. A thermistor 152 is positioned close to the LED die array 72 to monitor temperature of the LED die array. Any offset between the actual LED junction temperature and thermistor 152 can be calibrated so that an accurate determination of junction temperature can readily be made. The temperature reading can be used in a number of ways including to modify current based on temperature for a degree of color control or to sound an alert if the temperature suddenly increases indicating a failure mechanism in the cooling system. An alternative method to monitor the output of each LED is to locate a photosensor 154 in close proximity to LED array 72.

Figure 10:
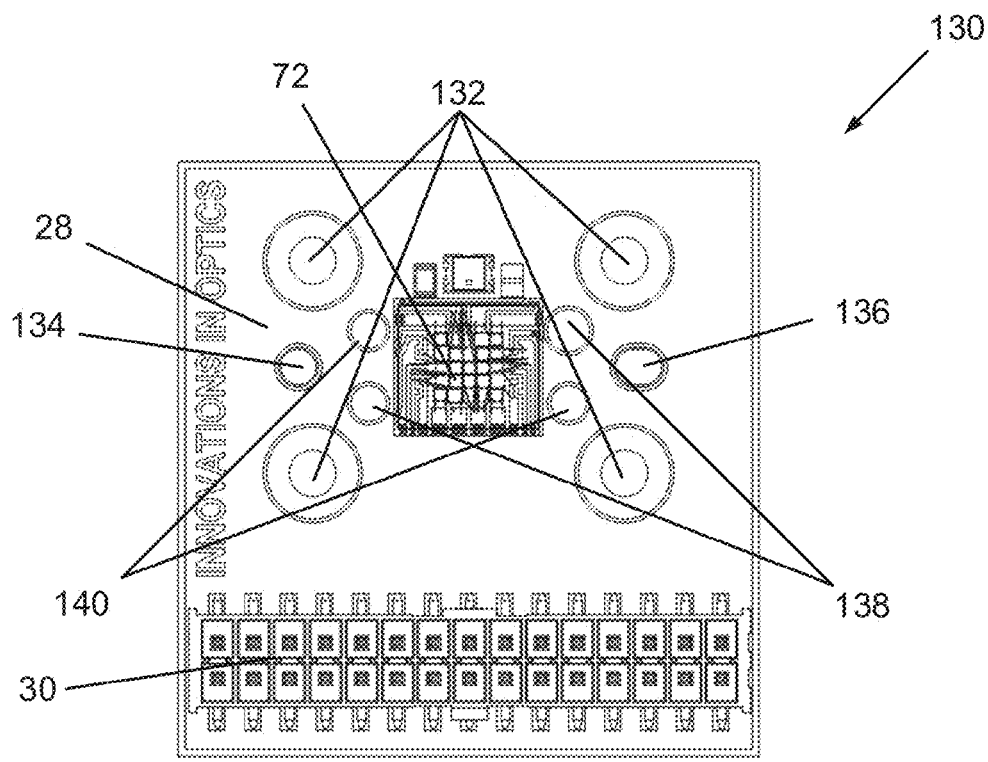
FIGS. 10 A and 10 B show diagrammatic top view and diagrammatic top close up view, respectively, of the LED board and LED die array of FIG. 5 A.
Figure 10:
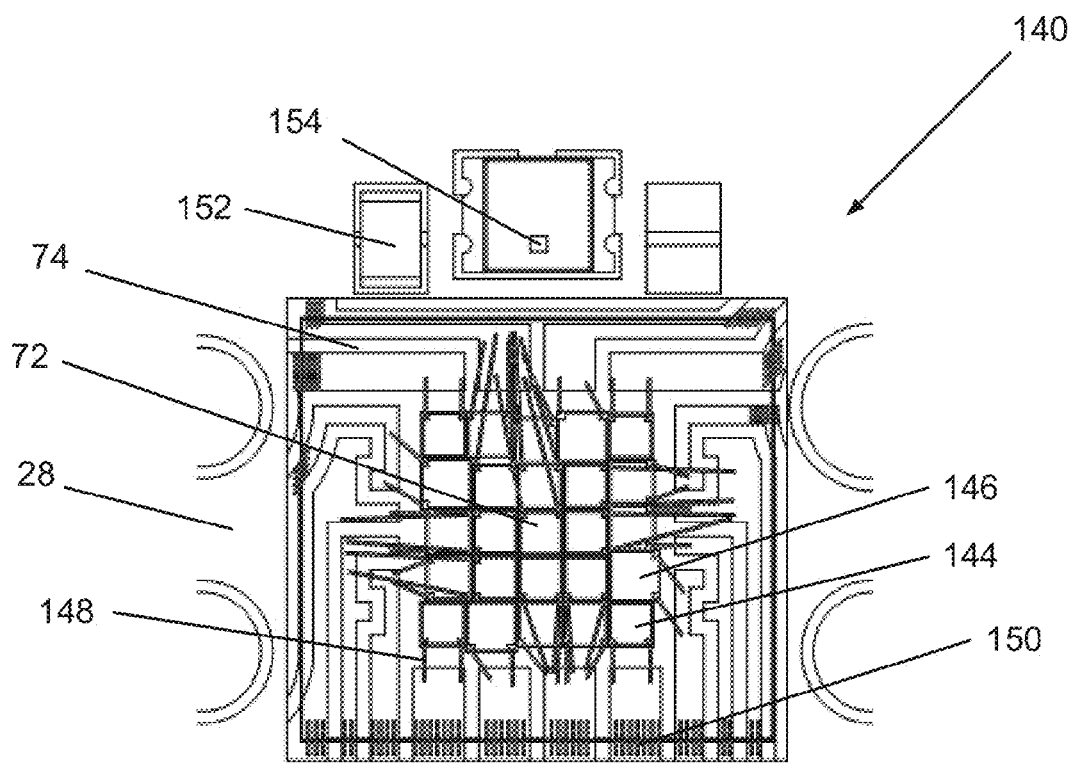

FIG. 10 A is a diagrammatic top view of the system 130 of FIGS. 9 A and 9 B. FIG. 10 B shows a diagrammatic close up view system 140 of the system 130 of FIG. 10 A. This preferred embodiment, designed for a standard 5 mm endoscopic fiber optic bundle, has a total of twenty five LED die comprised of blue die with phosphor, also referred to as white LED die, blue die corresponding to a similar peak wavelength as those used for the white die, but with no phosphor, blue-green die, and red die. The specific number of each is dependent on the desired CCT and the efficiency of each of the colors. In a preferred embodiment, there are fifteen white, four each blue-green and red, and two each blue LED die for a total of twenty five total die. The LED die size is the industry standard on the order of one millimeter on a side and vary in thickness between the order of 100 µm and 250 µm. The minimum gap thickness between the LED die array 72 and the taper 76 of FIG. 5 B is dictated by die height and wire bond height to be the order of 100 µm to 200 µm. The LED die are close packed to maximize optical power density and system level radiance which necessarily requires that all the die are electrically tied together in common anode, which is the bottom contact of each LED die. Between color groups the LED die cathodes are distinct, however, within a group they can be connected together. It is best, however, to drive each LED die with a current source so that differences in forward voltage between individual LED die of the same color do not lead to differences in current density between the die, which can affect efficiency and lifetime. If, however, the LED die within a color group are binned closely for forward voltage, then it is generally acceptable to have common cathodes within a color group.

Figure 11:
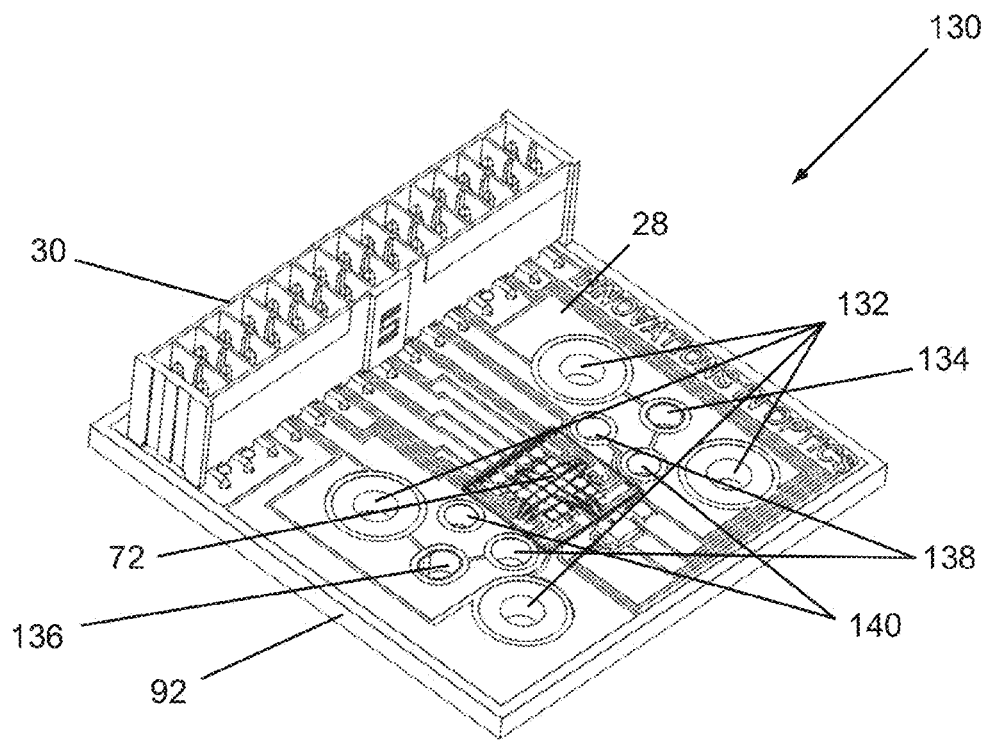
FIGS. 11 A and 11 B show diagrammatic isometric view and close up cross sectional isometric view, respectively of the system of FIG. 5 A with the mask removed to show the underlying circuit traces and detail of diamond heat spreader.
Figure 11:
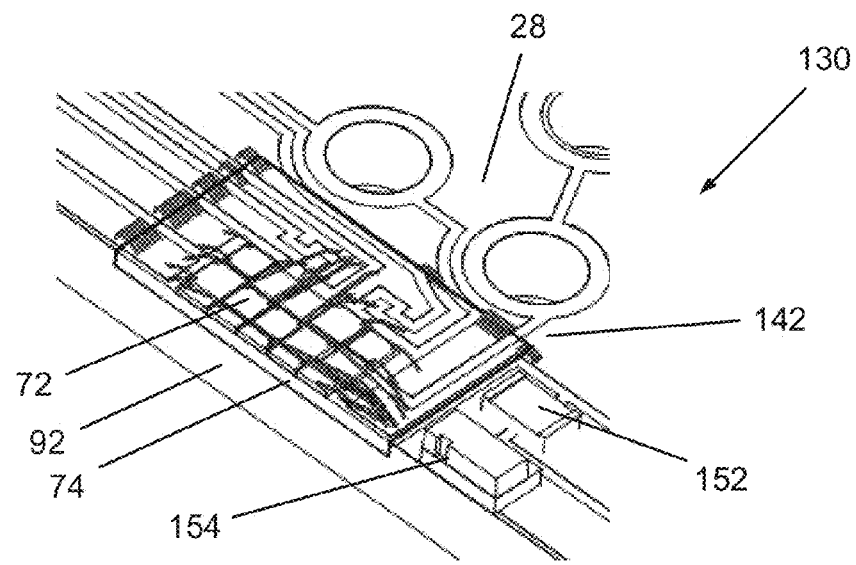

FIGS. 11A and 11 B show diagrammatic isometric view and diagrammatic close up cross sectional view, respectively of the system 130 of FIG. 9 A with the LED board 28 upper mask layer removed to show detail of the traces which make electrical connection with the top of the LED die. The inset of the diamond heat spreader 74 within a pocket of the copper board substrate is clearly indicated in FIG. 11 B. A high thermal conductivity solder substantially free from solder voids is desired between the bottom of heat spreader 74 and top of the pocket in base copper 92 to optimize thermal performance. Diamond heat spreaders are made from the process of chemical vapor deposition (CVD) and are characterized by very high thermal conductivity on the order of 1800 W/m-K in the plane of the spreader and the order of 600 W/m-K along the thickness direction, which in both cases is much higher than pure copper at 400 W/m-K. Companies such as AWIN Diamond Technology Corporation of Zhubei City, Taiwan produce such products commercially.

Figure 12:
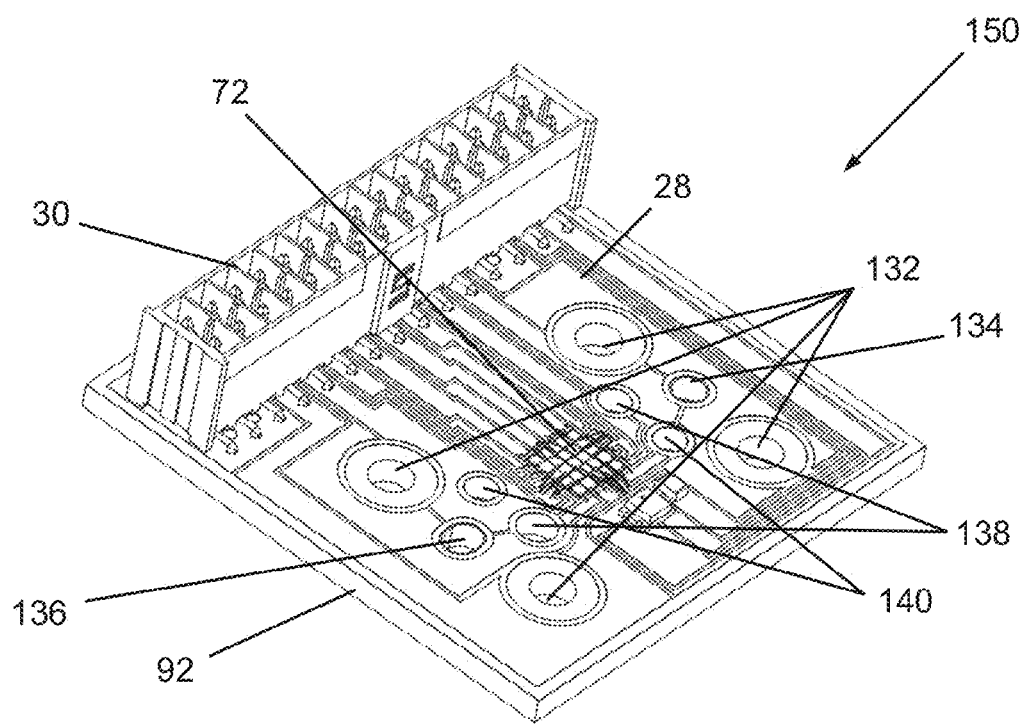
FIGS. 12 A and 12 B show diagrammatic view and close up view, respectively, of an alternative embodiment of FIG. 5 A with no diamond heat spreader for which the LED die are directly attached to the copper substrate.
Figure 12:
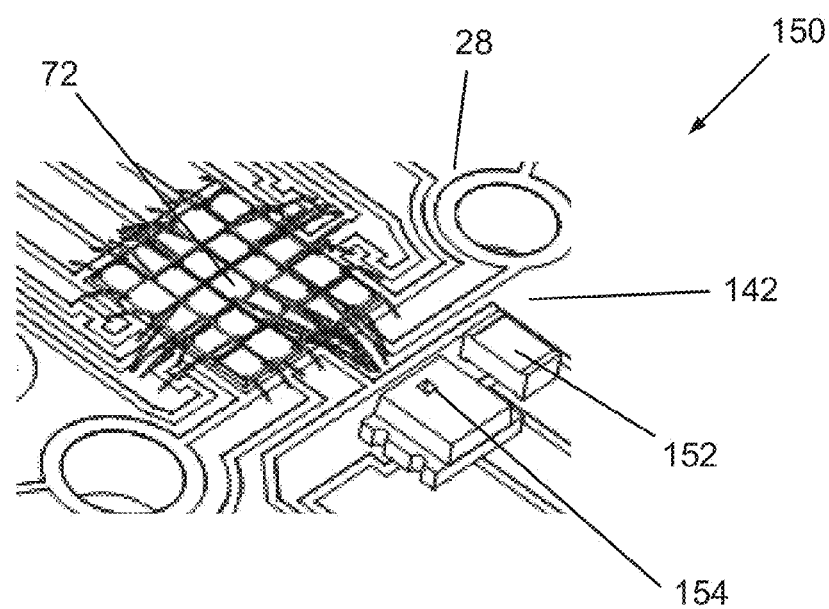

FIGS. 12 A and 12 B represent diagrammatic isometric view and close up view, respectively, of an LED board system 150 which differs from system 130 of FIG. 9 A in that it contains no diamond heat spreader and the LED die are attached by solder directly to the base copper layer. While this does not work quite as well from a thermal perspective relative to minimizing LED die junction temperatures, this configuration represents a significant cost reduction due to the high cost of the diamond heat spreader. Otherwise, all components of the system 150 are identical to those of the system 130 of FIG. 9 A. Generally, the dielectric layer that covers the base copper layer is removed in the LED die array area by means such as laser ablation and then the copper base layer is coated with a metallization similar to that on the copper traces to allow LED die to be directly soldered to it.

Figure 13:
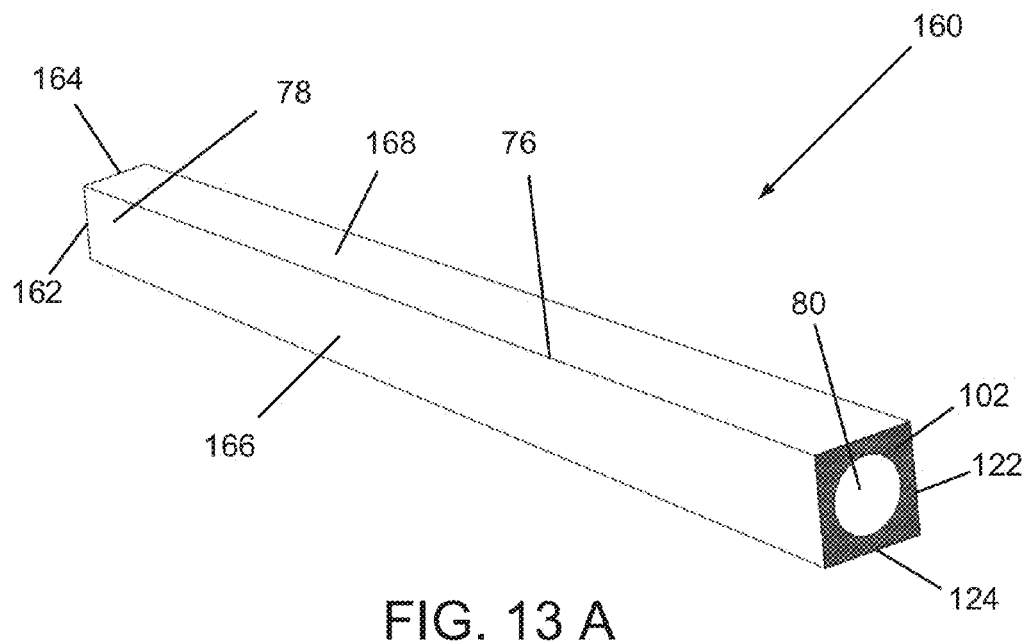
FIGS. 13 A and 13 B show diagrammatic isometric views of the tapered optic with reflective aperture of FIG. 4 A with solid and hidden lines, respectively.
Figure 13:
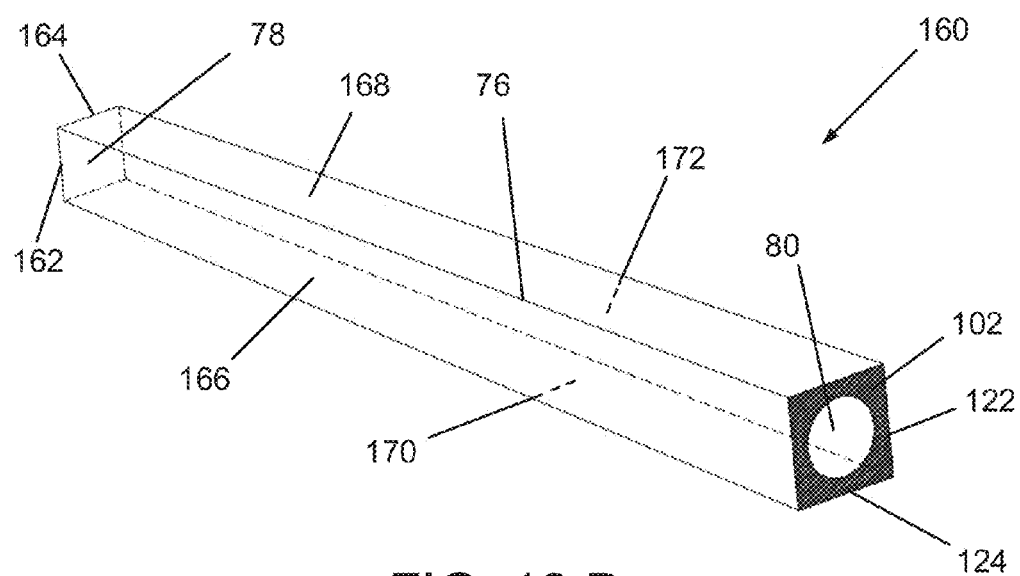

Referring now to FIGS. 13 A and 13 B, there are shown diagrammatic isometric and hidden line views, respectively, of a system 160 comprising optical taper 76 and end mirror 102. Straight walled sides 166, 168, 170, and 172 join smaller input aperture 78 comprised of square sides 162 and 164, and larger output face comprising equal length sides 122 and 124. The distance between input and output face affects the degree of uniformity of light at output aperture 80 and the far field distribution due to any individual LED die or combination of LED die as is discussed in detail below. The diffuse reflectivity of GaN LED die, such as the blue and blue-green die, is typically on the order of 80%, that of white LED die is closer to high 90 percentages, with the exception of blue and shorter wavelength light, which is partially absorbed by the phosphor and then partially scattered forward as longer wavelength green and red light, and that of red LED die, is typically on the order of 60% or greater. Thus, the combination of a high reflectivity mirror coating 102 of greater than the order of 90% coupled with the high diffuse reflectance of the light by the LED die upon the light's return path off mirror 102 results in an increase in the radiance out of aperture 80. That is, the light that does not emit on a first pass toward exit aperture 80 has an opportunity to be redirected out of aperture 80 thereby increasing the power per unit area per unit solid angle emitted at aperture 80. A further benefit of this multiple pass light is that it further homogenizes both the near and far field distributions. In a preferred embodiment, the taper 76 is made of a low absorption, low cost glass such as Schott N-BK7. Any glass, crystalline material, plastic, or silicone could be used given it was characterized by sufficiently low absorption and scattering of the wavelengths emitted by the LED die. A disadvantage of plastics, however, relative to the other materials is that plastics will yellow with time due to exposure to ionizing photons at blue and ultraviolet wavelengths. As stated previously, the mirror 102 can alternatively be a separate element or can be combined with the taper holding component if it has a sufficiently high specular reflectance coating. Alternatively, a hexagonal cross section optic can be used in place of the square cross section of taper 76, or even higher number non-imaging homogenizers such as octagonal and higher, however as the number of sides increases the outer surface begins to approximate a circular cross section which does not do a good job of mixing radially in a similar manner to that of an optical fiber. An odd number of sides such as three, five and seven does a poor job of mixing as well. Furthermore, it is much easier and less costly to manufacture a four-sided taper in comparison to tapers of a greater number of sides. Additionally, it is easier to form a square array of LED die rather than a hexagonal, octagonal, or other number of sides, so a square cross section is the preferred shape. It is also possible to transition from a square on the input side to a round output side, but that is difficult to make and does not do as well at mixing.

Figure 14:
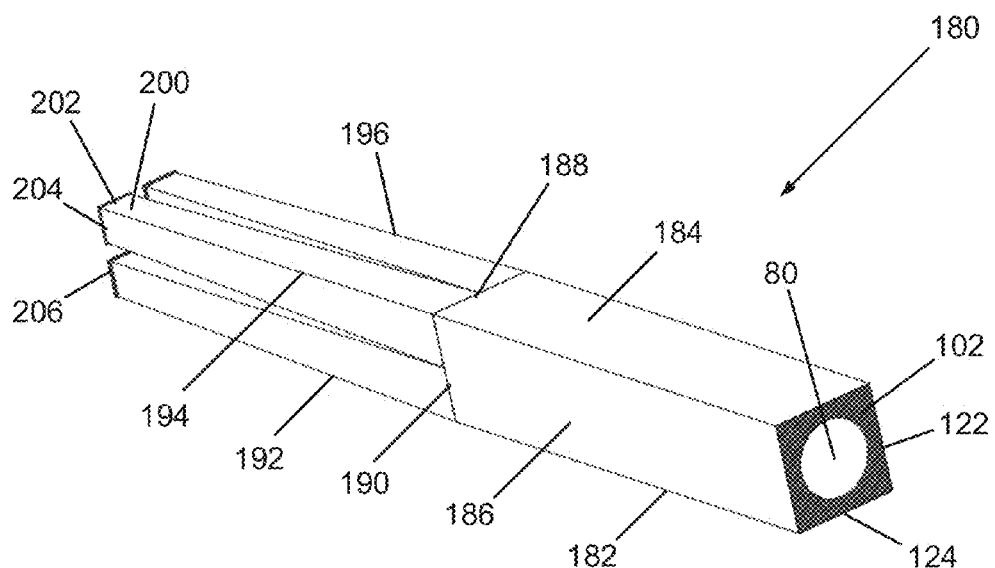
FIGS. 14 A and 14 B show diagrammatic isometric views of an alternative embodiment of a collection optic system comprising an array of 4 similar tapers, each taper coupled with a distinct LED array, and mutually coupled to a straight homogenizing light pipe, shown with solid and hidden lines, respectively.
Figure 14:
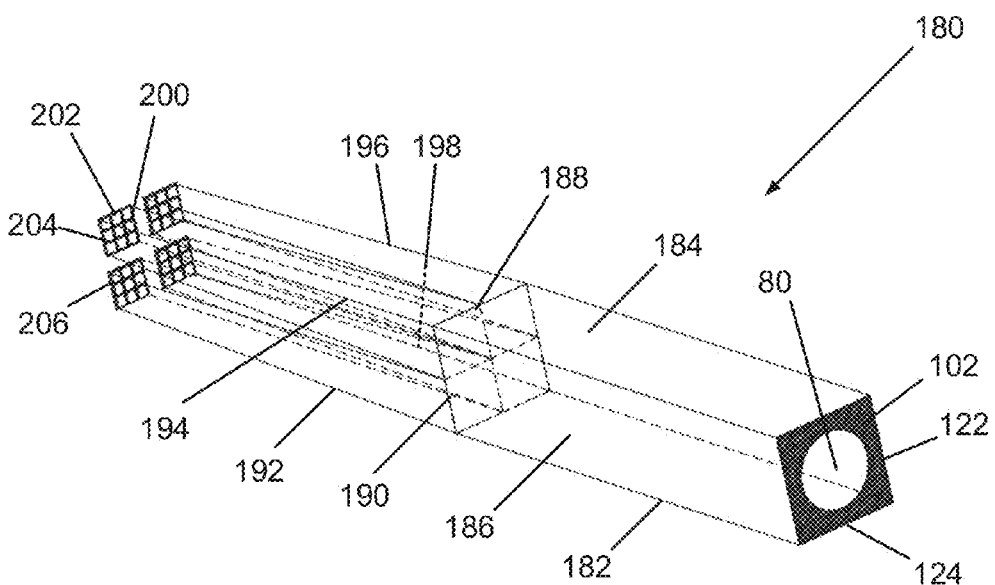

Referring now to FIGS. 14 A and 14 B, there is shown an alternative embodiment of a taper system 180 in diagrammatic isometric and diagrammatic isometric hidden line views, respectively, comprising four symmetric tapers 192, 194, 196 and 198, each comprising one quarter the output face area as that of taper 76 of FIG. 13 A and an adjoining straight mixing section optic 182 with the same end mirror 102 and aperture 80 as that of taper 76 of FIG. 13 A. A proportionally smaller input aperture 200 for each taper is mated to an LED array 206, one for each taper, with an area equivalent to one quarter that of the LED array 72 of the system of FIG. 7 A. The LED die arrays are shown as nine die arrays for each optic, so that the individual die size would be proportionally smaller to achieve the equivalent die area relative to the array of the system of FIG. 7 A. The ratio of input aperture size to output aperture size of each taper of FIGS. 14 A and 14 B is substantially the same as and length one half that of optical taper 76 of FIG. 7 A which would result in similar near and far field distributions at the exit apertures of each of the four tapers 192, 194, 196 and 198. The purpose of the non-tapered optical section 182 with straight sides 184 and 186 which are mutually orthogonal to each other and parallel to their opposite sides is to spatially mix the respective near fields of each taper output such that they are substantially homogenized at exit aperture 80. Mirror 102 reflects any light that does not exit aperture 80 to propagate back down all of the tapers, diffusely reflect back of their respective LED die arrays toward and have an opportunity to be redirected back out of aperture 80, thereby increasing the radiance in a similar manner as described for system 120 of FIG. 7 A. The advantage of system 180 over that of the system 120 of FIG. 7 A is that the LED die of each of the four LED arrays 206 are spread out spatially on the LED board they would attach to, similar to LED board 28 of FIG. 7, but with four pockets to accept the four die arrays, such that the heat flux into the LED board and heat sink is reduced. Consider, for example, the LED die at the center of LED array 72 of FIG. 10 B for which there are two rows of LED die on all sides. The central die would have a poorer thermal condition than the outer LED die since the only path for cooling that does not contain another LED die heat source is directly into the LED board, thus the center most LED die of array 72 of FIG. 10 B would be at a higher junction temperature thereby reducing thermally affected output power and lifetime. The primary advantages of system 180 over system 120 of FIG. 7 A are increased radiance and maintenance of illumination due to better thermal performance, however, the disadvantage is that of a more complex and expensive system so the choice of the best one to use depends on system performance and cost requirements. The system 180 may not be more expensive than the system 120 of FIG. 7 because the improved thermal performance due to spatially separating the LED die can allow for the elimination of the diamond heat spreader 74, which is an expensive component. Thus the system 180 may be less expensive and of equivalent or better performance.

Figure 15:
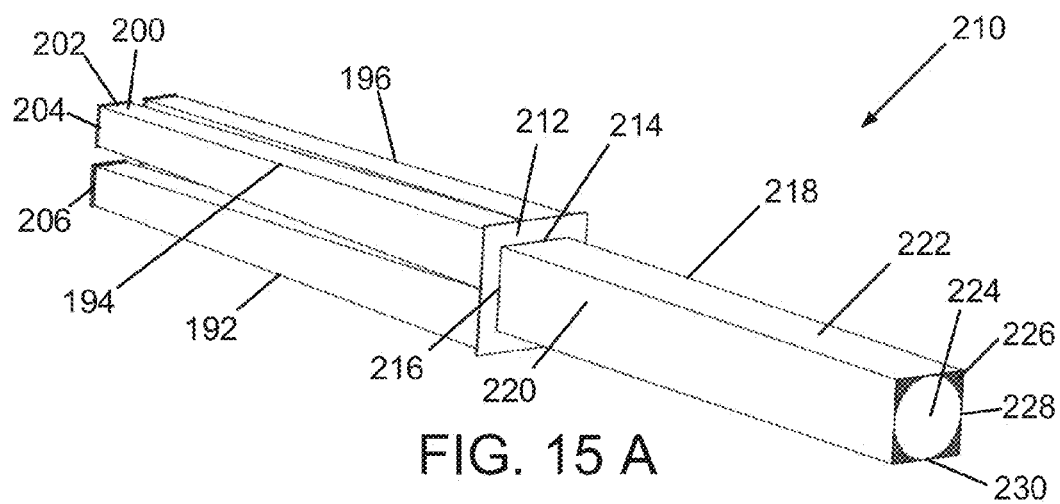
FIG. 15 A through 15 E show diagrammatic isometric views, side and end view of an alternative embodiment of a collection optic system comprising an array of 4 similar tapers, each taper coupled with a distinct LED array, a reflective mirror with apertures comprising four distinct spectral bandpass filters, and mutually coupled to a straight homogenizing light pipe shown with solid and hidden lines, respectively, and a detailed view of the reflective mirror with spectral bandpass filters.
Figure 15:
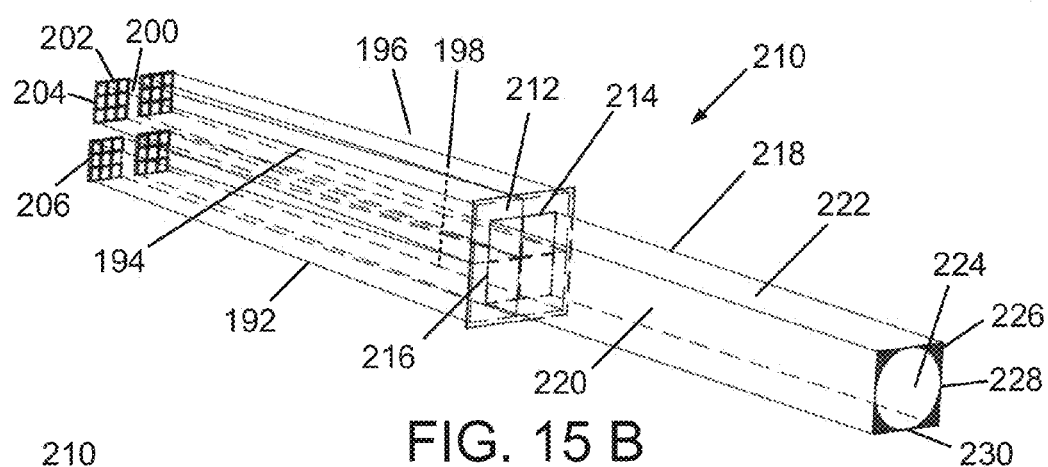
Figure 15:
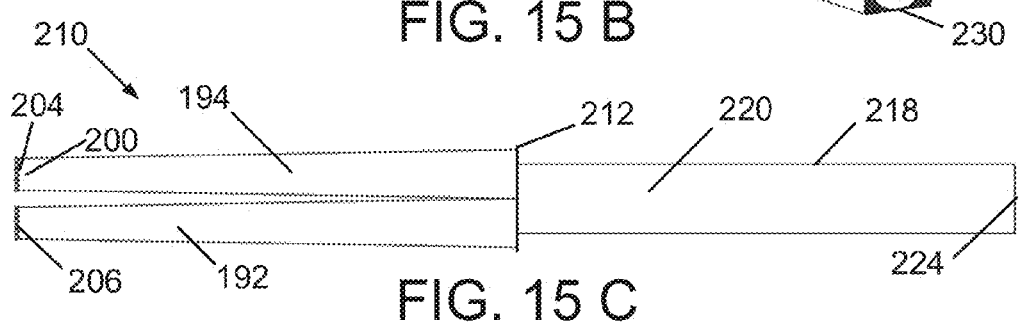
Figure 15:
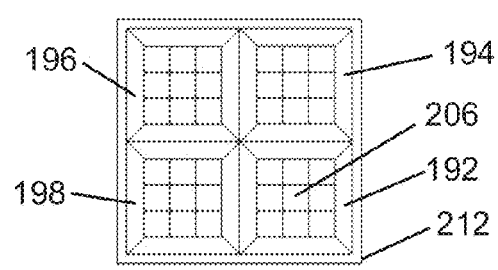
Figure 15:
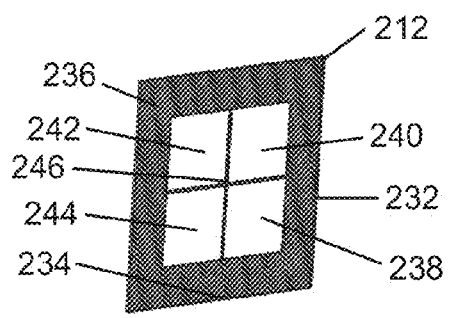

Referring now to FIGS. 15 A, 15 B, and 15 C, there is shown a system 210 in diagrammatic isometric, hidden line and side view, respectively, an alternative embodiment of the system 180 of FIG. 14 A. System 210 comprises LED arrays and tapers identical to those depicted in system 180 of FIG. 14 A, coupled, however, to a smaller straight walled square cross section optic 220 with output aperture 224. There is an additional element 212 which comprises, in a preferred embodiment and shown in detail in FIG. 15 E, a thin glass plate similar in thickness to a microscope cover slip on the order of 200 µm in thickness, with four individual apertures 238, 240, 242, and 244, which can either be uncoated, coated with an antireflection coating on one or both sides or comprise thin film dielectric spectral bandpass filters to optimize or modify the spectral output from each of the four tapers 192, 194, 196, and 198, respectively. The additional element also includes an outer high specular reflectance coating 236 which extends the area defined by side 232 and side 234 except for areas comprising the four apertures. FIG. 15 D shows an end on diagrammatic view of the system 210 showing that the sides of the element 212 extend beyond the extents of the taper output apertures to assure reflectance of all light exiting each taper output back toward their respective LED die with the exception of that light that exits the respective apertures of element 212. The aperture of each respective taper is not centered on the taper but is biased toward the inside edge. In this way an even larger taper and LED die array can be used with the same collection and homogenizing optical element 218 to produce even higher radiance at the expense of wall plug efficiency, if desired. This system would comprise a multi-spectral band source by coating each aperture 238, 240, 242, and 244, or alternatively, the output face of each of the individual tapers adjacent to the proximal face of element 212 with different narrow spectral bandpass filters. For example, in a preferred embodiment, filters used for fluorescence microscopy excitation can be used, with center wavelengths near 402 nm, 490 nm, 555 nm and 645 nm corresponding to well known fluorophores DAPI, GFP, Cy3 and Cy5 with spectral widths on the order on the order of 15 nm, 20 nm, 25 nm, and 30 nm FWHM, respectively, such as those produced by companies including Semrock, Inc. of Rochester, N.Y. Many other combinations can be used as well such as TexRed at center wavelength of 589 nm and width 18 nm FWHM, respectively. Since this system does not use any dichroic beam combiners as with other systems, the individual spectral outputs can overlap without issue of how close they are centered relative to each other, which is a limitation of systems incorporating dichroic beam combiners due to the finite cut-on spectral properties with angle of incidence which can transition from 10% to 90% transmission over as much as 10 nm to 20 nm or more, which imposes a minimum effective separation between spectral bandpass centers. It should be clear to those skilled in the art that the number of tapers and filters that can be input to combining and homogenizing optical element 218 is not limited to four each, but can be extended further as desired, to six, eight, ten, etc., or even reduced to two or three since there is no specific reason the tapers cannot have a rectangular cross section instead of square. The individual LED arrays and respective tapers would be proportionally smaller, however, since they share a common output Etendue (area). The losses in a conventional dichroic beam combined fluorescence light source, however, can be quite significant, so although such systems do not share the output Etendue, these systems suffer from greater system losses, complexity, size and cost relative to the system 210 of FIG. 15 A.

Figure 16:
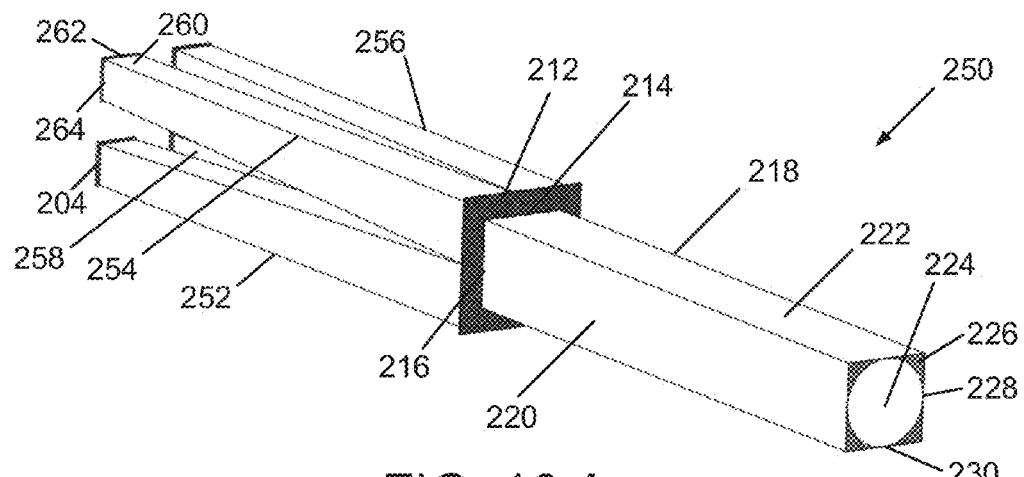
FIG. 16 A through 16D show diagrammatic isometric view, side, and end on views of an alternative embodiment of the system of FIG. 15 A, for which the tapers have input apertures displaced from their respective output apertures thereby improving thermal performance by increasing the center-to-center displacement between LED die arrays.
Figure 16:
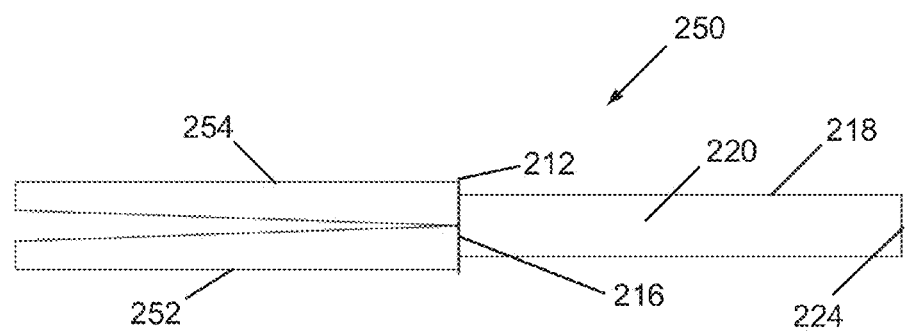
Figure 16:
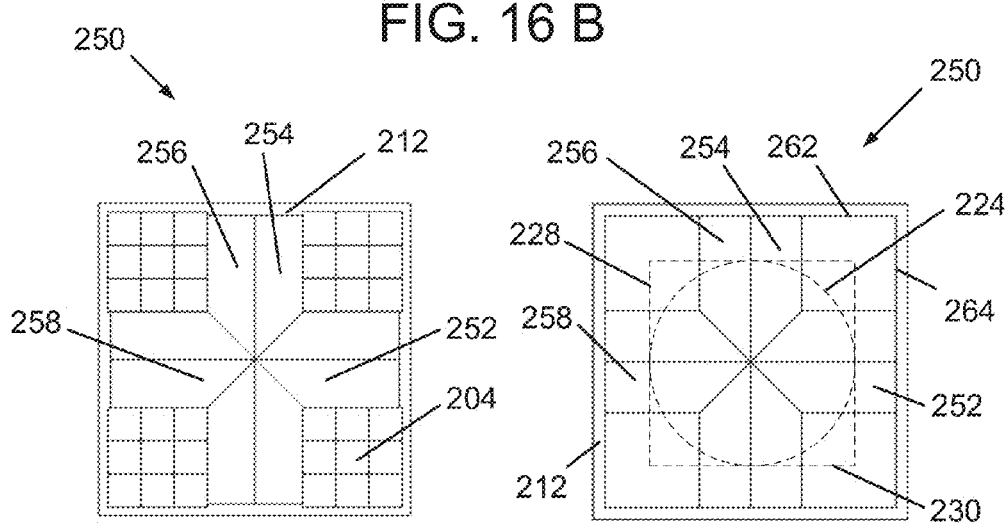

Referring now to system 250 of FIGS. 16 A, 16 B, 16 C and 16 D, showing diagrammatic isometric, side and two top views, respectively, of an alternative embodiment of system 180 of FIG. 15 A for which the four input tapers 252, 254, 256 and 258 replace tapers 192, 194, 196 and 198 of the system 210 of FIG. 15 A. The output far field and near field intensity distributions are primarily determined by the ratio of output to input aperture size and total length for a given taper such that both the near and far field intensity distributions of the tapers of system 250 are substantially similar to the tapers of system 210. However, since the position of the centers of input and output apertures is displaced in the plane of the aperture looking down the Z optical axis away from the system's center, the individual associated LED die arrays are displaced such that the distance between them for system 250 is greater than that of system 210. This increased distance between respective LED die arrays further improves thermal performance, so that there is a progression in improved thermal performance moving from system 180 of FIG. 14 A, to system 210 of FIG. 15 A, to system 250 of FIG. 16 A. This results from the fact that the greater distances between individual arrays on the respective copper metal core LED boards results in improved thermal spreading of the heat so that the heat flux going into the associated heat sink is reduced which leads to a lower temperature difference ΔT between the LED die junction and the respective heat sinks. This results in improved temperature affected intensity and lifetime for the LED die in each respective LED die array. FIGS. 16 C and 16 D show top rear diagrammatic views of the tapers 252, 254, 256 and 258 with and without LED die arrays 204 showing, respectively, indicating that the input aperture is displaced relative to the output aperture such that the two apertures share two orthogonal sides. It should be clear to those skilled in the art that the input apertures can be displaced even further off center, however, as the displacement increases beyond that indicated, the length of the taper would increase in order to have similar output from the apertures of mirrored aperture 212. The reflective aperture of element 212 extends between the outer square edge of element 212 and the outer edge of the square dashed line. The mirrored aperture 226 of element 218 which results in output aperture 224 is reflective between the outside of the dashed circle and inside of the dashed square, which amounts to approximately 25% of the area of the output face of combining and homogenizing optical element 218 which is identical to its function in system 210 of FIG. 15 A. In sum, the only significant difference between system 210 of FIG. 15 A and system 250 of FIG. 16 A is that system 250 has input taper apertures decentered from the central optical and mechanical axis, thereby improving thermal performance further due to improved heat spreading.

Figure 17:
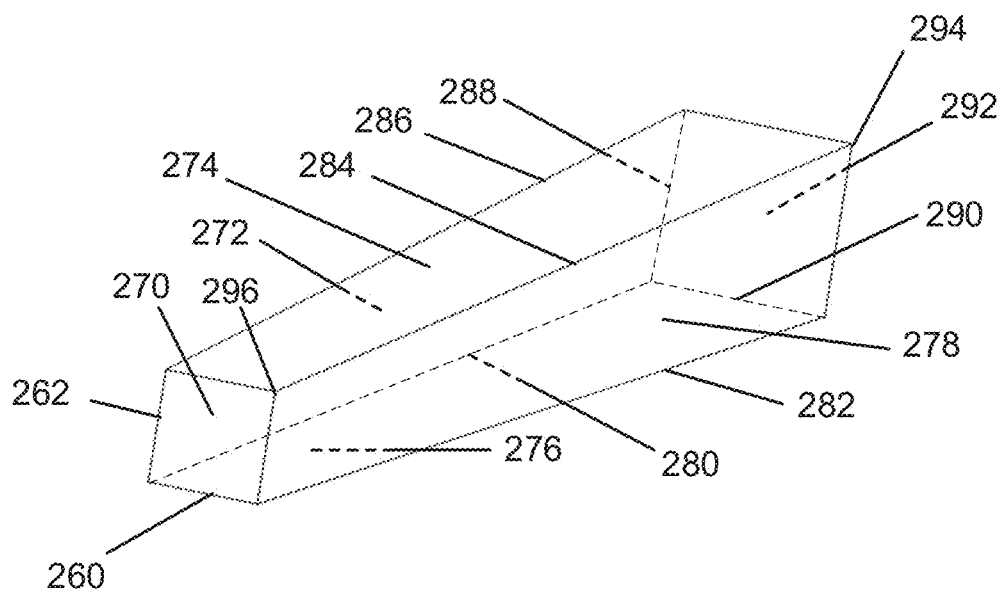
FIGS. 17 A and 17 B show hidden line diagrammatic isometric view and end on view, respectively, of the taper of FIG. 16 A.
Figure 17:
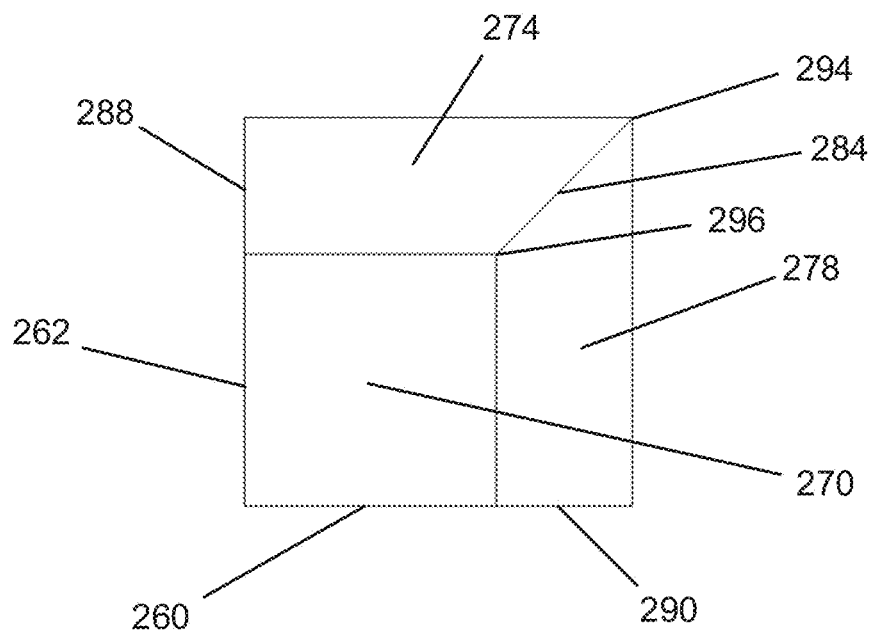

FIG. 17 A and FIG. 17 B show greater detail of one of the four identical tapers, in this case taper 254 of the system 250 of FIG. 16 A, in diagrammatic isometric hidden line view and top rear view respectively. Walls 272 and 276 of FIG. 17 A are both mutually perpendicular to input aperture 270 and exit aperture 292. From top view FIG. 17 B, input aperture edges 260 and 262 line up with output aperture edges 290 and 288, respectively. Sides 274 and 278 are tilted with respect to end faces and the two sides 274 and 276. The degree to which input aperture 270 is shifted along a line extending, with reference to FIG. 17 B, from apex points 294 to 296, corresponding to the projection of edge 284, can vary. The further away these two points are, the further the four apertures through which the four respective LED arrays enter the tapers 252, 254, 256, and 258 are, the better the thermal conditions become. There is a limit to how far beyond the distance shown in FIG. 17 B the aperture centers can be displaced relative to maximizing overall performance. For example, if the displacement exceeds the order of 5% of the taper length, then the amount of light exiting the reflective aperture of element 264 begins to decrease, which begins to reduce the benefit achieved by displacing the input apertures.

Diagrammatic top view system 300 of FIG. 18 A shows the mirrored aperture 226 looking down through the transparent tapers from their input aperture side. The element 212 of FIG. 18 B is not shown in FIG. 18 A for clarity. The element 212 which can also be made out of a transparent material such as B270 glass has a reflective mirror deposited on one face except in the central aperture area 302 which passes the light from each respective adjoining taper. Mirrored area 212 is not shown with the thin cross section in the middle, which is optional, depending on taper alignment and coating imperfections. System 310 of FIG. 18 C shows a top transparent diagrammatic view of system 250 of FIG. 16 A with the LED die arrays not shown. This shows the details and relative positions of the two mirrored apertures 212 and 226.

Figure 19:
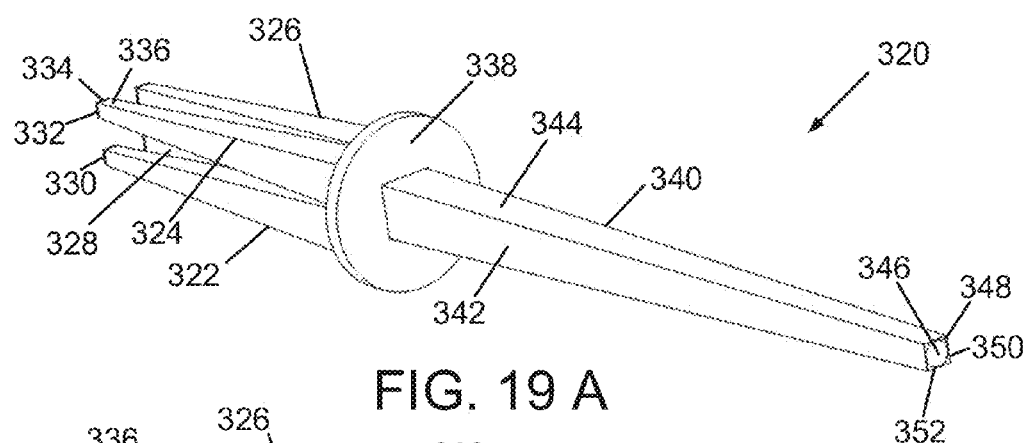
FIG. 19 A through 19 E show diagrammatic isometric, isometric hidden line, side, and end views with and without LED die, respectively, of an alternative embodiment of the system of 15 A with increased taper output size for lower far field angle for incorporation of bandpass filters with sharper spectral response, mirrored aperture and reverse taper.
Figure 19:
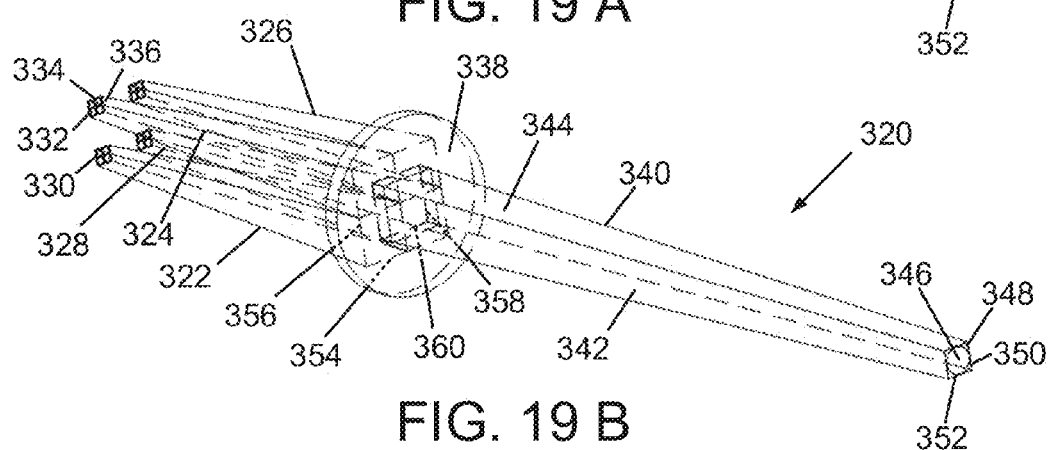
Figure 19:
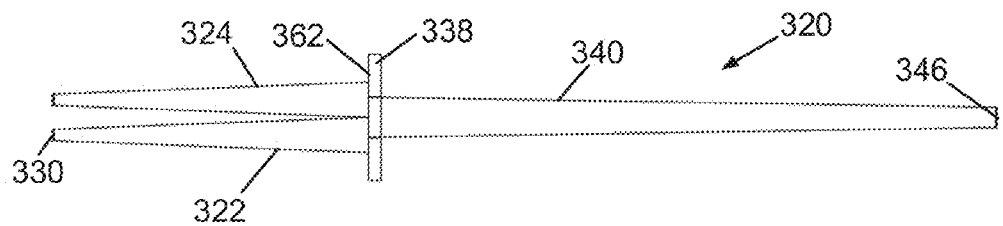
Figure 19:
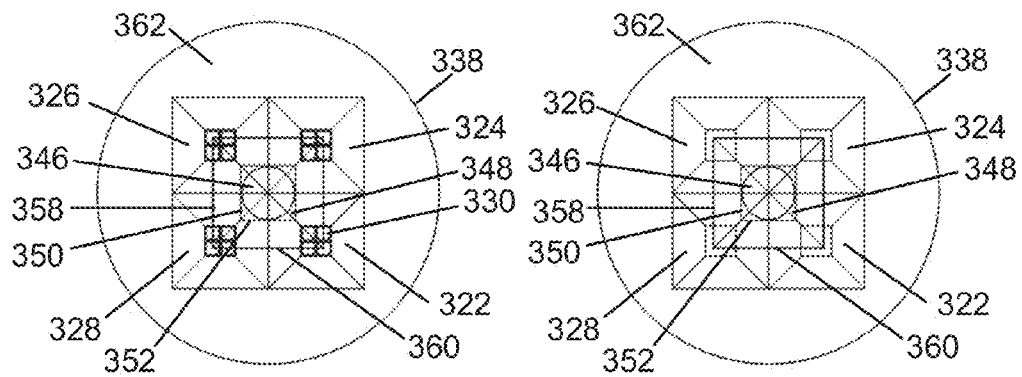

FIG. 19 A through 19 E show diagrammatic isometric, isometric hidden line, side, end-on with LED die, and end-on without LED die views, respectively, of an alternative embodiment 320 of the system 210 of FIG. 15 A. The four tapers of system 320 numbered 322, 324, 326, and 328 have a ratio of output to input aperture size larger than those of system 210 of FIG. 15 A. In a preferred embodiment, the system 320 tapers have a ratio that is the order of three to result in a far field angle on the order of 20° half angle. Multilayer dielectric bandpass coatings deposited on the output faces (large side) can be designed with up to the order of a 20° FWHM acceptance angle, but somewhat larger FWHM acceptance angles can result in poorer spectral transition at the edges of the pass band, that is a cut-on and cut-off transmission as a function of wavelength that is broadened. The purpose of the system 320 is to allow for high performance illumination with sharp spectral transmission transitions from low to high transmission to provide illumination suitable for applications such as fiber or liquid light guide coupled fluorescence excitation illumination for microscopy or other fluorescence or spectroscopy applications. The four tapers 322, 324, 326, and 328 each have LED arrays at location 330 for a given fluorescence application, that is each taper is configured with a different wavelength band LED die array to provide a total of one to four excitation spectral profiles or more, if required, as the system 320 can be extended to more than four tapers. The tapers each have input aperture side dimensions 332 and 334 to accept the LED emission into input aperture near 336 of each taper. The mirror element 338 has a square hole of side 358 and 360 to position receiving common reverse taper 340 to line up face-to-face with the four taper faces comprising up to four different spectra. The second function of mirror element 338 is to reflect light exiting each taper that does not pass into taper 340 back toward the LED arrays allowing the light to be redirected back out the exit taper 340 in a similar manner as previously described for systems of FIGS. 15 A and 16 A. The mirror aperture 338 is coated on the back side 362 facing the output of tapers 322, 324, 326, and 328 with a high reflectivity protected broadband mirror with specular reflectance on the order of 92% or better. The taper 340 with sides 342 and 344 has a ratio of input to output aperture size to bring the far field angle back up to that required to match a liquid light guide or fiber optic light bundle, which for a preferred embodiment is a ratio of the order of two. The output face of tapered optic 340 has a circular emitting aperture 346 to substantially match the light guide input aperture dimension and has square sides 350 and 352 and mirrored portion 348 as described previously. The five input tapers, in a preferred embodiment, are made out of high transmission glass such as BK-7 or Fused Silica, but can also be made out of many other dielectric high transmission materials that allow for vacuum deposited multi-layer films or high reflectivity mirrors to be deposited on their output faces. It may be reasonable to coat all four bandpass filters on the input face of reverse taper 340, however, that requires masking to achieve multiple coatings, and therefore can be a more expensive and less flexible approach. If the input taper's output faces are coated with the bandpass excitation filters, then these filters can be mixed and matched, selected from well over twenty different and common bandpass center wavelength and width specifications corresponding to various well know biological fluorophores. The length of the taper 340, for an output aperture on the order of three millimeters and input to output face size on the order of two would be the order of 100 mm to obtain a sufficiently well mixed far field distribution. Thus, the requirement for sharp spectral transitions, which requires output half angles on the order of 20° or less from the four input tapers, leads to a relatively long optical path. In comparison to systems using dichroic beam combiners, however, it is more compact and less complex.

Figure 20:
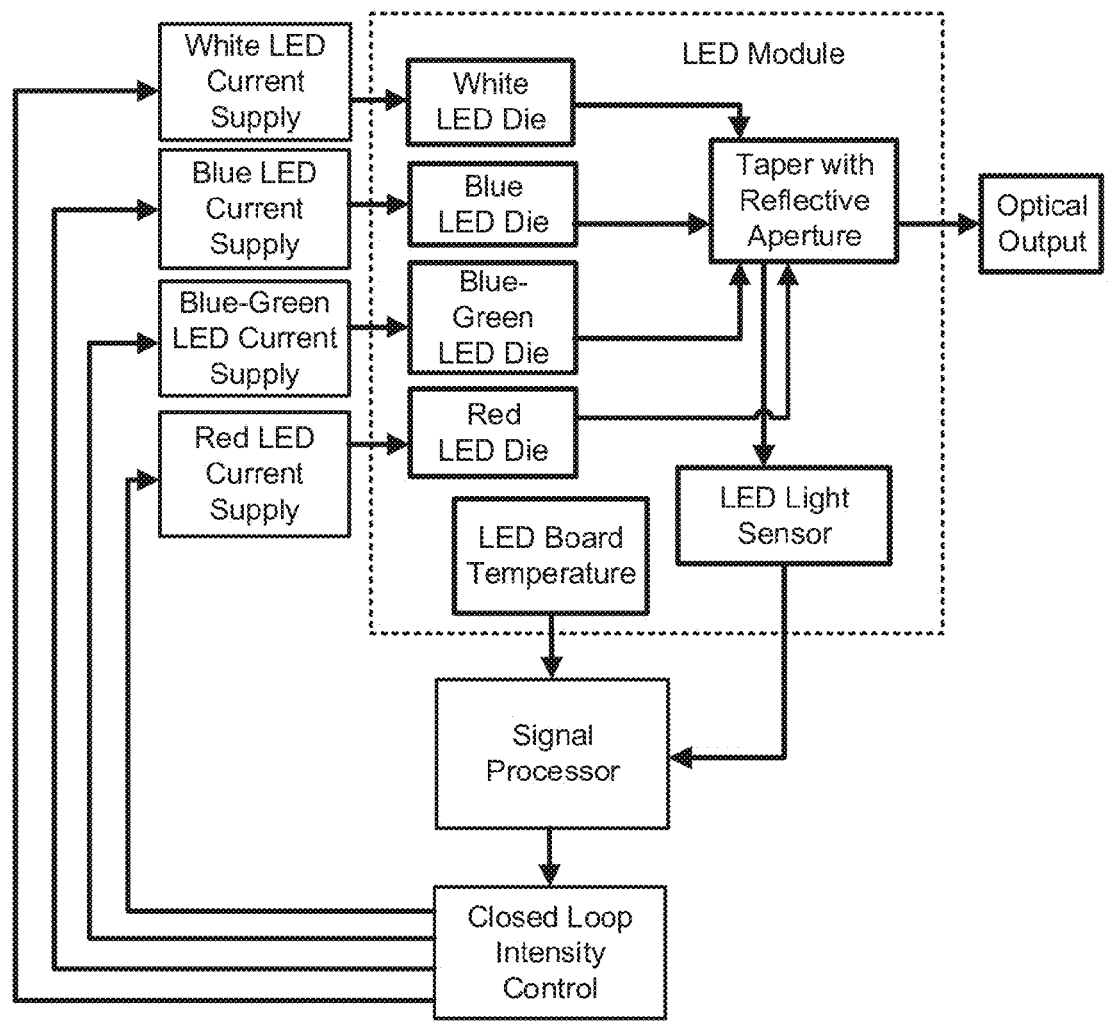
FIG. 20 shows a flow chart block diagram of a preferred embodiment of the LED module with independent closed loop current control over each of four color die types for control over color temperature and color rendering index.

With reference now to FIG. 20, there is shown a system block diagram of the illumination system 10 of FIG. 1. The elements within the dashed area labeled as "LED Module" correspond to the system 100 of FIG. 5A. On the same LED metal core board, there are four different types of LED die including white die comprised of phosphor coated blue LED die, blue die, blue-green die, and red die. The white die provide most of the luminous intensity, while the blue die balance color temperature on the short side of the spectrum and the red die balance color temperature on the long side of the visible spectrum. The blue-green die fill in the dip in spectral intensity between the blue excitation spectrum and the phosphor emission, which is predominantly green and to a lesser extent, red but generally very low in the blue-green region. The blue-green portion of the spectrum does not play a significant role in adjusting color temperature but is required to bring the CRI to acceptably high levels for surgical illumination applications, particularly those with direct human eye visualization. The taper with reflective aperture acts to efficiently couple the four different die spectra both in the near and far fields with high uniformity at the optical output aperture into a fiber optic bundle, light guide, or other optical component or system. The temperature of the metal core COB LED board is monitored by a temperature sensing device, which in a preferred embodiment is a negative temperature coefficient (NTC) type thermistor, which decreases in resistance with increasing temperature. The resistance is converted to a voltage and read into the Signal Processor.

With further reference to FIG. 20, the LED Light Sensor comprises the photodiode sensor and associate transimpedance amplifier which converts the photocurrent to a voltage which is read by the Signal Processor. Four independent LED Current Supplies drive each of the four types of LED die, White, Blue, Blue-Green, and Red. The control signal which regulates intensity for each color die can take several forms as there are many ways to control the intensity to achieve stable color performance. The objective is to allow the user to set both the intensity and the CCT while maintaining maximum CRI and in a preferred embodiment, maintaining these parameters with time and temperature changes. LED die change radiometric and photometric power with increasing time which is related to both junction temperature and current effects to the die electrode structure, epitaxial layers and reflective layers. Short term changes are predominantly from changes in junction temperature in the time scale of minutes to hours or days. On the time scale of months to years, output generally decreases with time. A basic level of control is based on an initial characterization for which the spectral output is measured as a function of current and board temperature over the full control range of intensity and CCT. Such a calibration can be used to generate a look-up table such that a user can dial in, or a graphic user interface (GUI) can be used to set levels for each color to achieve the desired spectral output conditions, that is, achieve the desired intensity for a given CCT while maintaining maximum CRI. Such an approach can work well in the short term, but would require periodic calibration to adjust for decreased output at a given current for changes to the LED die efficiency with time. A better approach is to use a means to monitor the optical power emitted by each of the four respective spectral sources so that a given photosensor signal corresponds to the actual power contribution to the total spectral power. There are many configurations and approaches to monitoring the optical power out of each spectral band including use of a single photodiode, a photodiode array with independent spectral bandpass filters or linear continuously variable bandpass filter to sample a portion of the spectrum corresponding to the peak spectral output of each of the four emitter types, and a spectrometer using a grating, prism or other spectrally dispersive element to map the spectrum onto a linear photodiode array or charge coupled device (CCD), either coupled directly or through an optical fiber. Since there is spectral overlap between the respective spectral emissions of the LED sources, there is cross talk, which is coupling between different LED sources if all were directly measured at the same time. That would prohibit the use of a single photodiode with spectral sensitivity to all four spectral bands for any continuous DC signal. If however, well known lock-in detection techniques are used, a single photosensor with no filter can readily be used. Lock-in techniques comprise modulating each of the four signals at a distinct non-harmonic frequency, detecting the sum of all signals simultaneously with a single full spectrum photodiode or other type of high bandwidth photosensor and measuring the output for each signal at a distinct frequency and phase according to well know lock-in detection techniques. Alternatively, the power spectral density of the composite signal can be computed by use of a Fast Fourier Transform (FFT). This technique produces four distinct peaks for frequency versus intensity which correspond to the four fundamental current drive frequencies of the four LED types. In this way, the photometric or radiometric power of each of the four color bands can be continuously monitored by a single low cost photosensor. The signals can then be used to close the loop on the intensity to maintain constant output for the full spectral distribution so that changes in LED die performance due to aging and temperature can be compensated. This technique assumes that the photosensor response is constant with time and temperature, which over the relevant temperature ranges is substantially true. A Fast Fourier Transform (FFT) is a well know algorithm that can substantially approximate the Power Spectral Density (PSD) of a given signal and can be readily computed by a modest computer. Changes in LED efficiency due to aging effects and changes due to temperature happen with a long time constant from minutes to years, so the algorithm is not required to react in milliseconds, but can react as slowly as seconds and still do an excellent job of maintaining constant spectral optical output. A dedicated Digital Signal Processor (DSP) can be used, however, very small and inexpensive microprocessors are readily available that can accomplish the task with ease as well as a small card based computer. Another approach to using a single photodiode with no spectral bandpass filters is to turn off all but one LED color source at a time, sample the photodiode signal, and then change to the next and so on. The off time of the other three samples during the measurement of any one can be the order of microseconds and the time between the samples can be long, the order of many tens or hundreds of milliseconds, so there is no detectable change in the continuous light output from the perspective of the observer or standard camera since the duty cycle of sampling is so low. This does require that the current sources be designed with sufficiently short rise and fall times such that the sampling time for each color band is very short. It also requires a sufficiently high bandwidth photosensor, fortunately, both of these are readily achievable with circuit elements that are readily available, or that can be readily designed and fabricated. This pulsed sampling approach with a single photosensor also allows for closed loop intensity control. A simple set of four photodiodes each with an independent spectral bandpass filter can be used in place of a single photodiode so that the signals can be read continuously with no requirement of modulation of the four signals or pulsed sampling. The disadvantage of this approach is that the spectral bandpass filters are relatively expensive and can increase system cost, and there is crosstalk between the photosensors since, for example, the blue bandpass would not only be responsive to the blue channel, but also to the blue-green, and white channels. Consequently, it is desirable to deconvolve the respective signals which would require a multi-variant analysis since one would not know from the output of just the blue photosensor, for example, if a change in signal was due to a change in any one of the three overlapping spectral sources. More than four separate spectral band measurements may be required to successfully deconvolve the signals. This is the motivation for using a photodiode array with a linear continuously varying spectral bandpass filter or spectrometer, both of which are more expensive solutions, but are relatively easy to implement. By sampling the entire spectrum with a sufficiently high number of distinct spectral positions, it is feasible to use a simple difference algorithm to obtain any desired intensity and CCT while maintaining high CRI.

Figure 21:
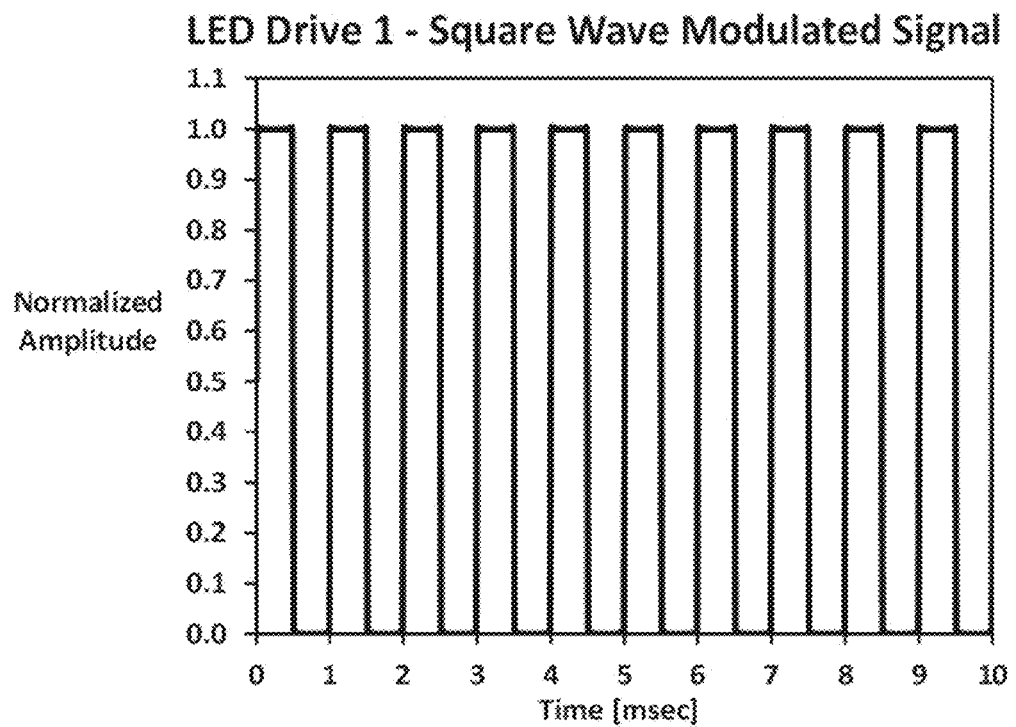
FIGS. 21 A and 21 B show plots of LED Current Drive 1 and LED Current Drive 2, respectively.
Figure 21:
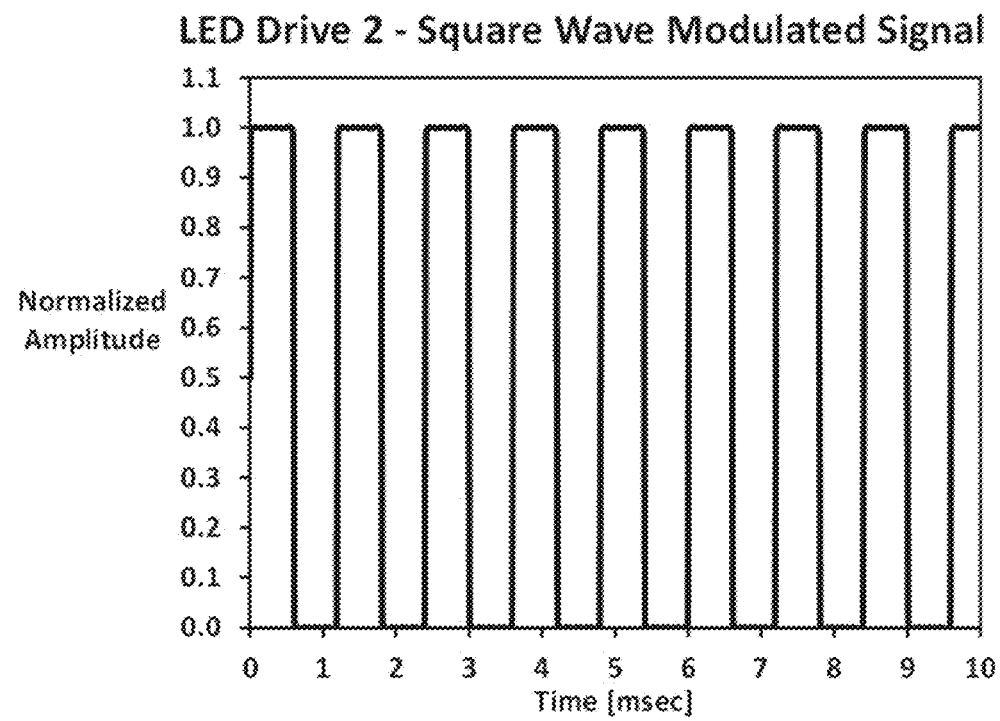
Figure 21:
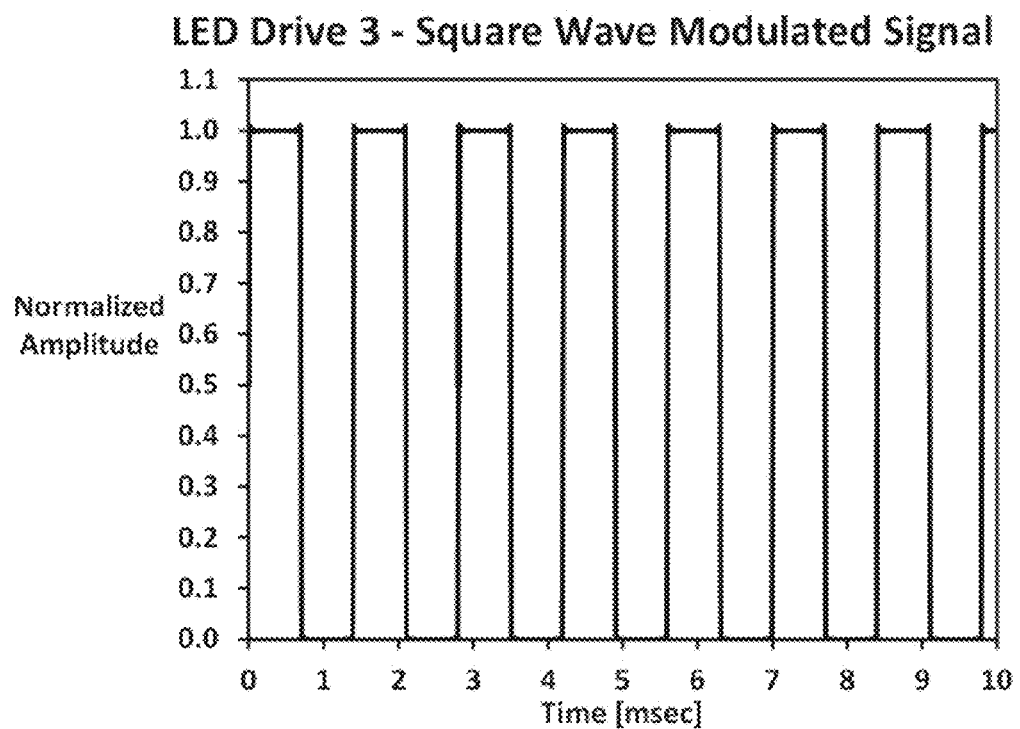
Figure 21:
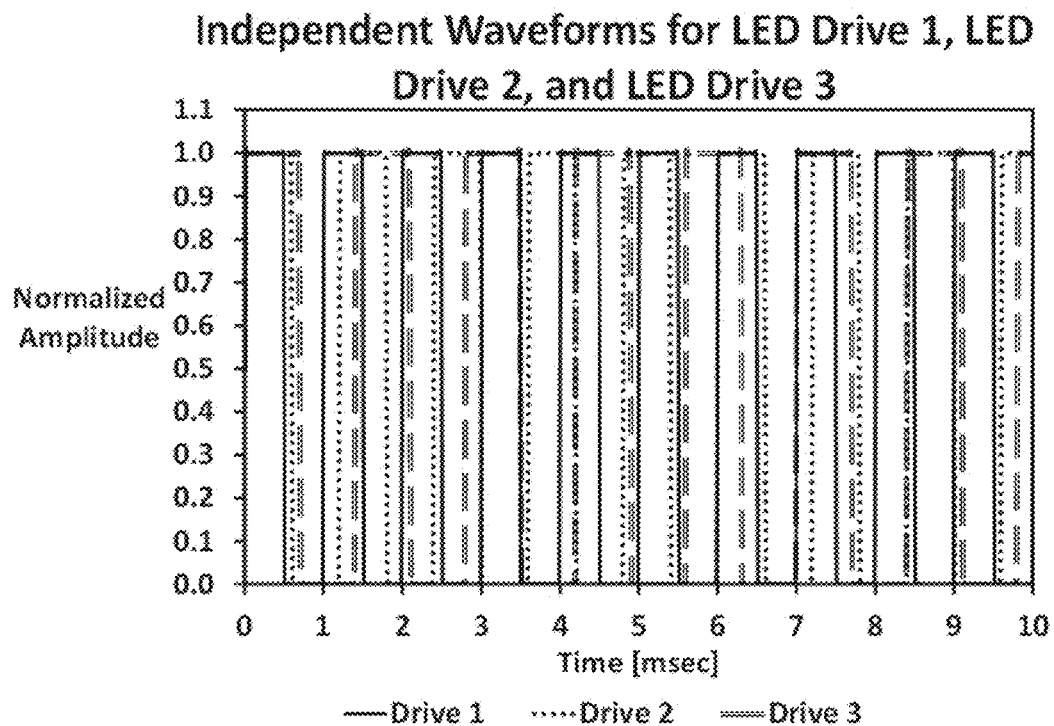
Figure 21:
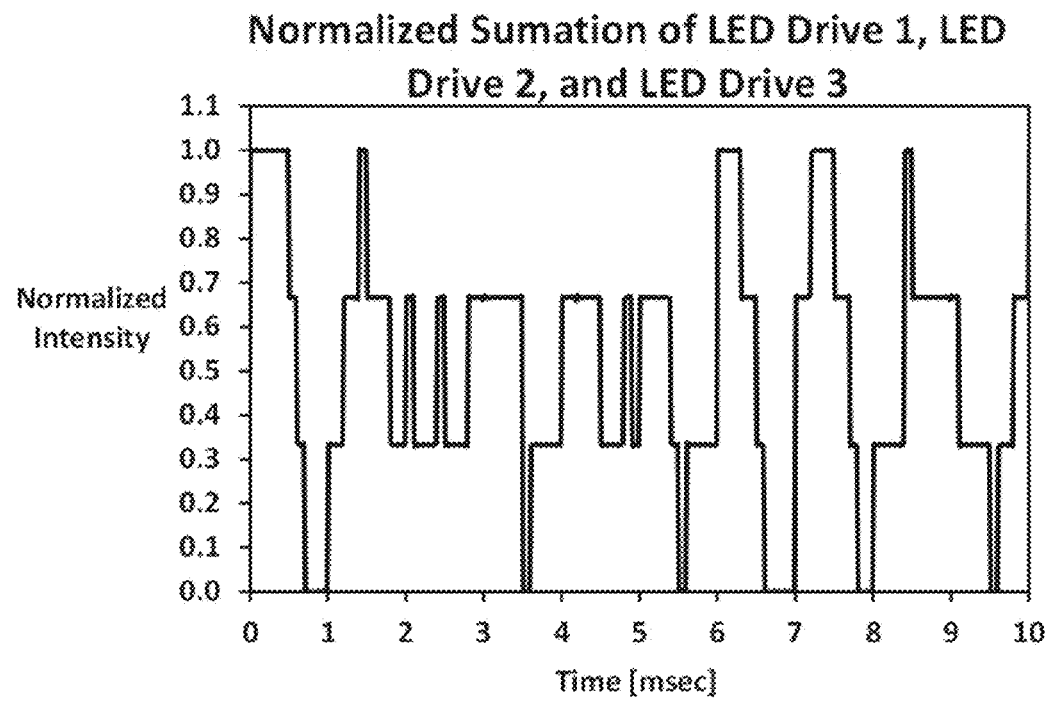
Figure 21:
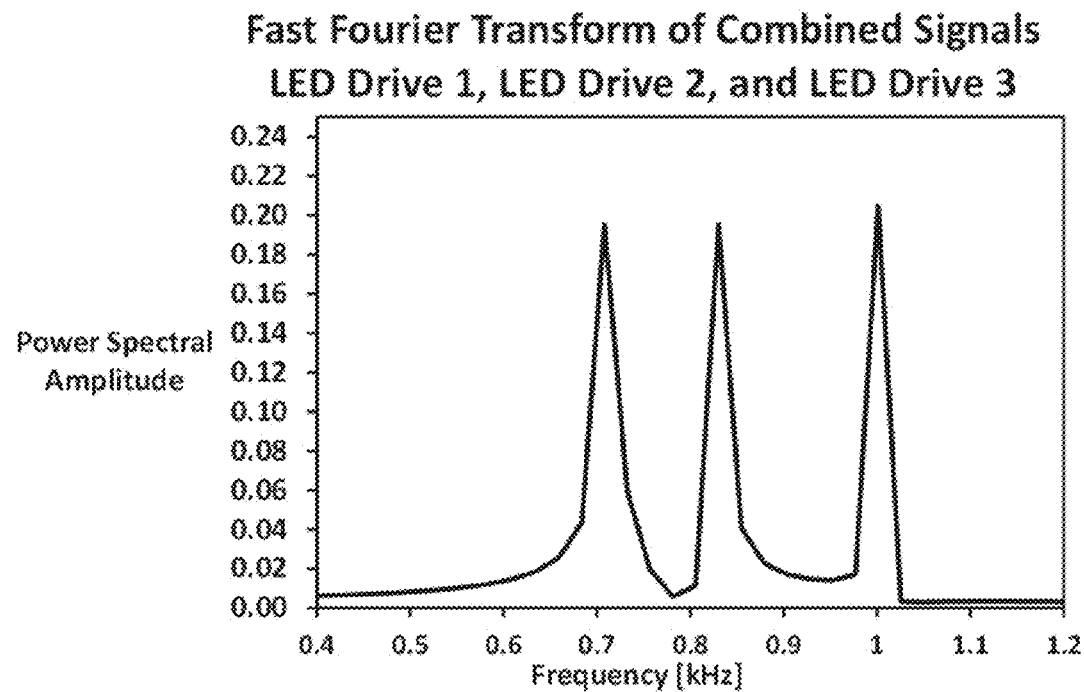

FIG. 21 A through 21 F illustrate the Power Spectral Density FFT detection technique for the case of three independent sources, however, the method can be extended to any arbitrary number relevant to illumination sources. The benefit of the FFT approach over discrete lock-in channels is that for the lock-in approach, a different lock-in circuit is used for each drive frequency, where the FFT can be extended to any number without changing the algorithm. Consequently, it is more efficient to use the FFT approach for an increasing number of channels and, since most devices incorporate some form of computer or microprocessor, the use of the FFT approach can be more cost effective and scalable. FIG. 21A represents a normalized square wave modulated current signal to drive a first LED color at a frequency of one thousand cycles per second (Hz), for example. FIG. 21 B represents a similar normalized square wave modulated current signal to drive a second LED color at a slightly higher fundamental frequency of twelve hundred cycles per second. Similarly, FIG. 21 C represents a normalized square wave modulated current signal to drive a third LED color at frequency of fourteen hundred cycles per second. This technique can be extended further up to the total number of independent spectral sources for a given light source system, or even for each individual LED die, if desired. A total of three are used in this example for clarity. FIG. 21 D represents all three current drive wave forms on a single plot with the first LED color indicated by the solid line, the second LED color indicated by the dotted line, and the third LED color indicated by the long dashed line. FIG. 21 E represents the mathematical summation of the three signals which corresponds to what the signal on an oscilloscope looks like when monitoring the single photodiode without a spectral bandpass filter. It can be appreciated that it is difficult to make sense out of such a seemingly randomized signal. FIG. 21 F, however, represents the Power Spectral Density Amplitude as a function of frequency. As described above, a FFT algorithm can be used to transform from the time domain of FIG. 21 E to the frequency domain of FIG. 21 F, for which the three fundamental drive frequencies are readily apparent. The peak intensity of each of the three peaks is proportional to the average optical power for each of the three individual LED colors comprising three different LED spectra. The fundamental frequencies can be chosen to be sufficiently high in frequency as not to cause intensity modulation visible by either the human eye, which has a response time on the order of 250 ms, or a standard video, with a frame to frame time on the order of 16 ms or more. Preferably, the driver frequency is much greater, on the order of ten times or more, than the inverse of the response time of either the human eye if the application is for visual use only, or that of a camera that may be used. This method is a relatively simple and elegant signal processing technique that minimizes the cost of the optical sampling and can be extended to a large number of independent sources.

FIG. 22 A through 22 H show gray level far field intensity distributions for a single off-axis LED die, both as emitted out of the taper of the system of FIG. 5 A and as would be observed after passing through a standard five millimeter diameter by two meter long fiber optic glass bundle, of the type most commonly used for laparoscopy illumination, as a function of the length of taper 76 of the system of FIG. 5 B, respectively, for tapers of lengths of 25 mm, 50 mm, 75 mm, and 100 mm. The far field exiting the taper is a result of multiple mirror reflections of the LED light passing through the taper over a range of angles between 0° and the cut-off angle within the glass, which is a function of its index of refraction, which for a standard glass such as BK7 is the order of 41.23° from the normal to the air glass interface of the front face of the taper. This kaleidoscope effect results in increasing reflections for progressively longer tapers, which leads to the increased number of spots and thus, increased far field uniformity in moving from a taper length of 25 mm to 100 mm for an exit aperture of five millimeters. The gray scale image of FIG. 22 represents the far field from a single LED die at the input aperture of the taper 76 of FIG. 5 B as it would appear in the far field, that is, if the illumination exiting the taper where allowed to transmit to a screen a distance of more than the order of fifty to one hundred times the diameter of the emitting aperture, that is at least the order of 250 mm to 500 mm away. Optical fibers do a good job of mixing the angle space, that is the far field intensity distribution, in the tangential direction, but a poor job of angular mixing in the radial direction. This is readily observed by injecting a laser pointer into an optical fiber at an angle relative to the optical axis and noting that at the output a ring is projected onto a screen at a distance, meaning that the light mixed very well in the tangential direction and very poorly in the radial direction. Thus it is important to have a high degree of uniformity in the far field exiting the illumination system, that is, from the exit aperture of the tapered optic of the system of FIG. 5 B. The far field distributions of FIGS. 22 A and 22 C result in noticeable nonuniformity after passing through a fiber optic as shown in the gray scale images of FIGS. 22 B and 22 D, respectively. The far field distributions of FIG. 22 E for a taper length of 75 mm, corresponding to a value of 15 for the ratio of the diameter of the output aperture to taper length, results in nearly acceptable far field uniformity as illustrated by the gray scale image of the far field exiting the fiber for FIG. 22 F. The taper length of 100 mm leads to the highest and very acceptable far field uniformity both exiting the taper directly and exiting the fiber optic, as indicated by the gray scale images of FIGS. 22 G and 22 H, respectively. It should be recognized that in various applications a different level of performance (e.g., far field uniformity) may be acceptable. Thus a value of ten or less may be acceptable for the ratio of the diameter of the output aperture to the taper length. The particular shape of the far field for any given length is a function of where the LED die is at the input aperture of the taper. Since no two LED die can occupy the exact same space, the far field distributions for different color die for a given length taper are different. Consequently, it is necessary to have a sufficiently high number of individual spots in the far field so that there is not color banding of the illumination exiting the optical fiber bundle for surgical illumination applications which replace conventional Xenon Short Arc lamps with LED lighting.

Figure 23:
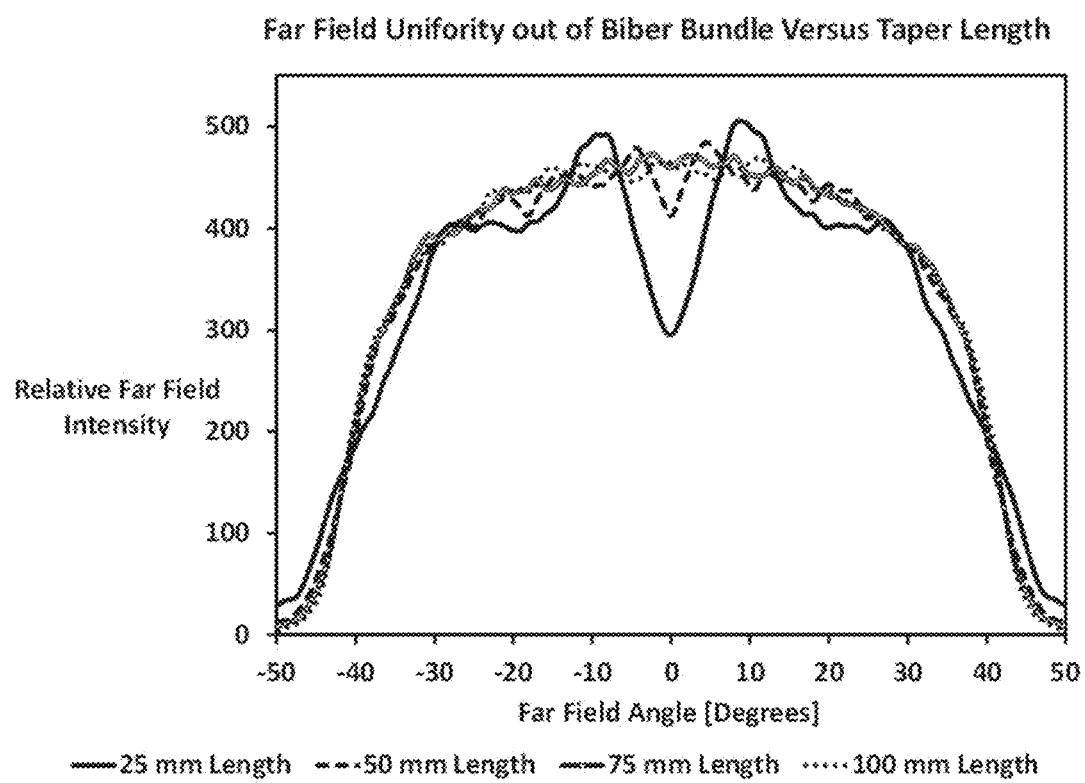
FIG. 23 shows cross sectional data from FIG. 21 for far field uniformity out of the taper versus taper length.

The plot of FIG. 23 represents an intensity slice through the middle for the gray scale images of FIGS. 22 B, 22 D, 22 F, and 22 H, respectively for 25 mm, 50 mm, 75 mm, and 100 mm taper lengths, respectively.

FIG. 24 A represents one configuration of white LED die that can be used in the system of FIG. 5 A which comprises an array of five by five LED die with four white die removed to allow for inclusion of two each red and blue-green LED die for color optimization. The larger number of white die leads to a highly uniform far field as represented by the gray scale intensity image of FIG. 24 B. To assure that all fibers in a given fiber optic bundle see a similar intensity distribution it is also important that the near field uniformity be sufficiently high and substantially telecentric, that is, that the center of rays emanating from any given point at the output face of the taper's emitting aperture should be similar and aligned with the optical axis for all positions. This condition is substantially achieved for the 100 mm taper length described by FIGS. 22 G and 22 H for which the high far field uniformity is evident. The gray scale intensity image of FIG. 24 C shows the result of the distribution of white LED die for FIG. 24 A, which as expected is highly uniform. All the figures of FIGS. 24 A to 24 L represent a nominal taper length of 100 mm. As expected, after passing through the optical fiber bundle, the far field is highly uniform as well as indicated by the gray scale intensity image of FIG. 24 D. FIG. 24 E represents the relative position at the input aperture of the two red die used in conjunction with the white die of FIG. 24 A, also showing a highly uniform near and far field in FIGS. 24 G and 24 H, respectively. Likewise, FIG. 24 I represents the relative position of the two blue-green die used with the white and red configurations of FIGS. 24 A and 24 E, respectively. The near and far field of the blue-green die is also highly uniform as shown in gray scale images of FIGS. 24 K and 24 L, respectively. FIGS. 24 F and 24 J reveal that the two far field distributions are 180° out of phase, that is, the light spots of FIG. 24 F are positioned such that they fall in the dark spots of FIG. 24 J, and vice versa. The tangential far field mixing effect of transmitting down the fiber optic bundle, however, results in substantially similar far field distributions for all three color sources, so no color banding is evident at a taper length of 100 mm. For optimal far field mixing and uniformity it is best to arrange each different color LED die such that it has a high degree of one or two fold symmetry as illustrated in FIGS. 24 A, 24 E, and 24 I. The greater the number of colors, the more difficult it is to meet the symmetry objective. Thus for the most generally useful configuration taper longer is generally better, but that has to be traded off with practical limitations on package size and cost.

Figure 25:
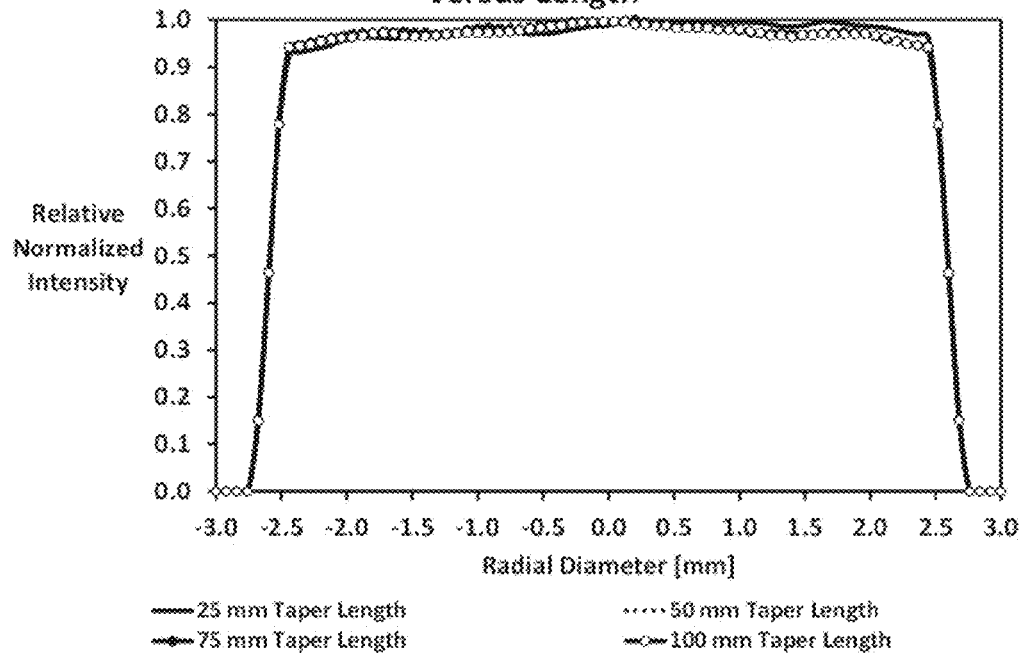
Figure 25:
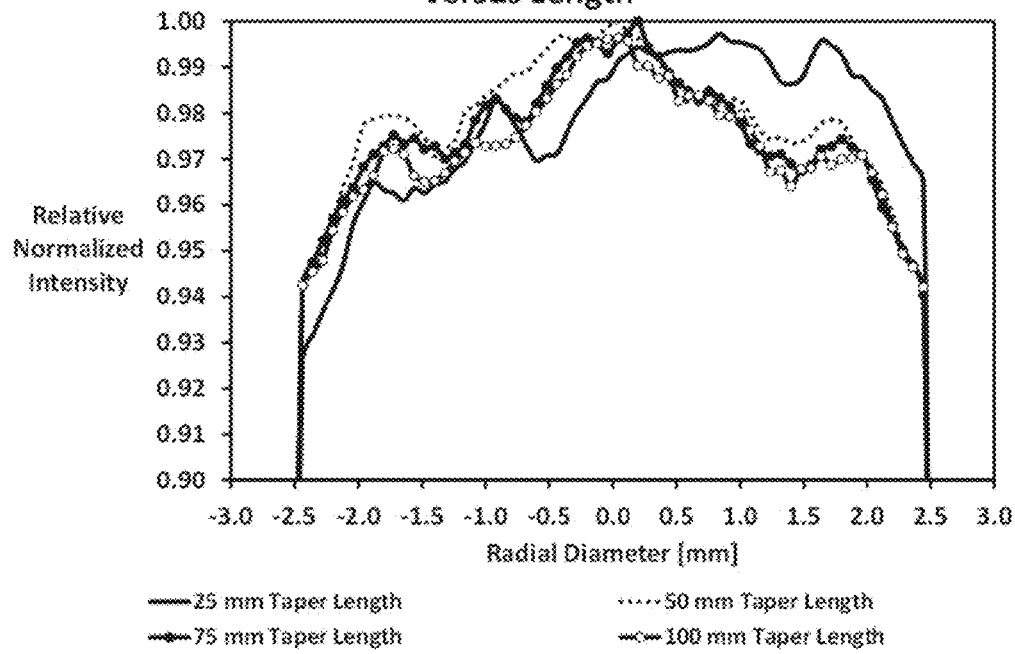

FIG. 25 A represents a near field intensity distribution of a single off axis LED die at the input of the taper of FIG. 5 B for taper lengths of 25 mm, 50 mm, 75 mm, and 100 mm, respectively and also corresponding to far field distributions of FIG. 22 A, FIG. 22 C, FIG. 22 E, and FIG. 22 G, respectively. The figure shows a high degree of intensity uniformity as a function of position along a diameter of the five millimeter exit aperture. FIG. 25 B represents the same data as that of FIG. 25 A on an expanded scale. While all the near field distributions are quite good and may be acceptable, the 100 mm length is the best. It is also clear that the performance for this application is driven by the requirement for far field uniformity as a function of taper length since near field uniformity is acceptable for even the 25 mm length.

Figure 26:
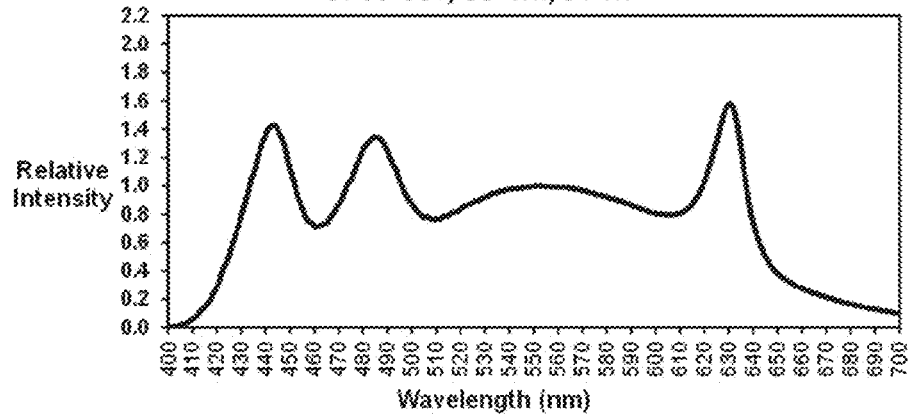
Figure 26:
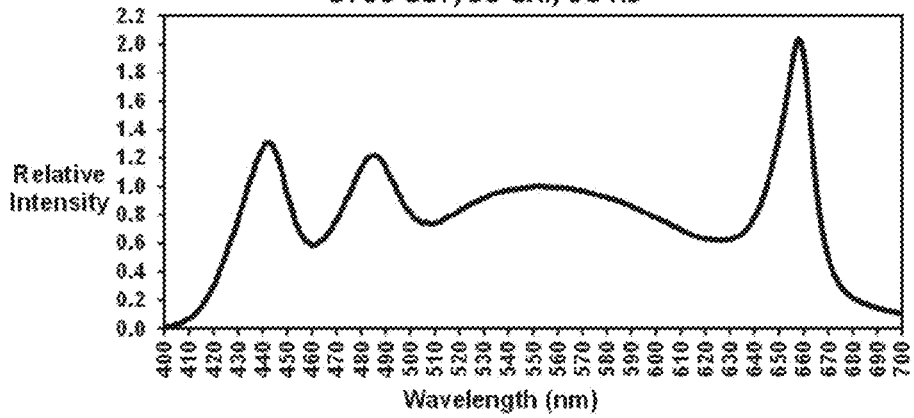
Figure 26:
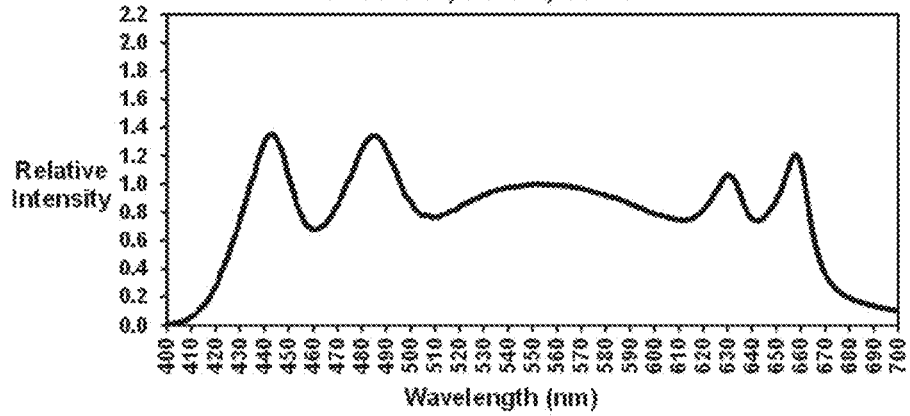

With reference now to FIG. 26 A, there is shown a spectral power distribution of an LED source comprising three different types of LED die including white, blue-green, and red. Since the blue intensity emitted by the white LED die is substantially fixed in proportion to the green-red emission from the phosphor, a fourth LED color which is blue only can be added to help balance the spectrum if, for example, the amount of phosphor generated light was adequate to achieve high CRI, but more or less blue was required to shift the CCT. The distribution of FIG. 26 A corresponds to a 5700 Kelvin CCT, 98 CRI, and a saturated red R9 value of 97. The peak radiometric wavelengths of the LEDs for FIG. 26 A correspond to a blue peak on the order of 445 nm, blue-green peak on the order of 485 nm, the typical white peak on the order of 555 nm, and a red LED peak on the order of 630 nm. The typical CRI of the best Short Arc Xenon lamps is on the order of 92 or less and R9 can be well below 90 which results from the filtering of wavelengths greater than the order of 680 nm to prevent the infrared from drying out tissues, so this LED source is superior to the CRI that can be obtained by the industry standard Short Arc Xenon lamps. Alternatively, the red peak wavelength of 630 nm can be replaced with a deeper red LED with a peak wavelength on the order of 660 nm as indicated by the plot of FIG. 26 B. The relative amount of red required to balance color relative to that of FIG. 26 A, however, is greater, but a very high CRI of 95 and R9 value of 96 can still be obtained. The use of more optical power in the deeper red is not much of a concern, however, since deeper red LED die are more efficient relative to 630 nm LED die, so this increase does not come at the expense of substantially more input power. An alternative configuration is to use both 630 nm red and deeper 660 nm red in the same system, which decreases the relative amount required from each of the two red LED die types. FIG. 26 C shows that it also leads to a near perfect CRI of 98 and R9 value of 97. All three spectra were optimized for a CCT of 5700 Kelvin, which is very close to that produced by a typical Short Arc Xenon lamp system. If desired, the relative contributions from each of the LED colors can be modified to produce a spectrum with optimal CRI ranging between the order of 3500 Kelvin and 8000 Kelvin, which correspond to the approximate extents that any given surgeon may favor.

Figure 27:
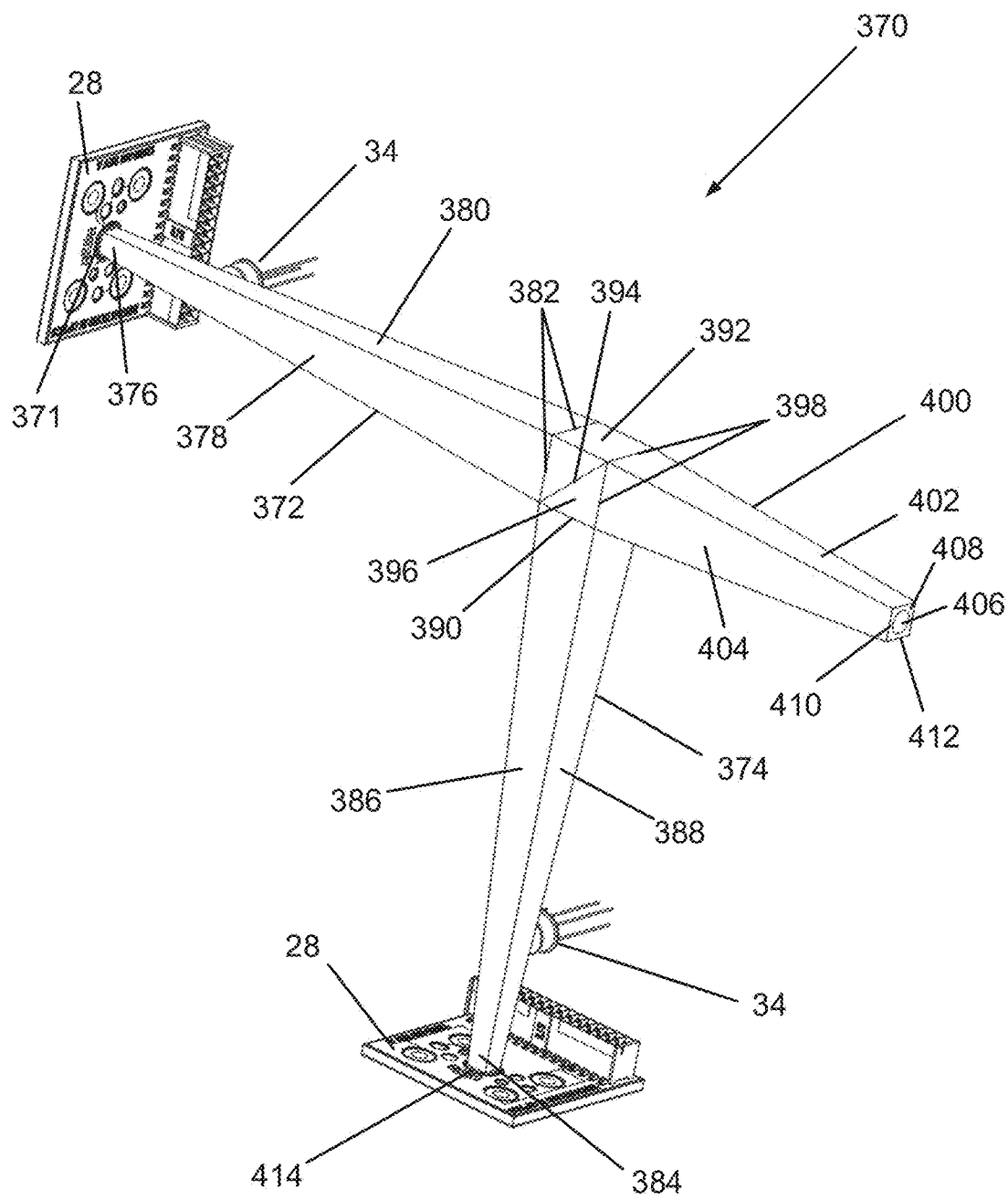
FIG. 27 is a diagrammatic isometric view of the system of an alternative embodiment of FIG. 5 A comprised of two LED boards and associated tapers, dichroic combining cube beamsplitter and output coupling reverse taper.

A diagrammatic isometric view system 370 of FIG. 27 shows an alternative embodiment of system 120 of FIG. 7 A, comprising two similar LED boards 28 with two different LED die arrays 371 and 414 characterized by different spectra such that dichroic beam combining surface 394 can couple two substantially spectrally separated LED sources into one common aperture. The advantage of this approach over that of system 120 of FIG. 7 A, which comprises a single taper, is that by using two tapers and a spectral beam combining element, the total optical power at the emitting aperture 406 of reverse taper 400 is increased since there are now twice the total number of LED die since the die from the two arrays are each using the total available Etendue instead of sharing it. The light emitted by the first LED array 371, for example is comprised of the blue and blue-green portion of the spectrum and enters into taper 372 with sides 378 and 380 at input aperture 376, and exits at the large emitting aperture 382. The ratio of emitting aperture to input aperture dimensions is similar to the collection tapers of system 320 of FIG. 19 to optimize the slope of the spectral bandpass of dichroic combiner 394, due to its spectral wavelength sensitivity to incidence angle. Reverse tapered collection optic 400 ("reverse taper"), which functions similarly to that of taper 340 of system 320 of FIG. 19, has input and output apertures identical in size and mirror coating, but is shorter in length, since it does not also have to function to mix the near field, as does the taper of system 320. Similarly, taper 374 collects light from LED array 414 of spectral content having colors longer than blue-green, that is green, amber, and red into entrance aperture 384 with sides 386 and 388 and exit aperture 390. The cubic beam combiner comprising two triangular glass elements 392 and 396 must not be index matched at the input faces corresponding to 382 and 390 otherwise the output of the two respective tapers is not totally internally reflected and light leaks out of the system. For example, blue and blue-green light exiting aperture 382 from LED array 371 is transmitted through the beam combiner 394 and upon striking side at 390 of element 396 passes directly into taper 374 if there is index matching at 390. Likewise rays emitted by taper 374 reflect off beam combining dichroic surface 394 and then pass back into its own exit aperture if it is index matched to element 396. Additionally, rays emitted by taper 374 that strike aperture 398 prior to hitting beam combiner 394 would not be totally internally reflected, but would pass directly through the wall of output taper 400. Thus, to maintain light guiding within the cube combiner, it is not index matched to any of the three respective tapers, but it is index matched between its respective two halves 392 and 396, otherwise light from taper 372 is totally internally reflected upward at output face of 392 near coating 394 and is directed up and out the top of 392, but not guided toward reverse taper 400 and out aperture 406. Reverse taper 400 acts to convert the far field angle transmitted by the beam combiner to a larger angle required by the endoscopic optical fiber bundle or similar application. The reverse taper is not required, however, to homogenize the near field as is the case for the reverse taper of system 320 of FIG. 19 since both spectral sources already occupy the full Etendue available. The reverse taper 400 with input aperture 398 and sides 402 and 404 has an output aperture size identical to that of the system of FIG. 5 B with substantially similar output aperture 406 and mirrored surface 408 having sides 410 and 412, which acts to reflect light outside the emitting aperture back toward the respective sources where the light has additional opportunities to exit emitting aperture 406. Each of the two spectral bands is monitored by photosensors 34, one each per LED array. An alternative arrangement of LED die has all white die or phosphor coated blue die to produce broad green light in first array 371 since the largest proportion of light comes from the green spectrum. An advantage to this approach is recognition of the very high diffuse reflectance of phosphor generated light back off the phosphor upon return path to the LED array in comparison to the somewhat lower reflectivity of the red and amber die, which would result in more optimal efficiency of the phosphor generated light. The second array would then have blue, blue-green and red die, but since they are needed in lower proportion, that could lead to overall improved performance. The beam combiner 394 then has to reflect all but the green portion of the spectrum and pass green. That is a bit more complex of a dichroic coating, but can be readily produced.

Figure 28:
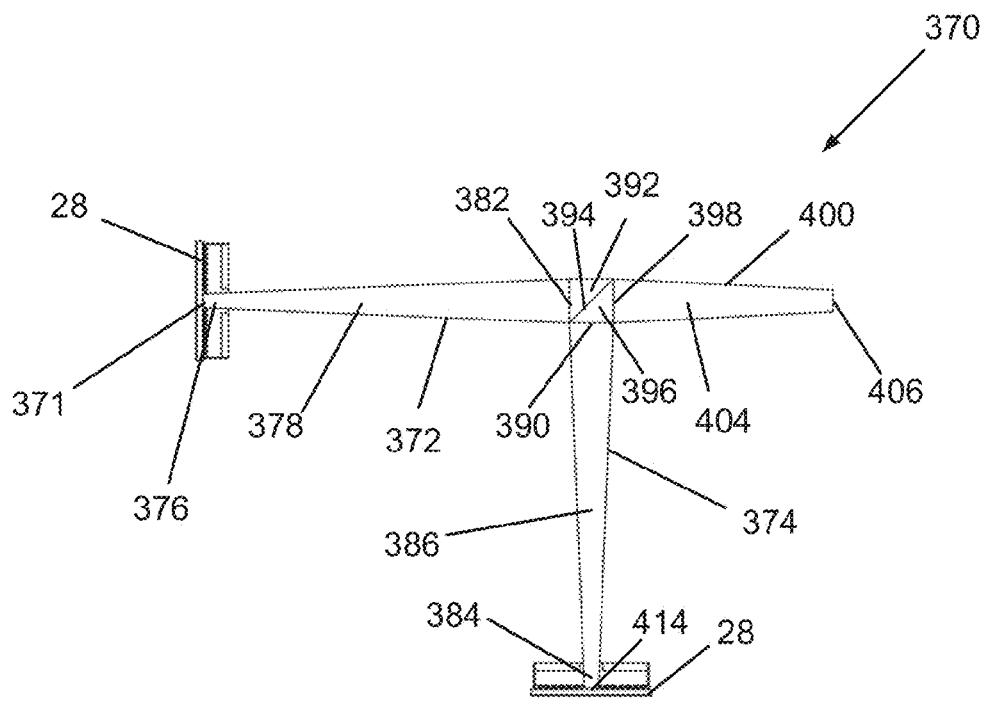
FIGS. 28 A and 28 B show diagrammatic side views of the system of FIG. 27 without and with ray paths, respectively.
Figure 28:
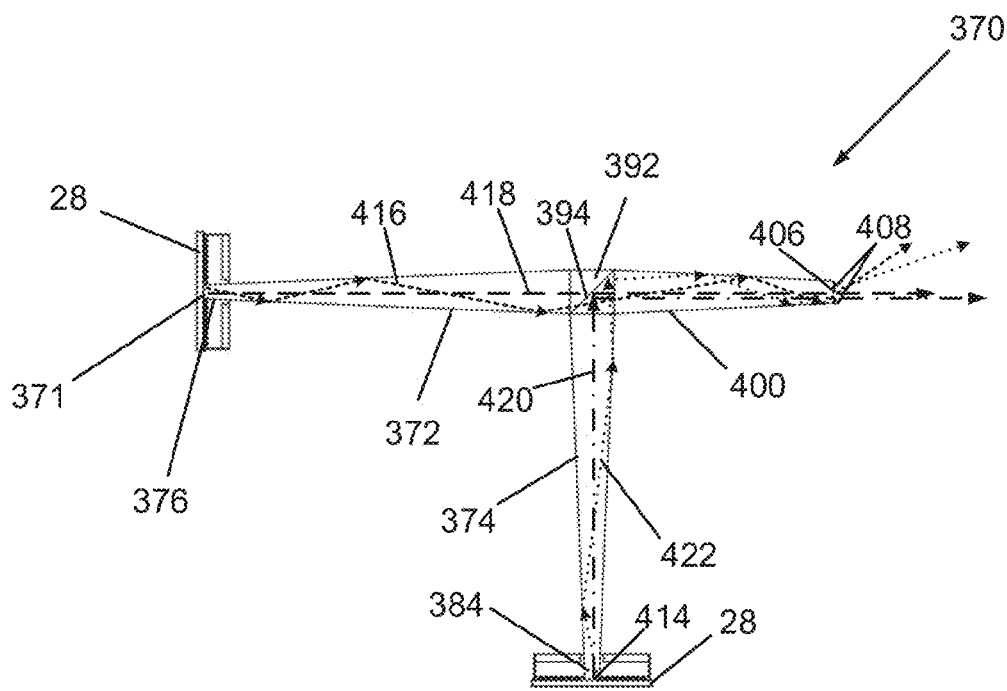
Figure 29:
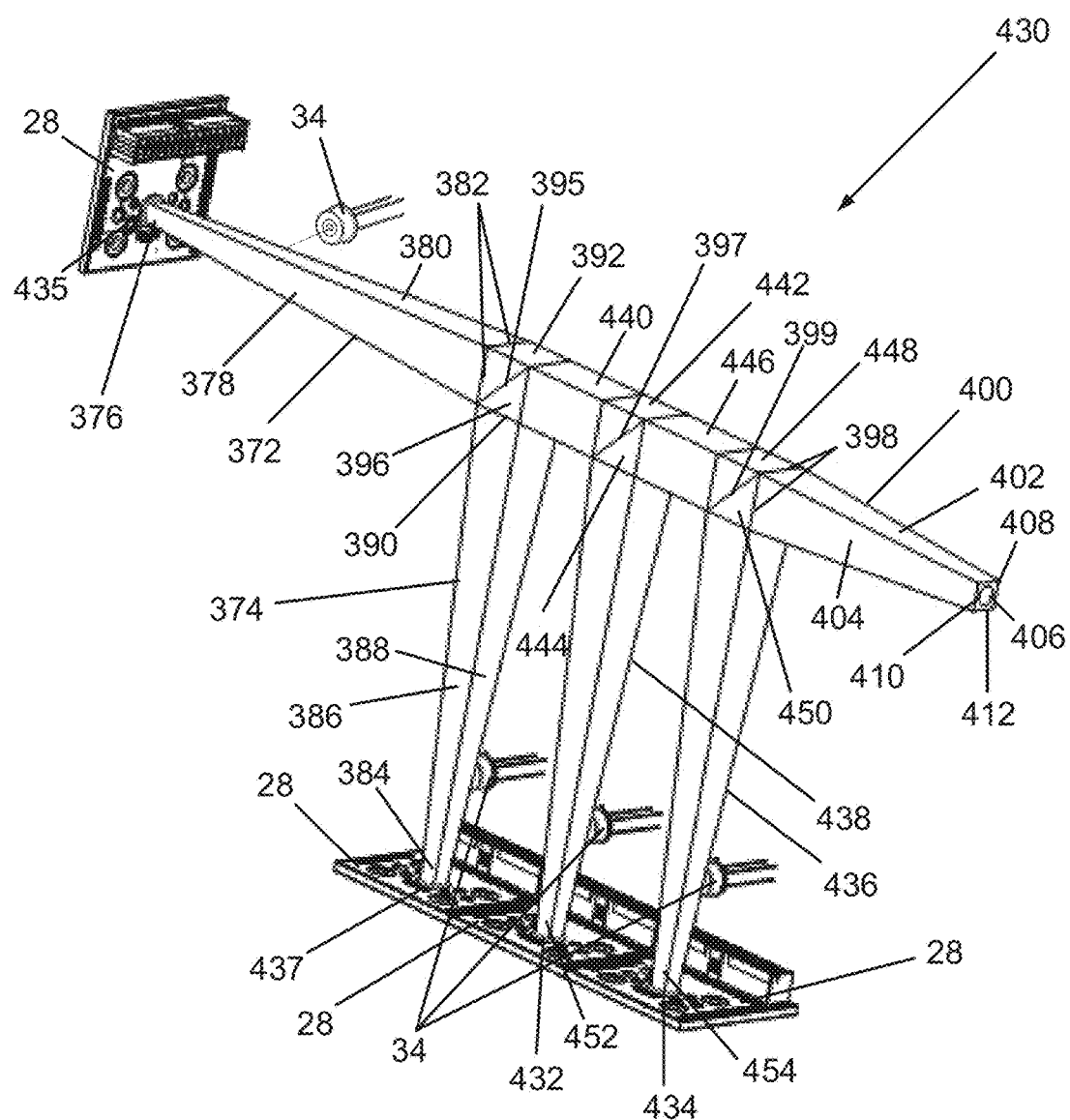
FIG. 29 is a diagrammatic isometric view of an alternative embodiment of the system of FIG. 27 incorporating 4 LED boards and associate tapers and 3 sets of dichroic combining cube beamsplitters and output coupling reverse taper.

FIGS. 28 A and 28 B show diagrammatic side views of the system 370 of FIG. 29 without and with rays showing optical paths, respectively. Ray path 416 of FIG. 28 B is emitted by LED array 371 and passes through beam combiner cube comprising 392 and 396 as if it were just an extension with straight walls from taper 372's output aperture and is guided by total internal reflection into input aperture 398 of reverse taper 400. In a similar manner to the rays of system 100 of FIG. 6 B, mirror aperture 408 reflects rays that do not exit emitting aperture 406 back to LED array 371 where they have an opportunity to be redirected back out of aperture 406 and thereby increasing the radiance at the exit aperture 406. Ray 420 is shown directed from LED array 414 along the optical axis, reflecting off of dichroic beam combiner surface 394 and into reverse taper 400 and out emitting aperture 406. Rays centered around ray set 422 reflect off 394 in a similar manner and partially are transmitted out of emitting aperture 406 and partially reflected by mirror 408 back toward array 414 where they diffusely reflect back toward 394 off of array 414 and subsequently have another opportunity to pass out of exit aperture 406 thereby increasing the radiance of the long wavelength side of the spectrum. This general approach can be extended to additional numbers of LED arrays, if desired.

FIG. 29 shows a diagrammatic isometric view of the system 430 which represents an alternative embodiment of the system 370 of FIG. 27 for which there are two additional beam combiners and two additional associated LED arrays with collection optic tapers. Four different LED arrays 435, 437, 432, and 434 are each on a different LED board 28, each with an associated taper 372, 374, 438, and 436, respectively with input apertures 376, 384, 452, and 454, respectively. Each collection taper and the reverse taper 400 and all its associated parts are identical in function to those of system 370 of FIG. 27. Each taper has an associated photosensor 34 to monitor the output of each color type LED die in its respective LED array. Generally, it is easier and results in better performance to have dichroic beam combiners, also referred to as dichroic beam splitters, such that they pass longer wavelengths and reflect shorter wavelengths. Thus, while any combination of colors can be made to work, it is efficient to have LED array 435 be the longest wavelength, which for application to endoscopic surgical illumination or surgical headlights would be red, which can be both LEDs centered around 660 nm and 630 nm, and amber, which can either be direct LED emission around 590 nm or emission peaked around 580 nm to 590 nm from a phosphor. The LED array 437 is then be green, which can be direct green or phosphor generated. Generally, there are no efficient green LED sources available with direct emission centered around 555 nm, where the human eye has its highest sensitivity, so those wavelengths are generated from phosphors such as Cerium YAG or Strontium Thiogallate: Cerium, for example. LED array 452 would be direct LED cyan and blue-green emission centered around 505 nm and 485 nm, respectively. LED array 434 would be blue which could be comprised of a range of blue LED die with peak radiometric emission centered near 475 nm down to the order of 445 nm. Any of these wavelengths can alternatively be produced by blue through red phosphors that are commercially available and very high wall plug efficiency ultraviolet LEDs can be used as the excitation, as well as blue LEDs, or green LEDs for longer spectra. One disadvantage of standard inorganic LED phosphors, however, is that the phosphors generally have relatively broad spectral emission with FWHM on the order of 40 nm to 80 nm. This can result in lower efficiency due to the fact that the individual dichroic beam combiners 395 which would transmit red and amber and reflect green, beam combiner 397 that would transmit red, amber, and green and reflect cyan and blue-green, and beam combiner 399 that would transmit all wavelengths except blue, which would be reflected, would have sharp spectral transitions, which would cut off out of band phosphor emission. A new class of phosphors that show great promise are referred to as nanophosphors. Nanophosphors have relatively narrow emission spectral width on the order of 20 nm to 30 nm, which is comparable or in some case narrower than direct LED emission. Additionally, since the nanoparticles are much smaller than the wavelength of exciting light, the amount of light scattering is negligible. With standard inorganic LED phosphors, as much as 50% or more of the emitted light is scattered in a backwards direction which is substantially reabsorbed by the LED die, thereby resulting in significant optical power loss. Nanophosphors, due to relatively insignificant scattering, do not lose as much power due to backscattering. Even though phosphorescence or fluorescence is emitted into a sphere, or a solid angle of 2π steradians, the emission which is directed back toward the LED die and subsequently is diffusely reflected, does not encounter scattering losses due to the nanophosphor on the way out of the nanophosphor coatings. Some of the most recently developed nanophosphors are robust and have low thermal quenching and thus are strong candidates as phosphors for this type of application. These nanophosphors also have high excitation efficiency in the UVA ultraviolet spectral region between 360 nm and 405 nm where there are now a number of extremely high wall plug efficiency UV LEDS available. The same discussion with regard to using taper output to input ratios that result in output half angle far fields on the order of 20° or less as discussed for system 370 of FIG. 27 apply here for system 430 as well. A further advantage to breaking the spectrum into different regions and using dichroic beam combiners so Etendue is not shared among different spectral regions is that the LED arrays, and therefor source of heat are spatially separated, which results in better thermal performance and therefor lower junction temperatures and longer life for the LED die.

Figure 30:
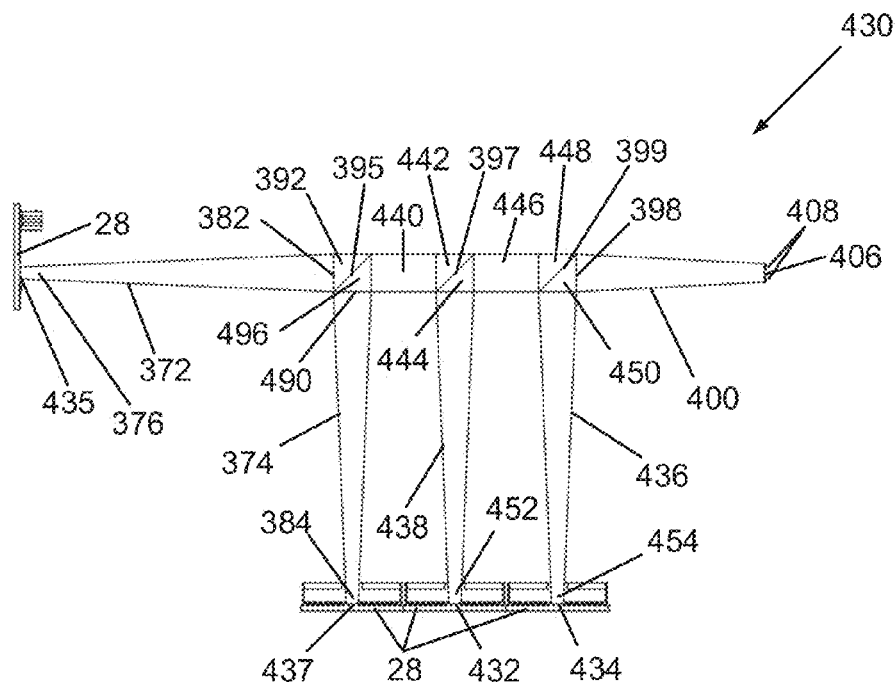
FIGS. 30 A and 30 B show diagrammatic side views of the system of FIG. 29 without and with ray paths, respectively.
Figure 30:
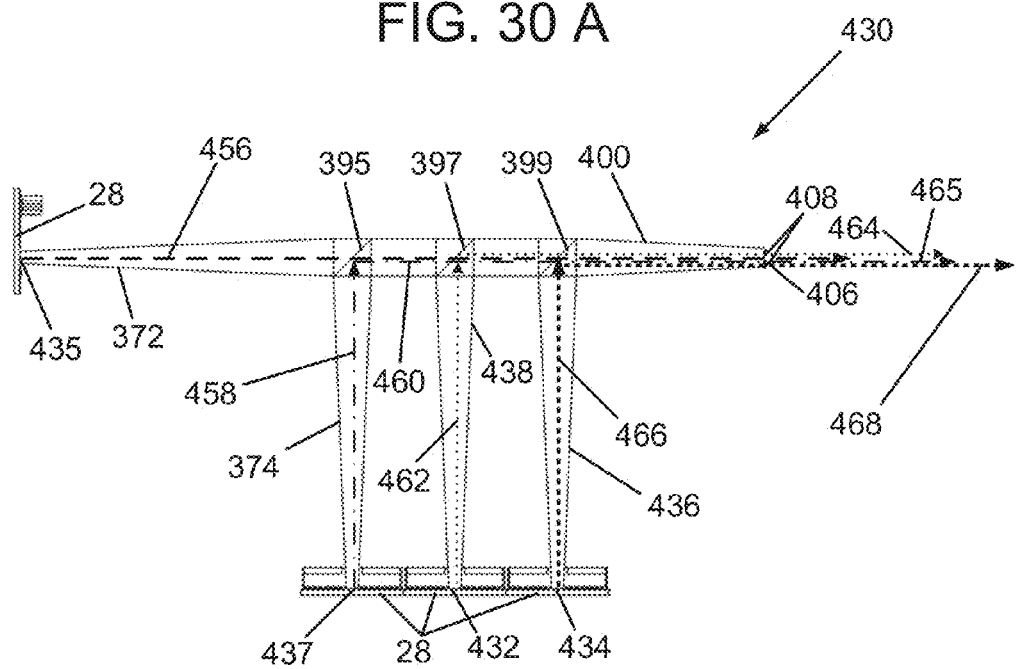

With reference now to FIGS. 30 A and 30 B, there are shown diagrammatic side views, without and with rays shown, respectively, of the system 430 of FIG. 29. With reference to FIG. 30 A, it should be appreciated by those skilled in the art, that LED array 432 can be positioned 180° from the orientation shown so that it is on the top side of the horizontal axis running between LED array 435 and output aperture 406. That would represent a further improvement in thermal performance since larger heat sinks can then be used for LED arrays 437 and 434, however, the thermal benefit has to be considered against increasing package complexity, size, and cost. Furthermore, it is not necessary that all LED sources reside in the same plane, for example LED array 432 can be positioned into the page ninety degrees from what is shown and LED array 434 could be positioned out of the page 90° from what is shown, but again, the thermal benefit must be considered against the complexity, size, and cost considerations. Additionally, square cross section coupling light guides 440 and 446 cab be made longer to spread the thermal source out further, but that makes the overall package size longer. The far field mixing of the different paths is primarily a function of the collection tapers 372, 474, 438, and 436 as well as the reverse taper 400, but is affected negligibly by straight sections 440 and 446. The near field is affected by the length of elements 440 and 446, however, the near field is already sufficiently uniform as not to benefit from further length, therefore there is no practical reason that the lengths of coupling light guides 440 and 446 should be determined by anything other than the size needed for the individual LED boards and associated heat sinks of LED arrays 437, 432, and 434. It should be understood by those skilled in the art that elements 440 and 446 can be eliminated, which would put the LED array center to center distance as determined by the size of the prism elements making up the cube beam combiners, that is elements 392, 496, 442, 444, 448, and 450. One embodiment has these elements touching, but not index matched to each other and placing the three different LED arrays 384, 432, and 434 all on the same LED board. Alternatively, the array furthest away from the exit aperture 406 can use a mirrored coating on the beam combiner instead of a dichroic coating. That would allow for all LED arrays to be placed on a single LED board, which can lower cost and reduce package size, assuming that it performed well for the given application from the thermal perspective. FIG. 30 B shows and identical view of system 430 as FIG. 30 A with ray 456 emitted from LED array 435, transmitting through combiner 395, passing through the three beam combiners and coupling light guides 440 and 446 as if they were a single square cross section light pipe extending from surface 382 to 398 and then through reverse taper 400 and either out aperture 406 or reflected by mirror 408 for a return trip back to LED array 435 and then back toward exit aperture 406. Ray 458 exits LED array 437, reflects off beam combiner 395 and then follows a similar path toward exit aperture 406 represented by ray 465. The portion of the light that reflects back off mirror 408 having arrived from LED array 437 is directed back to LED array 437 by beam combining dichroic coating 395 where it diffusely reflects back toward exit aperture 406 to increase radiance in a similar manner as that described for the other embodiments above. Similarly, ray 462 from LED array 432 reflects off beam combiner 397, is transmitted through beam combiner 399 into reverse taper 400 and partially exits aperture 406 and partially reflected back to LED array 432 by mirror 408 and then diffusely reflected back along a similar path for another opportunity to pass through exit aperture 406 represented by ray 464. Ray 466 reflects off beam combiner 399 and passes down reverse taper 400 and then is partially emitted out of aperture 406 represented by ray 468 and partially reflected for additional passes back to LED array 434.

Figure 31:
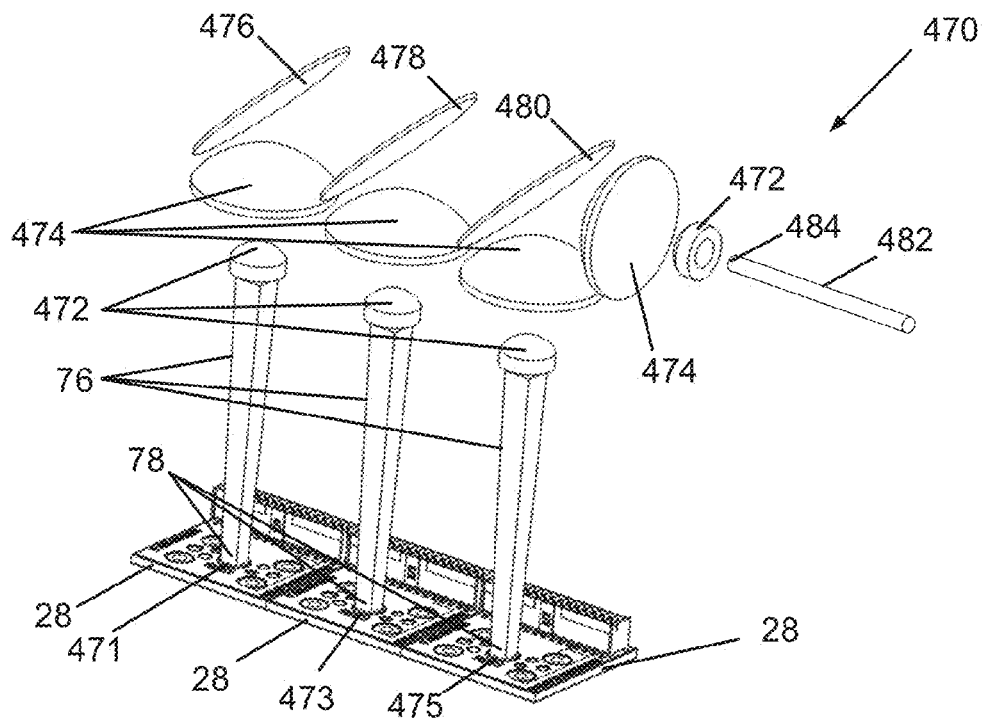
FIGS. 31 A and 31 B show an alternative embodiment for dichroically coupling multiple LED boards and spectral bands into an optical fiber using a system of lenses and dichroic beam combiners, in diagrammatic isometric view and side view with ray paths shown, respectively.
Figure 31:
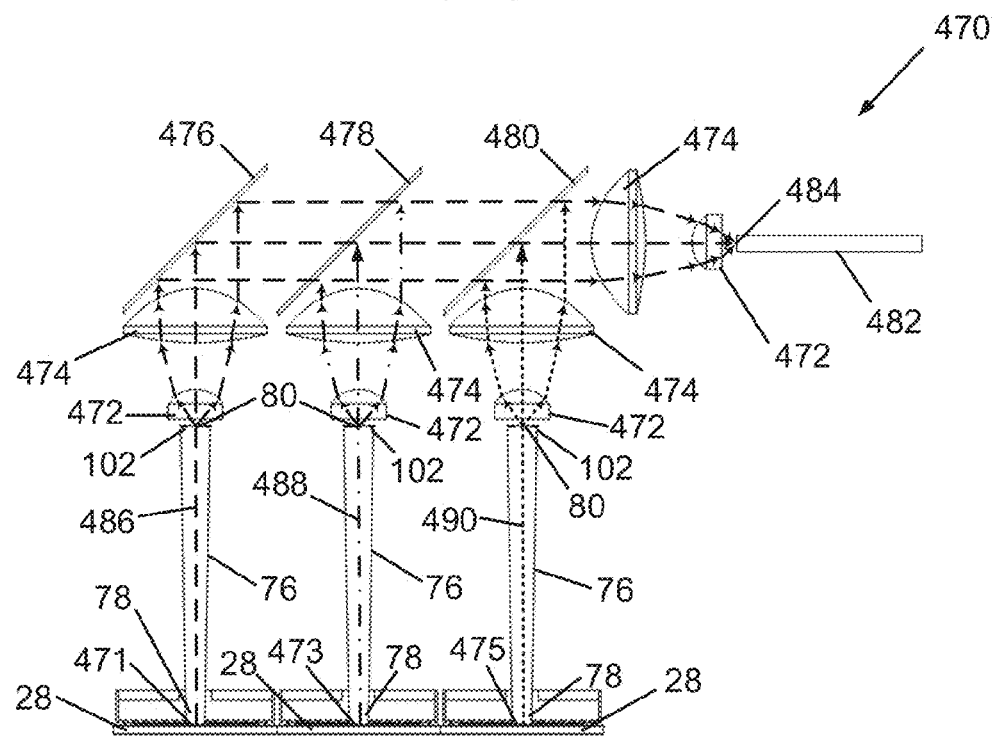

Another embodiment is represented by FIGS. 31 A and 31 B showing a diagrammatic isometric view and side on view with rays shown, respectively, of a system 470 using tapers identical to those of system 100 of FIGS. 5 A and 5 B with three different color LED arrays 471, 473, and 475, respectively in combination with imaging lenses 472 and 474, mirror 476 and dichroic beam combining elements 478 and 480 to image the exit aperture of the three tapers into a single light guide 482 at input aperture 484. In one preferred embodiment the lenses are aspheric to minimize losses due to spherical aberrations. The first set of two lenses images to infinity to minimize divergence angle through the beam couplers in consideration for the angular dependence of the dichroic coatings, and a second set of two lenses identical, but mirror image of the first are common to all three beam paths and image the three exit apertures back to the input aperture 484 of the fiber bundle 482. Again, the longest wavelength LED array is 471. Rays 486 reflects off turning mirror 476, passes through the two long pass dichroic beam couplers 478 and 480 and is imaged to 484. Ray 488 of LED array 473 is reflected off beam combiner 478, passes through 480 and is imaged down to entrance aperture 484 of fiber bundle 482. Likewise, rays 490 exit LED array 475 and its associated exit aperture 80, reflect off dichroic beam combiner 480 and are imaged down to aperture 484. The mirrors 102 of each respective taper act to increase radiance from each taper in the same way described for that of the system 100 of FIG. 5 A. One advantage of this approach over using the light pipe beam combiners of FIG. 29 A is that the much lower divergence angle that can be obtained through the dichroic beam combiners results in increased sharpness, that is faster transition from low to high transmission as a function of wavelength, which allows for higher efficiency of coupling for each LED array. It is not necessary that the system of lenses for each LED array, that is symmetric set of lens elements 472 and 474 on the collection side and reversed lens elements 474 and 472 on image converging side, be color corrected to a large extent since the focus position of the first set of lenses 472 and 474 for each color can be shifted such that they all overlap and are in focus at aperture 484 of fiber bundle 482. For this system, as described for FIG. 30 A an 30 B, it is not necessary that all LED source lie in the same plane, however, if they do, that likely corresponds to the most compact arrangement. It is possible to have all LED arrays 471, 473, and 475 located on a single metal core board if desired; however, the center to center spacing is limited according to the diameter of lens 474, which in turn is affected by the divergence angle through the dichroic beam combiners. The lens 474 diameters can be reduced up to the order for which they result in a 20° half angle divergence incidence relative to the optical axis through the beam combiners. The lenses can be made of any glass that has high transmission and low fluorescence for the spectral range of interest. Plastic lenses, however, are lower in cost and enable easier use of aspheric surfaces for spherical aberration correction. The lenses can be antireflection coated over the applicable spectral range of the LEDs.

What is claimed is:
1. A light emitting diode (LED) light source comprising:
at least one LED die; and
a tapered collection optic having an input aperture at a first end, an output aperture at a second end and a length, the input aperture being in optical communication with the at least one LED die to receive light therefrom, the output aperture defined by a non-reflective circular region in a reflective surface disposed at the second end, wherein light transmitted through the tapered collection optic that is incident at the aperture is emitted from the second end of the tapered collection optic and wherein light transmitted through the tapered collection optic that is incident at the second end and not in the aperture is reflected back into the tapered collection optic and wherein a ratio of the length of the tapered collection optic to a diameter of the output aperture has a value of at least ten to provide a substantially uniform far field.
2. The LED light source of claim 1 wherein the reflective surface is disposed on a surface of a front surface mirror and wherein the front surface mirror is positioned so that the reflective surface is disposed adjacent to the second end of the tapered collection optic.
3. The LED light source of claim 1 wherein the reflective surface is formed on the second end of the tapered collection optic.
4. The LED light source of claim 1 wherein the at least one LED die includes a plurality of LED dies that includes at least one LED die having a first color and at least one LED die having a second color and wherein an intensity of light emitted by the at least one LED die having a first color and an intensity of light emitted by the at least one LED die having a second color are independently controllable.
5. The LED light source of claim 1 wherein the at least one LED die comprises at least one pair of LED dies wherein each LED die in the pair having a same color and is disposed diametrically opposite to the other LED die in the pair with respect to the input aperture of the tapered collection optic.
6. The LED light source of claim 1 further comprising an optical fiber bundle having an input aperture adjacent to the output aperture of the tapered collection optic and wherein a diameter of the input aperture of the optical fiber bundle is approximately equal to the diameter of the output aperture of the tapered collection optic.
7. The LED light source of claim 1 wherein the tapered collection optic has a plurality of sides each extending from the first end to the second end, the LED light source further comprising a photosensor having a field of view through one of the sides and configured to generate a photosignal in response to a received optical power.
8. The LED light source of claim 1 wherein the at least one LED die is a plurality of dies arranged in a rectangular configuration.
9. The LED light source of claim 1 wherein the tapered collection optic has four sides.
10. The LED light source of claim 1 wherein the at least one LED die includes a plurality of LED dies having at least one of each of a white LED die, a blue LED die, a blue-green LED die and a red LED die.
11. The LED light source of claim 4 wherein the first color includes infrared light.
12. The LED light source of claim 4 wherein the first color is a color from a group consisting of green light, blue-green light and blue light and infrared light.
13. The LED light source of claim 11 wherein a wavelength of the infrared light is within a spectral range of approximately 700 nm to approximately 980 nm.
14. A light emitting diode (LED) light source comprising:
a tapered collection optic having an input aperture at a first end, an output aperture at a second end and a length, the output aperture defined by a non-reflective circular region in a reflective surface disposed at the second end, wherein light transmitted through the tapered collection optic that is incident at the aperture is emitted from the tapered collection optic and wherein light transmitted through the tapered collection optic that is incident at the second surface that is not in the aperture is reflected backward into the tapered collection optic; and
an LED array in optical communication with the input aperture of the tapered collection optic, the LED array having a plurality of pairs of LED dies, each of the LED dies in each pair emitting a same color of light as the other LED die in the pair and each of the LED dies in each pair being disposed diametrically opposite to the other LED die in the pair with respect to the input aperture of the tapered collection optic.

15. A light emitting diode (LED) light source comprising:
a plurality of LED dies;
a plurality of tapered collection optics each having an input aperture at a first end, an output aperture at a second end and a length, each of the input apertures being in optical communication with a subset of the plurality of LED dies to receive light therefrom; and
a combining and homogenizing optical element having an input aperture at a first end adjacent to the second ends of the tapered collection optics, the combining and homogenizing optical element having an output aperture defined by a non-reflective circular region in a reflective surface disposed at a second end that is opposite to the first end, a ratio of the diameter of the output aperture to the length having a value of at least ten, wherein light transmitted through the tapered collection optics and combining and homogenizing optical element that is incident at the aperture is emitted from the second end of the combining and homogenizing optical element and wherein light transmitted through the tapered collection optics and the combining and homogenizing optical element that is incident at the second end of the combining and homogenizing optical element and not in the aperture is reflected backward through the combining and homogenizing optical element and the tapered collection optics.

16. The LED light source of claim 15 wherein, for each of the tapered collection optics, a ratio of the distance defined between the input aperture of the tapered collection optic and the output aperture of the combining and homogenizing optical element to the diameter of the output aperture of the combining and homogenizing optical element has a value of at least ten.

17. The LED light source of claim 15 wherein each output aperture at the second end of a respective one of the tapered collection optics is coated to form a spectral bandpass filter.

18. The LED light source of claim 17 wherein the spectral bandpass of each spectral bandpass filter is different from the spectral bandpass of the other spectral bandpass filters.

19. A light emitting diode (LED) light source comprising:
at least one first LED die having a first spectrum and at least one second LED die having a second spectrum, wherein the first spectrum and the second spectrum are different;
a first tapered collection optic and a second tapered collection optic each having a length, having an input aperture at a first end in optical communication with the at least one first LED die and the at least one second LED die, respectively, to receive light therefrom and having an output aperture at a second end, wherein a ratio of a size of the output aperture to the length has a value of at least ten; and
a spectral beam combining element having a first input aperture in communication with the output aperture of the first tapered collection optic, a second input aperture in communication with the output aperture of the second tapered collection optic, and an output aperture to provide a combination of the light from the at least one first LED die and the at least one second LED die emitted from the output apertures of the first and second tapered collection optics, respectively.

20. The LED light source of claim 19 further comprising a reverse tapered collection optic having an input aperture at a first end in optical communication with the output aperture of the spectral beam combining element and an output aperture at a second end, wherein a size of the input aperture of the reverse tapered collection optic is greater than a size of the output aperture of the reverse tapered collection optic.

21. The LED light source of claim 19 wherein the reverse tapered collection optic has a reflective surface disposed at the second end with a non-reflective circular region therein to define an aperture, wherein light transmitted through the reverse tapered collection optic that is incident at the aperture is emitted from the second end of the reverse tapered collection optic and wherein light transmitted through the reverse tapered collection optic that is incident at the second end and not in the aperture is reflected backward into the reverse tapered collection optic.

22. The LED light source of claim 19 further comprising:
at least one imaging lens disposed between the second end of each taper and the corresponding one of the first and second input apertures of the spectral beam combining element; and
at least one imaging lens in optical communication with the output aperture of the spectral beam combining element, wherein light from the at least one first LED die and the at least one second LED die is substantially collimated at the spectral beam combining element.

23. The LED light source of claim 19 wherein the spectral beam combining element comprises a dichroic surface.

24. A method of controlling a color of a light emitting diode (LED) source, in a system comprising at least one first LED die having a first color, at least one second LED die having a second color, and a tapered collection optic, the tapered collection optic having an input aperture at a first end, an output aperture at a second end and a length, the input aperture being in optical communication with the at least one first and second LED dies to receive light therefrom, the output aperture defined by a non-reflective circular region in a reflective surface disposed at the second end, the method comprising:
modulating an intensity of light emitted from the at least one first LED die at a first frequency and modulating an intensity of light emitted from the at least one second LED die at the second color at a second frequency;
detecting the light modulated at the first and second frequencies;
determining an intensity of the light from the at least one first LED die and an intensity of the light from the at least one second LED die from the detected light; and
controlling the intensities of the light from the at least one first LED and the light from the at least one second LED die in response to the determined intensities.

25. The method of claim 24 wherein modulating an intensity of light emitted from the at least one first LED die at a first frequency and modulating an intensity of light emitted from the at least one second LED die at the second color at a second frequency comprises modulating the intensities so that only one of the at least one first LED die and the at least one second LED die has a non-zero intensity.

26. The method of claim 24 wherein the determining an intensity of the light from the at least one first LED die and an intensity of the light from the at least one second LED die from the detected light comprises performing a lock-in detection process on a signal responsive to the detected light.

27. The method of claim 24 wherein the determining an intensity of the light from the at least one first LED die and an intensity of the light from the at least one second LED die from the detected light comprises performing a Fast Fourier Transform on a signal responsive to the detected light.

* * * * *